Figure 2B:
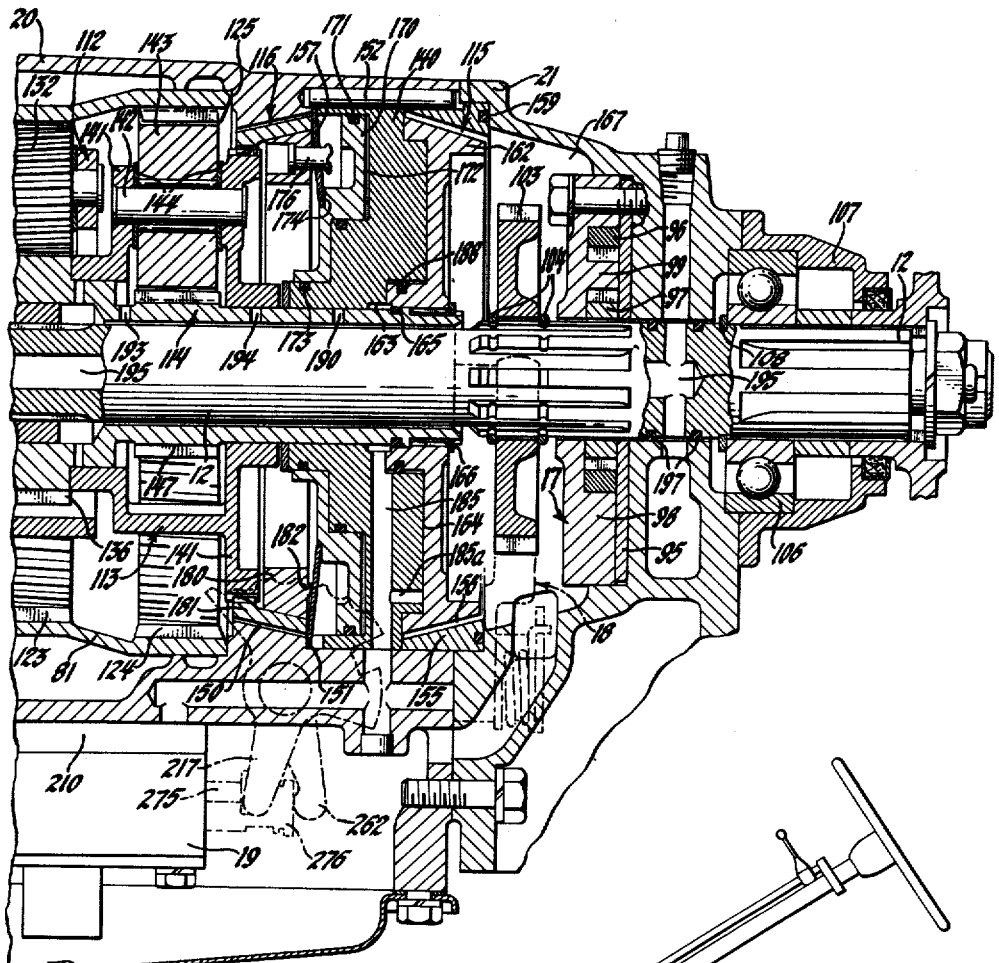

April 2, 1963  H. W. CHRISTENSON  3,083,588
AUTOMATIC TRANSMISSION
Original Filed Feb. 16, 1953  5 Sheets-Sheet 1

INVENTOR
Howard W. Christenson
BY
Willis, Helwig & Baillio
ATTORNEYS

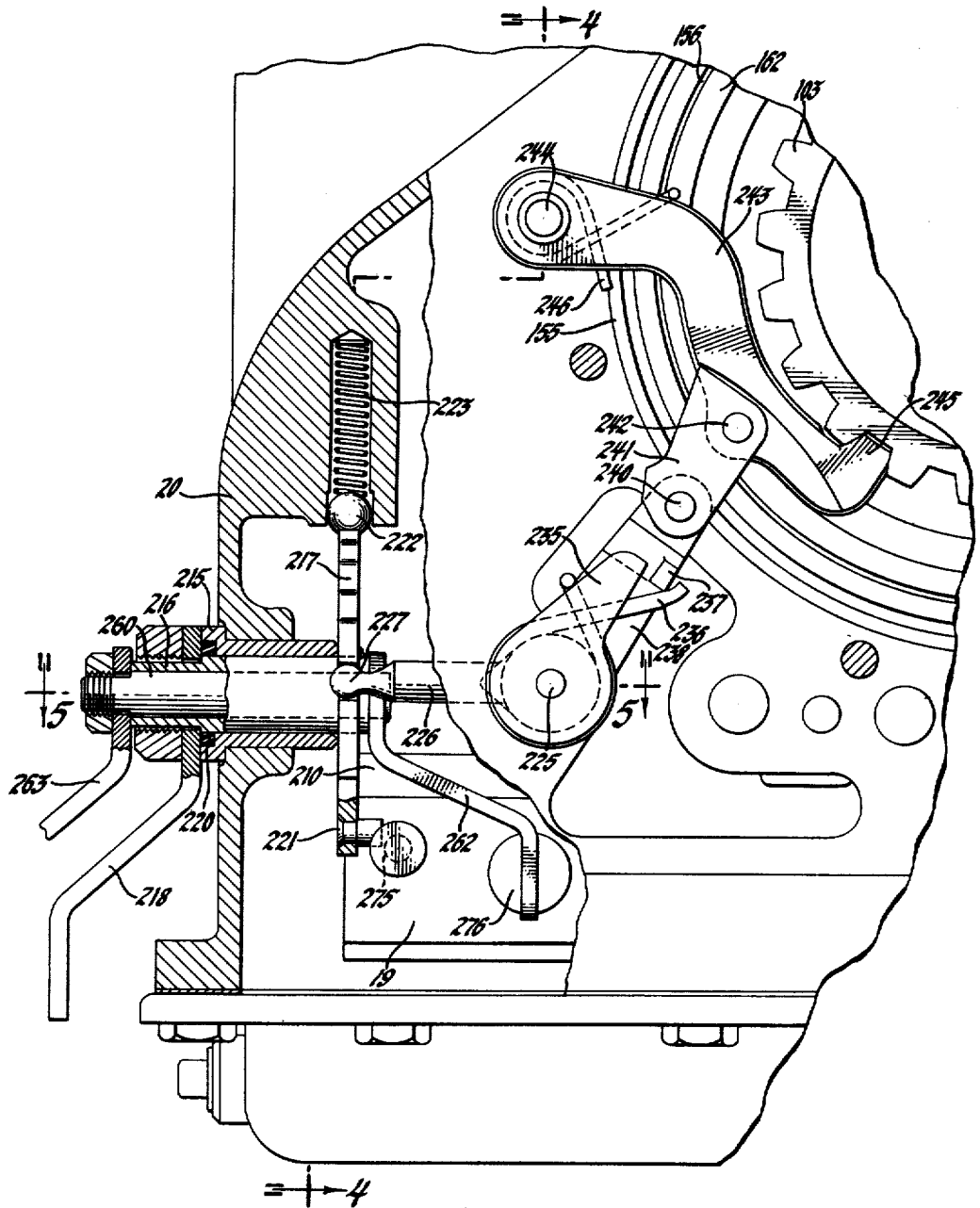

INVENTOR
Howard W. Christenson
BY
Willits, Helwig & Baillio
ATTORNEYS

April 2, 1963

H. W. CHRISTENSON 3,083,588

AUTOMATIC TRANSMISSION

Original Filed Feb. 16, 1953

5 Sheets-Sheet 5

INVENTOR
Howard W. Christenson
BY
Willis, Helmig & Baillio
ATTORNEYS

United States Patent Office 3,083,588
Patented Apr. 2, 1963

3,083,588
AUTOMATIC TRANSMISSION
Howard W. Christenson, Indianapolis, Ind., assignor to General Motors Corporation, Detroit, Mich., a corporation of Delaware
Continuation of abandoned application Ser. No. 337,203, Feb. 16, 1953. This application Mar. 12, 1958, Ser. No. 721,058
83 Claims. (Cl. 74—472)

This invention relates to power transmission mechanism and particularly to an improved transmission adapted for use in motor vehicles and is a continuation of Serial No. 337,203, filed February 16, 1953, and now abandoned.

An object of this invention is to provide an improved transmission of the type shown in my application Serial No. 220,902 filed April 13, 1951, and now U.S. Patent No. 2,792,716.

Another object of this invention is to provide a transmission incorporating means automatically effective to increase the braking effect on the vehicle when and only when such increased braking effect is desirable.

A further object of the invention is to provide an improved transmission employing a drum with internal gears on the inner face thereof together with means to trap oil within the drum to provide increased braking effect, and having other means to exert a retarding action of the drum and to also press the open face of the drum against a sealing surface to aid in retaining oil within the drum.

Another object of the invention is to provide an improved transmission of the type described which is arranged so that the supplemental braking means is effective only when the transmission is manually placed in low range, and then only if the throttle is substantially closed.

A further object of the invention is to provide an improved transmission of the type described which is arranged so tha the supplemental braking means is effective only when the vehicle speed is less than a selected intermediate rate.

Another object of the invention is to provide an improved vehicle transmission incorporating a clutch effective when engaged to establish a positive connection between the engine and the vehicle wheels, together with control means for releasing said clutch, said control means being governed by the power demand on the engine and by means responsive to the speed of the engine.

Another object of the invention is to provide an improved transmission of the type described in which there are hydraulically controlled low and high speed clutches or braking devices together with improved shift valve means for regulating the degree of overlap of the clutches or braking devices during a shift from one ratio to another.

A further object of the invention is to provide an improved transmission of the type described in which the shift valve means is arranged so that the degree of overlap during an upshift is reduced at relatively high vehicle speeds, and is also reduced when the power demand on the engine is relatively small.

A still further object of the invention is to provide an improved transmission of the type described which is arranged so that during a downshift occurring while the vehicle throttle is substantially fully open a clutch or other gear ratio controlling device is released at a less rapid rate than during a downshift occurring at other times.

Another object of the invention is to provide an improved transmission employing an engine driven pump and an output shaft driven pump, the transmission being arranged so that during normal operation the liquid supplied by the output shaft driven pump is employed only to indicate the speed of the output shaft.

A further object of the invention is to provide an improved transmission of the type described which is arranged so that during normal operation of the vehicle oil under pressure is supplied from the engine driven pump to the inlet of the output shaft driven pump to thereby reduce the power required to drive the output shaft driven pump and to increase the accuracy of the output shaft driven pump and related equipment in measuring the vehicle speed.

Another object of the invention is to provide an improved transmission of the type described in which means is provided to normally supply oil from the engine driven pump to the output shaft driven pump, and in which means is provided to permit the output shaft driven pump to draw oil from the sump under conditions during which oil is not available from the engine driven pump.

A further object of the invention is to provide an improved transmission incorporating a shift valve having a downshift position in which it causes a low speed ratio to be established and also having an upshift position in which it causes a higher ratio to be established.

Another object of the invention is to provide an improved transmission of the type described in which the shift valve is always subject to a force which varies in accordance with vehicle speed and at times is subject to an opposing force which varies in accordance with the power demand on the vehicle engine.

A further object of the invention is to provide an improved transmission of the type described in which the force varying in accordance with the power demand on the vehicle engine urges the shift valve towards the downshift position and may be substantially eliminated on movement of the valve to the upshift position.

Another object of the invention is to provide an improved transmission of the type described and incorporating a control device effective during a selected relatively low range of vehicle speeds for causing the force varying in accordance with the power demand on the vehicle engine to continue to be exerted on the shift valve after movement of the shift valve to the upshift position.

A further object of the invention is to provide an improved transmission incorporating braking means for retarding movement of the vehicle, together with control means for rendering this braking means effective when and only when operation of the braking means is desirable.

Other objects of the invention and features of novelty will be apparent from the following description taken in connection with the accompanying drawings.

In the drawings

Figure 1:
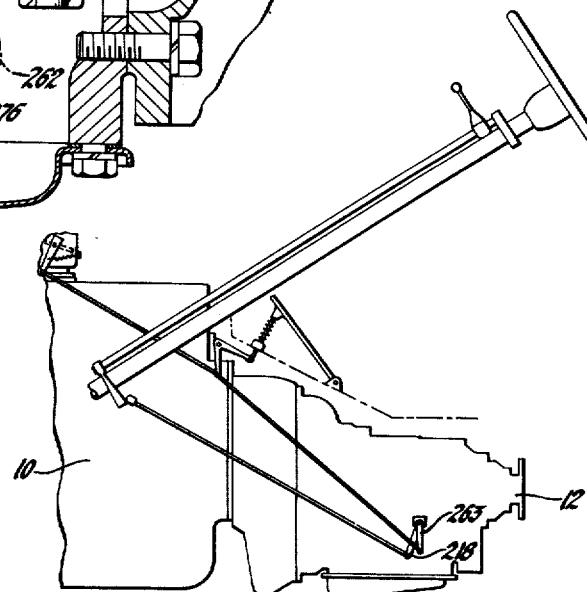
Figure 2A:
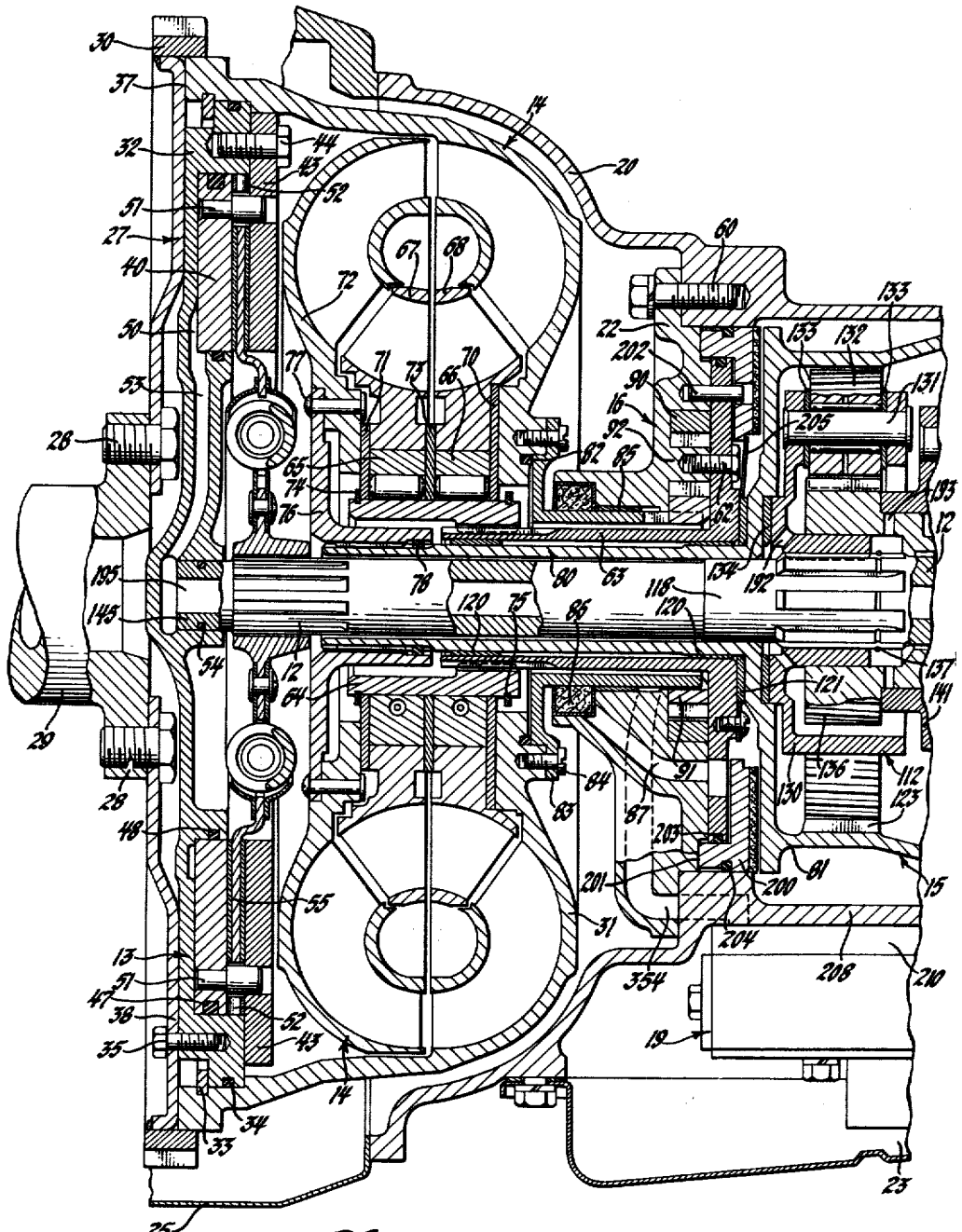
Figure 4:
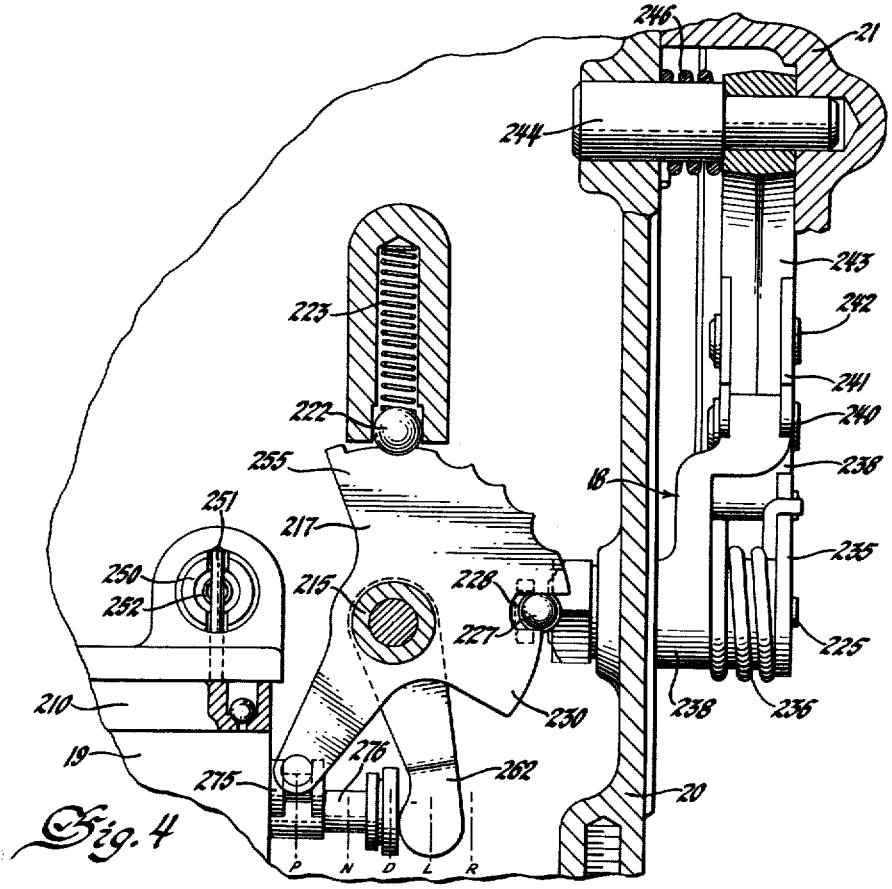
Figure 5:
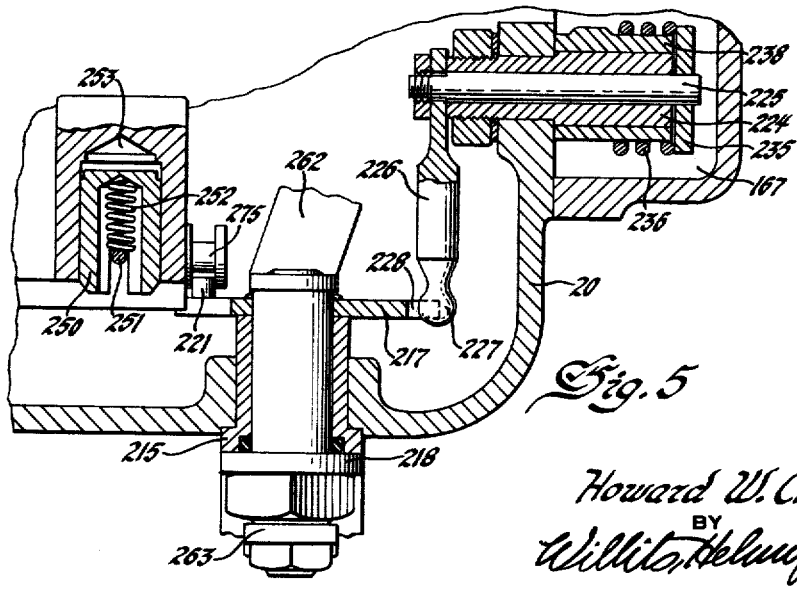
Figure 6:
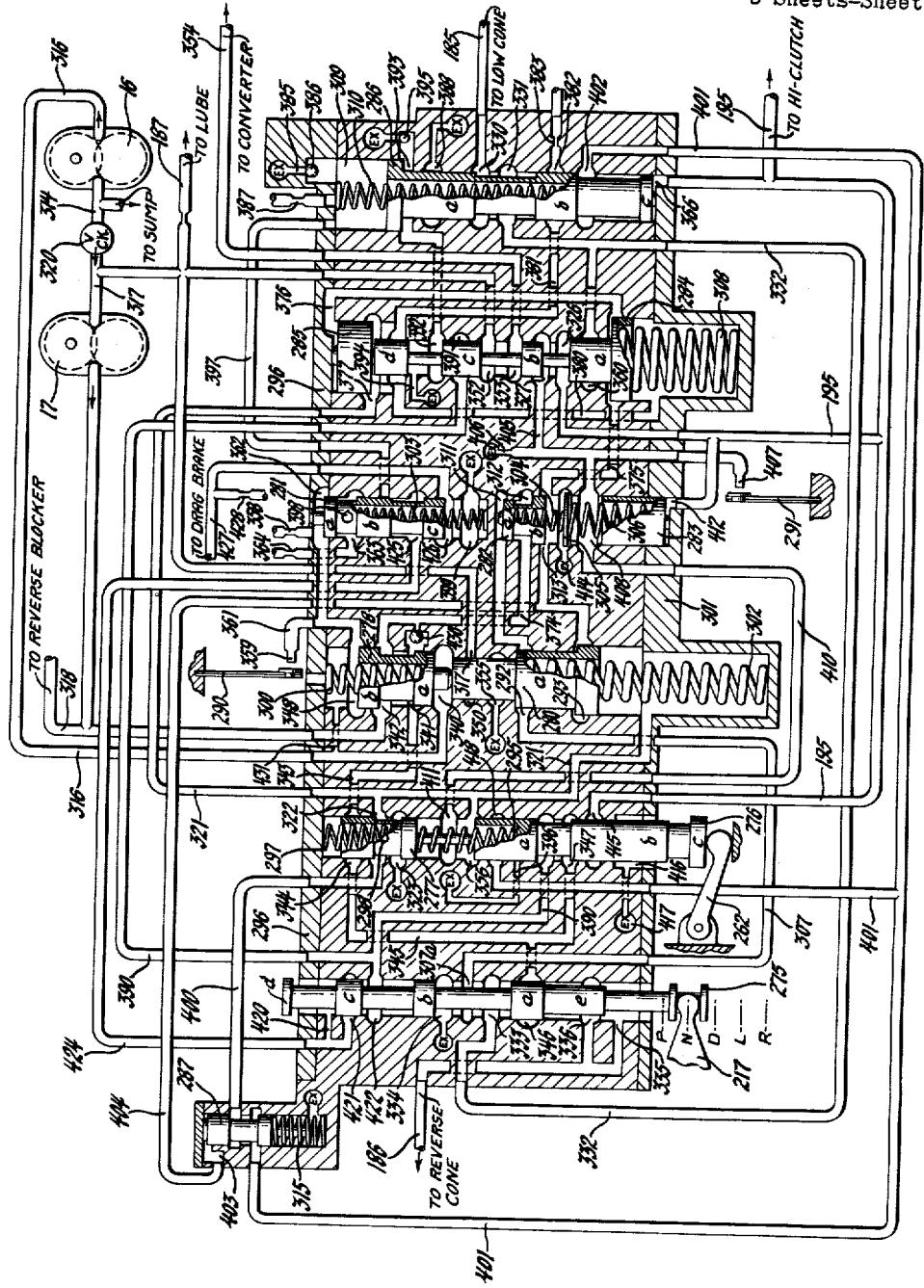

FIGURE 1 is a fragmentary elevational view showing the transmission of my invention installed in a vehicle, FIGURES 2a and 2b, when placed together with FIGURE 2b at the right, form a longitudinal sectional view of a transmission embodying this invention, FIGURE 3 is a fragmentary sectional view showing portions of the parking lock and of the levers for controlling the manual and throttle valves, FIGURE 4 is a fragmentary sectional view taken substantially along the line 4—4 on FIGURE 3, FIGURE 5 is a fragmentary sectional view taken substantially along the line 5—5 on FIGURE 3, and FIGURE 6 is a diagram showing the control valve for the transmission, the elements of the control valve being shown in the positions which they assume when the vehicle and the vehicle engine are at rest, the accelerator is released, and the manual control valve is in the neutral position.

In practicing my invention, I provide a transmission including a hydraulic torque converter which has an input member adapted to be driven from a vehicle engine and which has an output member adapted to drive the input element of a planetary gear unit, while the output element of the planetary gear unit is secured to the transmission output shaft. The input element of the planetary gear unit is in the form of a drum which is closed on the forward end and is open on the rearward end. The interior face of the drum has formed thereon two internal gears which mesh with the planet gears of two planetary gear units. The rearward end face of the drum is located adjacent a transverse wall of the transmission housing and at times is pressed against this wall to thereby trap lubricant within the drum so that this lubricant opposes movement of the planetary gear units within the drum and thus provides a braking force for the vehicle. In addition, I provide supplemental braking means comprising a hydraulically operated annular braking element which at times is pressed against the forward face of the drum to retard rotation of the drum, and to press the rear face of the drum against the transverse wall. The supply of oil under pressure to the means for operating the braking element is controlled so that the braking element is applied only when the transmission is manually placed in low range, and then only if the accelerator is substantially fully released and the vehicle speed is below an intermediate rate, such as 45 miles per hour.

The transmission includes hydraulically operated means for locking the sun gear of a planetary gear unit to the housing to establish low speed drive, and includes a hydraulically operated direct drive clutch for connecting the output shaft directly to the engine to establish high speed. The transmission control means includes a shift valve biased by a spring to the downshift position and movable against the spring by oil supplied to a chamber of the valve from a source which is controlled so that the pressure on the oil increases in accordance with vehicle speed. Movement of the shift valve away from the downshift position to the upshift position is opposed by oil supplied to a second chamber of the shift valve from a source which is controlled so that the pressure increases in accordance with the power demand on the vehicle engine. The normal supply of oil under pressure to the second chamber is cut off upon movement of the shift valve to the upshift position so that movement of the shift valve from the upshift to the downshift position is not affected by variations in engine power demand. The control system of this transmission includes means effective only when the vehicle speed is below a selected intermediate rate for supplying oil from the source responsive to engine load to the shift valve second chamber when the shift valve is in the upshift position. This results in release of the direct drive clutch if there is a substantial increase in the load on the vehicle engine at relative low vehicle speeds and prevents detonation of the vehicle engine which might otherwise occur.

The control system for the transmission includes a timing valve which is subject to the pressure of the oil supplied to the direct drive clutch and controls engagement and release of the means for establishing low speed drive. The rate of movement of the timing valve to the upshift position to interrupt low speed drive in governed by the rate of escape oil from a first chamber of the valve, and also by the supply of oil under pressure to a second chamber of the valve. This varies the extent of overlap of the low range and direct drive control means during an upshift. A restricted orifice permits escape of oil from the timing valve first chamber to normally cause a selected delay in movement of the timing valve to the upshift position. Another passage for the escape of oil from the timing valve first chamber is opened at high vehicle speeds so that degree of overlap of the low range and direct drive control means is reduced during an upshift at high vehicle speeds. When the throttle is substantially closed, oil under pressure is supplied to the timing valve second chamber to increase the force tending to move the timing valve to the upshift position and thus reduce the extent of the overlap for an upshift occurring while the throttle is closed.

A ball check valve controls a passage through which oil may flow at a rapid rate to the first chamber of the timing valve so that movement of the timing valve to the downshift position is governed solely by the rate of reduction in the pressure of the oil in the direct drive clutch. The release passage through which oil is released from the direct drive clutch has one branch which is constantly connected to exhaust through a restricted orifice so that oil is always released from the direct drive clutch at least as fast as permitted by this orifice. Another branch of the direct drive clutch release passage is controlled by the throttle valve so that this branch is open to exhaust except when this valve is in the position to which it is moved when the vehicle accelerator pedal is moved more than one-half of the distance to the full open position. This branch of the direct drive clutch release passage permits rapid release of the direct drive clutch for substantially closed throttle conditions, but restricts the rate of release of the clutch during a downshift with the throttle wide open, at which time there is a relatively heavy load on the engine and relatively heavy transmission of torque through the vehicle driving mechanism. The slow release of the direct drive clutch under heavy load conditions permits the load on the vehicle driving mechanism to gradually reduce so that when the direct drive clutch becomes fully disengaged, there will not be a sudden release of energy stored in the vehicle driving mechanism.

A third branch of the direct drive clutch release passage is controlled by a valve element subject to the pressure of the oil in the direct drive clutch. This valve element blocks this branch of the direct drive clutch release passage until the pressure in the direct drive clutch reduces to an intermediate valve less than that required to hold the clutch engaged. Thereafter this valve element opens this branch of the direct drive clutch release passage so that there can be no build up of pressure on the direct drive clutch.

Referring to the drawings I have illustrated my invention in connection with a motor vehicle provided with an engine 10, a portion of which is shown in FIGURE 1 of the drawings. As best shown in FIGURES 2a and 2b of the drawings, the transmission provided by this invention includes an output shaft 12, which is adapted to have connected thereto the vehicle propeller shaft, a lock-up or direct drive clutch 13, a hydraulic torque converter 14, a planetary reduction and reverse gear unit 15, and engine driven pump 16, an output shaft driven pump 17, a parking brake 18, and a control valve 19.

The transmission has a housing adapted to be secured to the flywheel housing of the engine 10 and constructed of a plurality of cast iron sections. The housing includes a principal section 20 which is secured to the engine, a rear section 21, a front pump section 22, and a bottom conver plate 23.

The cylinder block of the engine 10 has formed integral therewith an extension which surrounds the upper portion of the engine flywheel, and has secured thereto a stamped sheet metal member 25 which surrounds the lower portion of the engine flywheel. The forward portion of the transmission housing section 20 is substantially cylindrical and has a substantially flat forward face which is secured against the confronting face on the engine cylinder block and on member 25 to form an enclosure for the engine flywheel, the direct drive clutch 13, and the torque converter 14.

The engine flywheel 27 is in the form of a circular sheet metal stamping which is secured by a plurality of cap screws 28 against the flange on the rear end of the engine crankshaft 29. The member 27 is surrounded by an axially extending flange to which is secured the flywheel ring gear 30. The ring gear 30 is welded to the member 27 and projects a shirt distance from the rear face of the member 27.

The torque converter 14 is a four element device having a pump or driving element 31 having a flat substantially cylindrical front face which is adapted to engage the rear face of the flywheel 27, and is of such external diameter as to closely fit within the ring gear 30. The member 31 has adjacent its front face a cylindrical bore in which there is mounted a circular member 32 which is held in place in the bore in the member 31 by a lock ring 33 mounted in a groove in the member 31. The member 32 has in the periphery thereof a groove in which there is mounted packing 34, which engages the face of the bore in the member 31 to prevent the escape of liquid from the area within the member 31 through the joint between the ring 32 and the member 31. The member 32 has on the axially outer or forward face thereof an annular surface 38 which is adapted to engage the face of the flywheel member 27 and in which there are a plurality of circumferentially spaced threaded holes into which extend cap screws 35 which extend through aligned openings in the flywheel member 27 and serve to detachably secure the torque converter 14 and lock-up clutch 13 to the flywheel.

The various parts of the equipment are constructed and proportioned so that when they are assembled together, the annular surface 37 on the torque converter pump or driving element 31 which engages the rear face of the flywheel member 27 is located in a plane a small distance, such as a few thousandths of an inch, to the left of the plane of the exposed surface 38 on the member 32. Hence, when the cap screws 35 are tightened to draw the member 32 towards the flywheel 27, the annular surface 37 on the torque converter member 31 is drawn firmly against the flywheel throughout the circumference of the member 31 and thereby provides an effective driving connection between the flywheel and the torque converter element 31.

The circular member 32 is a metal casting which extends across the open forward face of the torque converter and has in its rearward face a centrally located bore which is adapted to receive the reduced forward end portion of the output shaft 12. The member 32 also has in its rearward face an annular chamber which is adapted to receive the piston 40, while the rear face of the member 32 has secured thereto the annular pressure plate 43. The plate 43 is secured in position by a plurality of circumferentially spaced cap screws 44. The radially outer face of the piston 40 has therein an annular groove in which there is mounted packing 47. Similarly, the radially inner wall of the chamber in the member 32 has therein a groove in which is mounted packing 48. The packing associated with the piston 40 prevents escape of liquid under pressure from the chamber 50 between the piston 40 and the member 32. The piston 40 has secured thereto a plurality of drive pins 51 which project from the rear face of the piston and are slidable in aligned holes in the pressure plate 43. The drive pins 51 are located a short distance radially inwardly of the periphery of the piston 40 and the clutch release spring 52 is located between the piston 40 and the pressure plate 43 in the area radially outwardly of the drive pins 51. The clutch release spring 52 is formed of flat spring wire bent into a circle and having a plurality of offsets therein so that the spring yieldingly urges the piston 40 away from the pressure plate 43, but permits the piston to move towards the pressure plate on an increase in the pressure of the liquid in the chamber 50 between the piston 40 and the member 32. A passage 53 formed in the member 32 connects the chamber 50 with the area at the end of the output shaft 12 so that oil under pressure may be supplied to or released from the chamber 50 through a passage in the output shaft 12, as hereinafter explained. Packing 54 is mounted in a groove in the output shaft 12 to prevent escape of oil under pressure between the shaft 12 and the member 32.

The direct drive or lock-up clutch 13 includes a driven plate 55 of conventional construction and having a hub splined on the end of the output shaft 12, while the peripheral portion of the driven plate 55 extends between the piston 40 and the pressure plate 43.

The front pump section 22 of the transmission housing is a substantially circular member which is detachably secured by a plurality of cap screws 60 against a flat face on the housing section 20 at the rear of the flywheel and torque converter chamber. The housing section 22 has detachably secured thereto by means of cap screws 62 the ground sleeve member 63 of the torque converter. The ground sleeve member 63 has a relatively large diameter flange which is attached to the housing section 22, and has a relatively long cylindrical sleeve portion which extends through the central opening in the housing section 22 and projects into the torque converter chamber in the housing section 20.

The front pump section 22 and the ground sleeve member 63 cooperate to form a forward wall which extends transversely across the transmission housing and is provided with a substantially central opening through which the output shaft 12 extends.

The free end of the sleeve portion of the ground sleeve member 63 is externally splined and has mounted thereon the internally splined inner race member 64 of the overrunning clutches 65 and 66 associated with the stators 67 and 68 of the torque converter. Each of the stators 67 and 68 has associated therewith the outer race of the associated overrunning clutch. The overrunning clutches 65 and 66 may be of any well-known construction and operate to permit the stators 67 and 68 to turn relative to the ground sleeve 63 in the same direction as the flywheel 27 and the torque converter driving element 31, and to lock the stators 67 and 68 to the ground sleeve 63 so as to prevent rotation of the stators in the direction opposite to that of the flywheel 27 and of the torque converter element 31.

A thrust washer 70 is mounted between the radially inner portion of the converter element 31 and the stator 68, and a similar thrust washer 71 is mounted between the radially inner portion of the converter driven element or turbine 72 and the stator 67, while a similar thrust washer 73 is mounted between the stators 67 and 68. The hub portions of the stators 67 and 68, which are engaged by the thrust washers, are slightly longer than the axial length of the overrunning clutches so that the overrunning clutches operate freely without interference by the thrust washers. The thrust washers 70 and 71 are held on the inner race member 64 by lock rings 74 and 75.

The torque converter driven member 72 has secured thereto a hub 76 which has internal splines and is adapted to be received by the splined end on the sleeve portion 80 of the drum 81 of the planetary unit 15. The hub 76 is formed of suitable material, such as steel, and has a flange which is secured to the body of the torque converter driven element 72 by rivets 77 located radially outwardly of the surface engaged by the thrust washer 71. A seal ring 78 is mounted in a groove in the splines on the member 80 and restricts flow of liquid from the area between the torque converter elements 31 and 72 to the area within the member 80. Hence, liquid under pressure supplied as hereinafter explained to the area outwardly of the ground sleeve 63 flows to the area between the hub portions of the torque converter members 31 and 72, and then flows radially outwardly over the faces of the thrust washers 70, 71 and 73 to the radially outer portion of the torque converter.

The torque converter driving element 31 has secured thereto a hub member 83 having a sleeve portion of such diameter as to surround the ground sleeve 63 and to be spaced therefrom a short distance. The hub member 83 has a flange which is secured to the torque converter element 31 by a plurality of cap screws 84, while the sleeve portion of the hub member 83 is supported from the transmission housing section 22 by a bushing 85 which also serves as a seal to prevent the escape of liquid from the torque converter supply passage through the joint between housing member 22 and the hub member 83. A gasket 82 is clamped between the members 31 and 83. As shown in FIGURE 2a of the drawings, the torque converter supply passage 354 leading from the control valve 19 is formed in the front pump section 22 and opens to the groove between the bushing 85 and the front pump 16, while the hub 83 has a plurality of openings therein so that liquid supplied through the passage may flow to the area within the hub 83 and thence to the area within the torque converter. A shaft sealing unit 86 of a conventional design is supported by the housing member 22 so as to surround the hub member 83 at a point intermediate the bushing 85 and the torque converter, while the area between the bushing 85 and the shaft seal 86 is connected by a drain passage 87 with the oil sump provided by the cover plate 23.

The front or engine driven pump 16 is of a well-known construction, and as shown in FIGURE 2a of the drawings, the pump comprises an internal gear 90 driven by a helical gear 91, the gears 90 and 91 being mounted in a chamber formed by the housing section 22 and the ground sleeve member 63, and being separated throughout a portion of their circumference by an arcuate baffle 92. The inlet port of the pump 16 is connected through a passage, not shown, formed in the transmission housing sections 20 and 22 with the sump or reservoir provided by the bottom cover plate 23, while the discharge or exhaust port, not shown, of the pump 16 is connected through another passage formed in the transmission housing sections 20 and 22 with the control valve 19. The spur gear 91 of the front pump 16 is mounted on the end of the sleeve portion of the hub member 83, the gear 91 and the hub member 83 having inter-engaging driving means so that the hub member 83 drives the gear 91. The hub member 83 is secured to the torque converter driving element 31 which is secured to the engine flywheel 27 so that the hub member 83 drives the gear 91 of the front pump 16 whenever the vehicle engine operates, and causes the gear 91 to turn at the same speed as the engine.

The rear or output shaft driven pump 17 is similar in construction to the pump 16 and has an internal gear 96 driven by a spur gear 97, the gears 96 and 97 being mounted in a chamber formed by plates 95 and 98 which are secured to the transmission housing section 21. The gears 96 and 97 are separated throughout a portion of their circumference by an arcuate baffle 99. The gear 97 is splined internally and is mounted on a splined portion of the output shaft 12 so that the gear 97 is driven by the output shaft and operates at the speed of the output shaft. The inlet port of the rear pump 17 is connected with the sump or reservoir through a passage, not shown, formed in the transmission housing section 21 and 20. In addition, as hereinafter explained, the inlet port of the pump 17 is also connected to the outlet port of the engine driven pump 16. Similarly, the exhaust or discharge port of the rear pump 17 is connected with the control valve 19 by another passage, not shown, formed in the transmission housing sections 21 and 22. Though the front and rear pumps are directly driven by the input and output shafts respectively, they may be operated synchronously, to wit at the same or proportional speed, with the respective shafts.

The gear or rotor 103 of the parking brake 18 is secured on the splined portion of the output shaft 12 directly in front of the rear pump 17, the gear 103 being secured against axial movement on the shaft 12 by lock rings 104.

The output shaft 12 is supported from the transmission housing section 21 by a ball bearing 106. The outer race of the ball bearing 106 is secured between a housing section member 107 and the housing section 21, while the inner race of the ball bearing 106 is secured between a lock ring 108 and a sleeve on the shaft 12. Hence, axial movement of the ball bearing 106 relative to the housing section 21 is prevented, and axial movement of the shaft 12 relative to the ball bearing 106 is prevented, so the ball bearing 106 serves to prevent axial movement of the shaft 12.

The planetary unit 15 of the transmission includes the drum 81, a front planet carrier assembly indicated generally by the reference numeral 112, a rear planet carrier assembly indicated generally by the reference numeral 113, a sun gear unit 114, a low speed or sun gear brake device indicated generally by the reference numeral 115, and a reverse or rear planet carrier brake device indicated generally by the reference numeral 116.

As previously explained, the drum 81 has a sleeve portion 80, this sleeve portion being of such diameter and length as to extend through the ground sleeve 63. The forward end of the sleeve portion 80 of the drum 81 has secured on the splined portion thereof the torque converter output or driven element 72 so that the drum 81 is driven from the engine through the torque converter. The sleeve portion 80 of the drum 81 surrounds the output shaft 12, the inner diameter of the sleeve portion 80 being such that the surface of the bore in the sleeve portion is spaced a short distance from the surface of the output shaft. The output shaft 12 has thereon a relatively long shoulder 118 which is of such diameter as to closely fit within the bore in the sleeve 80 and thereby restrict the escape of lubricant from the torque converter chamber through the area within the sleeve 80.

The sleeve portion 80 of the drum 81 is supported from the ground sleeve 63 by spaced bushings 120, while a thrust washer 121 is mounted between the flange on the ground sleeve 63 and the forward face of the drum 81.

The drum or planetary input unit 81 has formed on the inner face thereof adjacent the closed end of the drum, the teeth of a first ring or orbit gear 123, and also has formed on the inner face thereof adjacent the open end of the drum, the teeth of a second ring or orbit gear 124. The gear 123 is somewhat smaller in diameter than the gear 124 so that the tips of the teeth of the gear 124 are located radially outwardly of the bottoms of the spaces between the teeth of the gear 123.

The gears 123 and 124 are helical gears, the teeth of each of these gears being arranged so that the end of each tooth toward the closed end of the drum 81 is rotatively in advance of the opposite end of the tooth, assuming that the drum 81 rotates in the customary direction, that is in the clockwise direction as viewed from the end towards the engine.

The drum 81 rotates in a substantially cylindrical chamber formed in the transmission housing section 20, the various parts being arranged and proportioned so that when the drum 81 passes the thrust washer 121 firmly against the ground sleeve member 63, the end face of the wall of the drum at the open end of the drum is spaced a short distance, such as one-sixteenth of an inch, from an annular surface 125 formed on the housing section 20. The chamber in which the drum 81 is mounted is open to the sump through holes, not shown, in the bottom wall of the chamber so that oil escaping from the drum 81 may freely flow from this chamber to the sump.

The front planet carrier assembly 112 comprises a carrier member 130 having an internally splined hub portion mounted on counterpart splines on the output shaft 12. The member 130 has adjacent its periphery spaced annular portions which are joined at intervals by integral web portions, the forward annular portion being integral with the hub portion of the member. The annular peripheral portions of the member 130 have therein three sets of aligned openings at points uniformly spaced apart circumferentially of the member. Each set of openings has secured therein a pin 131 on which there is mounted a planet gear 132, each planet gear being supported by a suitable needle roller bearing. Thrust washers 133 are located at the ends of each planet gear, while each of the pins 131 may be held in position by a shoulder on one end of the pin and by heading over the other end of the pin. As is clearly shown in FIGURE 2a of the drawings, the planet gears 132 mesh with the ring gear 123, and also with a sun gear 136 formed on the sun gear unit 114.

The hub portion of the carrier member 130 extends between or within the planet gears 132 substantially the entire axial extent of the planet gears and supports the planet gears 132 from the shaft 12 in the plane of the ring gear 123 so that the planet gears 132 are accurately held in alignment with the ring gear 123 and will run quietly.

A thrust washer 134 is located between the carrier member 130 and the drum 81, while a lock ring 137 limits movement of the carrier member 130 on the output shaft 12.

The sun gear unit 114 is a tubular member surrounding the output shaft 12, the internal diameter of the sun gear unit 114 being slightly larger than the external diameter of the output shaft 12 throughout most of the length of the sun gear unit. The internal diameter of the forward end of the sun gear unit 114 is larger than the internal diameter of the remainder of the sun gear unit and has therein a cylindrical bore which operates on the outer diameter of the hub portion of the carrier member 130 of the front planet carrier assembly 112.

The forward end of the sun gear unit 114 is of relatively large diameter and has formed on the exterior thereof the helical sun gear 136, the teeth of which mesh with the planet gears 132 associated with the front planet carrier assembly 112. The sun gear 136 is a helical gear and the gear teeth are arranged so that the end of each tooth at the forward or left-hand end of the gear is rotatively in advance of the opposite end of the tooth, that is so that the gear 136 has a left-hand helix angle.

The rearward end of the sun gear unit 114 extends through and is supported in a bore in the central portion of the diaphragm member 140 which is rigidly supported from the transmission housing section 20, and is in effect a wall extending transversely across the transmission housing. The diaphragm member 140 is constructed of material, such as aluminum, which provides a good bearing surface and the central portion of the member 140 is of substantial axial extent so that the rear end of the sun gear unit 114 is rigidly supported.

The rear planet carrier assembly 113 comprises a carrier member 141 having spaced annular portions connected at intervals by integral web sections and having therein a plurality of sets of aligned holes in which there are mounted pins 142. Each of the pins 142 has mounted thereon a planet gear 143 which is supported on the pin by a suitable needle roller bearing. Each of the pins 142 is held in position in the carrier member 141 by heading over the projecting ends of the pin, while thrust washers 144 are mounted between the ends of each planet gear 143 and the faces of the sides of the carrier member 141. The planet gears 143 are somewhat larger in diameter than the planet gears 132 and mesh with the ring gear 124 on the drum 81 and also with a sun gear 147 formed on the sun gear unit 114.

The forward portion of the carrier member 141 has a hub portion having therein a bore which runs on a bearing surface formed on the sun gear unit 114. This bearing surface on the sun gear unit 114 is of smaller diameter than the sun gear 136, but of larger diameter than the remainder of the sun gear unit.

The rear portion of the carrier member 141 has a hub portion having therein a bore which runs on a bearing surface formed on the sun gear unit 114, while the sun gear unit 114 has formed thereon between the bearing surfaces engaged by the carrier member the teeth of the sun gear 147 which meshes with the planet gears 143 of the rear planet carrier assembly 113. The sun gear 147 has helical teeth, each of which is arranged so that the end thereof adjacent the sun gear 136 is rotatively in arrears of the opposite end of the tooth. It will be seen that the second carrier member 141 is supported from the sun gear unit 114 on opposite sides of the sun gear 147 with the result that the planet gears 143 are rigidly and accurately supported and will operate quietly.

The elements of the low speed or sun gear brake device 115, and of the reverse or rear planet carrier brake device 116, are mounted in a bore in the transmission housing section 20, this bore being substantially concentric with the sun gear unit 114 and the output shaft 12. The principal portion of this bore is cylindrical, but the bore has at the forward end a conical portion having a conical surface 150, the larger end of which is towards the rear of the transmission housing, the conical surface 150 being separated from the remainder of the bore by a narrow shoulder 151.

The transmission housing section 20 has drilled therein a hole which extends into the shoulder 151, the center of this hole being located a short distance radially outwardly of the face of the cylindrical surface of the bore in the housing section 21 so that the hole forms a groove in the wall of this bore. This hole is of relatively small diameter so that the hole does not extend into the conical surface 150. A locating pin 152 is mounted in the hole in the housing section and is of such length as to extend substantially to the joint between sections 20 and 21, while the pin 152 is of such size that a portion of the pin is located radially inwardly of the face of the cylindrical bore in the housing section 20.

The elements of the low speed or sun gear brake device 115 include a cup 155 of such external diameter as to closely fit the cylindrical bore in the housing section 20, this cup having a conical inner surface 156, the cup being mounted in the housing 20 so that the end of the surface 156 of larger diameter is towards the front of the transmission.

The diaphragm 140 is mounted in the bore in the housing section 20 in front of the cup 155, while a thrust diaphragm 157 is located in front of the diaphragm 140. The thrust diaphragm 157 is in the form of a Belleville washer and engages the shoulder 151. The various parts of the equipment are proportioned so that the cup 155 projects from the rear face of the housing section 20 a short distance and is received by a bore in the front face of the housing section 21 so that the cup 155 serves to align the transmission housing sections 20 and 21. A sealing ring 159 is located between the cup 155 and the housing section 21, and the various parts are proportioned so that when the housing sections 20 and 21 are secured together, the thrust diaphragm 157 is rigidly held against the shoulder 151. Each of the diaphragms 140 and 157, as well as the cup 155, has a notch or recess in its periphery which is adapted to receive the portion of the pin 152 which extends within the cylindrical bore in housing section 20 so that the pin 152 prevents rotation of the diaphragms 140 and 157 and the cup 155 in the housing. The pin 152 also serves to accurately position the diaphragm 140 rotatively relative to the housing section 20 so that passages in the diaphragm 140 register with passages in the housing section 20. The area at the forward face of the diaphragm 140 is vented to the sump through an opening, not shown.

The rear end of the sun gear unit 114 projects through the diaphragm 140. The projecting end of the sun gear unit 114 is splined and has mounted thereon the cone 162 of the sun gear or low range brake device 115. The cone 162 comprises an internally splined hub portion having a conical peripheral flange, the outer surface of which is of substantially the same size and shape as the surface 156 on the cup 155 so that the cone 162 will engage the surface 156 on the cup 155 throughout the circumference of the cup 155 and also throughout the entire axial extent of the surface 156. As hereinafter explained, the cone 162 is movable axially towards and away from the cup 155. The various parts of the equipment are arranged and proportioned so that when the cone 162 is moved away from the cup 155 the maximum amount, the outer surface of the cone 162 is spaced from the inner surface 156 of the cup 155 only a relatively small distance, on the order of a few thousandths of an inch.

The surface of the conical surface 156 on the cup 155 is coated with a suitable friction material, such as sintered bronze, while the surface of the cone 162 is finished steel or iron alloy.

The diaphragm 140 has on its rear face a centrally located bore adapted to receive the hub of the cone 162 of the sun gear brake device.

The external face of the hub portion of the cone 162 is surrounded by a groove in which there is mounted a packing ring 188 to prevent flow of liquid from the chamber 163 through the joint between the hub of the cone and the face of the bore in the diaphragm.

The sun gear unit 114 has therein a groove in which there is mounted a sealing ring 165 which engages the face of the bore in the hub portion of the cone 162 and serves to prevent flow of liquid from the chamber 163 through the joint between the sun gear unit and the cone.

The splines on the interior of the cone 162 extend only a portion of the length of the hub of the cone, and the ends of the splines on the cone form a shoulder which is engaged by the left-hand end of the splines on the sun gear unit. Hence, on axial movement of the sun gear unit 114 to the right, as viewed in FIGURE 2b of the drawings, force is transmitted from the sun gear unit 114 to the cone 162 to press the cone to the seated position. A snap ring 166 secures the cone 162 on the sun gear unit.

The diaphragm 140 has on its forward face an annular bore in which there is mounted an annular piston 170. The piston has in its periphery a groove in which there is mounted a packing ring 171 which serves to prevent escape of fluid around the periphery of the piston from the chamber 172 between the piston and the diaphragm 140. The central portion of the diaphragm 140 has therein a groove in which there is mounted a packing ring 173 which is engaged by the piston 170 in all positions of the piston and serves to prevent escape of fluid from the chamber 172.

The piston 170 has on the forward face thereof a narrow annular shoulder 174 which is engaged by the radially inner portion of the thrust diaphragm 157.

The thrust diaphragm 157 is in the form of a Belleville washer and is constructed from a disc of sheet steel. The diaphragm 157 has therein a plurality of slots extending radially outwardly from the central hole in the diaphragm so that there are formed a plurality of arms joined together at their outer ends. The diaphragm 157 is formed so that when no force is exerted on the diaphragm, its central portion is offset a small amount, such as ¼ of an inch, to the rear relative to its peripheral portion. As a result, the central portion of the diaphragm exerts force tending to move the piston 170 towards the diaphragm 140, while on movement of the piston 170 by fluid under pressure in the chamber 172, the force exerted by the diaphragm 157 and opposing the piston gradually increases.

The diaphragm 157 has two small holes therein located near the outer edge of the diaphragm. Pins 176 extend through these holes and also through holes in the inner element 180 of the rear planet carrier brake device 116. The ends of the pins 176 are riveted over to secure the diaphragm 157 and the element 180 together. The element 180 is an annular ring having a conical outer face adapted to engage the conical inner face of the cone 181 of the reverse brake device 116. The rear face of the element 180 has thereon adjacent its radially inner edge a narrow shoulder 182 which is engaged by the forward face of the diaphragm 157.

The cone 181 has a conical outer surface which is adapted to engage the conical surface 150 formed on the transmission housing section 20. The small end of the cone 181 is splined internally, these splines being received by counterpart splines on the outer face of the carrier 141 of rear planet carrier asesmbly 113 so that the cone 181 rotates with the carrier 141, but so that the carrier 141 and the cone 181 may move axially relative to each other. The forward face of the element 180 is located adjacent the rear face of the carrier 141 and is engaged by the carrier on rearward axial movement of the carrier. The various parts of the transmission are proportioned so that on movement of the carrier 141 towards the rear, the rear face of the carrier 141 engages the element 180 and moves the element 180 away from the cone 181. Hence, the element 180 is moved away from the cone 181 on initial rearward axial movement of the carrier 141.

On the supply of liquid under pressure to the chamber 172, the shoulder 174 on the piston 170 presses against the radially inner portion of the diaphragm 157 to press against the shoulder 182 on the element 180 and thereby exert force to press the element 180 against the cone 181 and to press the cone 181 against the surface 150 on the transmission housing section 20. The force exerted by the piston 170 is multiplied by lever action in the diaphragm 157 since the radially inner portion of the diaphragm 157 moves farther than the portion of the diaphragm engaged by the shoulder 182 on the element 180. Hence, with liquid at moderate pressure in the chamber 172, relatively great force is exerted by the piston 170 to clamp the cone 181 between the element 180 and the surface 150. As previously explained, the thrust diaphragm 157 is secured against rotation by the locating pin 152, while the pins 176, assisted by frictional engagement between the diaphragm 157 and the shoulder 182 on the element 180, prevent rotation of the element 180 relative to the diaphragm 157. When the cone 181 is clamped between the non-rotating surfaces on the housing and on the element 180, the cone 181 is prevented from turning and holds the carrier 141 stationary.

When rotation of the rear planet carrier 141 is arrested by the cone 181, and the drum 81 is driven by the engine, the planet gears 143 are driven by the ring gear 124 with the result that the planet gears 143 rotate on the pins 142 and cause the sun gear unit 114 to rotate in the opposite direction to the drum 81, and at a relatively high speed. At this time, the ring gear 123 exerts force on the planet gears 132, tending to drive the carrier 130 on the front planet unit 112 in the same direction as the drum, but the gear 136 of the sun gear unit 114 exerts force on the planet gears 132 to drive the carrier 130 in the opposite direction. The relative sizes of the ring and sun gears of the rear and front planet units are such that when the carrier 141 of the rear planet unit is held by the associated brake device, the planet gears of the front planet units are driven in the reverse direction by the sun gear unit at a more rapid rate than they are driven in the forward direction by the ring gear 123. Hence, the carrier 130 of the front planet unit turns in the direction opposite to the drum 81 and at a rate determined by the difference in the speeds of the two driving forces exerted on the planet gears 132. As the carrier 130 is splined on the output shaft 12, reverse rotation of the carrier 130 causes reverse rotation of the output shaft 12.

When the sun gear unit 114 is driven by the planet gears 143 of the rear planet unit 113, a forward axial thrust is developed on the planet gears 143 and these gears exert forwardly directed force on the carrier 141 so that this carrier tends to move away from the cone 181 and does not interfere with engagement of this cone with the transmission housing, nor with engagement of the member 180 with the cone 181.

In addition, when the rear planet carrier 141 is held by the associated brake device and the drum 81 is driven by the engine, force is exerted to urge the sun gear unit 114 forwardly, while the sun gear unit 114 exerts force through the lock ring 166 to draw the cone 162 of the low speed brake device 115 away from the surface 156 on the cup 155. Forward movement of the sun gear unit 114 is limited by engagement of the forward face of the hub portion of the cone 162 with the diaphragm 140.

As engagement of the rear planet carrier brake device 116 to effect reverse drive causes the sun gear unit 114 to move forward axially, and thus move the cone 162 of the low speed brake device 115 away from the cup 155, the low speed brake device 115 is certain to be disengaged when the reverse or rear planet carrier brake device 116 is engaged.

As a result of engagement of the helical teeth of the ring gears 123 and 124 with the planet gears, a forwardly directed axial thrust is exerted on the drum 81 to press the thrust washer 121 against the surface on the member 63 with the result that the annular surface surrounding the open end of the drum is spaced from the surface 125 on the housing section 20. Hence, lubricant supplied to the interior of the drum 81 may escape therefrom and will not interfere with rotation of the planet gears and carriers.

The diaphagm 140 has formed therein passages through which liquid under pressure may be supplied to and released from the brake devices 115 and 116, and a passage through which lubricant under pressure may be supplied to portions of the transmission. The passages in the diaphragm 140 register with connecting passages in the wall of the transmission housing section 20 and leading from the control valve 19.

Referring to FIGURE 2b of the drawings, it will be seen that the diaphragm 140 has therein a passage 185 leading to the chamber 163 at the face of the hub of the cone 162. A branch 185a of this passage has restricted flow capacity and is connected to the chamber 164 between the diaphragm 140 and the portion of the cone 162 outwardly of the hub.

In operation, liquid under pressure supplied through the passage 185 flows to the chamber 163 at the face of the hub of the cone 162 and increases the pressure of the liquid in this chamber with the result that force of appreciable magnitude is exerted on the end of the hub of the cone to move the cone away from the diaphragm 140 and press the outer face of the cone against the face 156 of the cup 155. During this movement toward engagement of the cones, because of the leakage at the cones and/or the high rate of expansion of chamber 164, insufficient fluid is supplied by restricted passage 185a to chamber 164 to create a pressure in chamber 164. This substantially seals the joint between the cone 162 and the cup 155 and prevents escape of liquid from the chamber 164 around the cone 162 to the area 167 at the opposite face of the cone which is constantly open to the sump. Accordingly, after movement of the cone 162 into engagement with the cup 155, the chamber 164 is sealed and the rate of expansion of chamber 164 is reduced. Then the oil supplied slowly through the restricted passage 185a to the chamber 164 gradually increases the pressure of the fluid in this chamber and correspondingly gradually increases the force effective to hold the cone in engagement with the cup 155 for soft engagement.

As heretofore explained, the cup 155 is secured by the pin 152 against rotation in the transmission housing section 20. Accordingly, when the cone 162 is pressed against the cup 155, the cone 162 is prevented from rotating, and as the cone is splined on the sun gear unit 114, when the cone 162 is held stationary, the sun gear unit 114 is prevented from turning.

When the cone 162 secures the sun gear unit 114 against rotation, and the sun gear unit is serving as reaction member so that power is transmitted from the engine through the front planet carrier assembly 112 to the output shaft 12, the helical teeth on the planet gears 132 of the front planet carrier and on gear 136 of the sun gear unit cause force to be exerted on the sun gear unit 114 tending to move the sun gear unit axially towards the rear of the transmission and thus cause the sun gear unit 114 to exert force on the cone 162 to press the cone 162 against the cup 155. The force exerted by the sun gear unit 114 on the cone 162 varies in accordance with the power transmitted to the output shaft 12, so the degree of engagement of the sun gear or low speed brake device 115 is increased in accordance with increases in the force required to hold the sun gear unit 114.

Although this invention is not limited to a specific value of force exerted on the cone 162 by the axial thrust of the sun gear unit 114, in a preferred design the force exerted on the cone 162 by axial thrust of the sun gear unit 114 at times when torque of maximum value is transmitted through the front planetary unit 112 is approximately twice as great as the force exerted on the cone 162 by liquid under pressure in the chambers 163 and 164. The force exerted on the cone 162 by axial thrust of the sun gear unit 114 reduces the pressure required to be maintained on the liquid supplied to the chambers 163 and 164, and correspondingly reduces the power required to drive the pumps which supply this liquid. The self-energizing or self-engaging characteristic of the cone 162 helps to seal the joint around the periphery of the cone when liquid under pressure is present in chamber 163 and the liquid pressure is building up in chamber 164.

When the sun gear unit 114 is held by the brake device 115, and the drum 81 is driven by the engine, the carrier 130 is driven in the same direction as the drum 81, but at a somewhat slower speed. As the carrier 130 is splined on the output shaft 12, the shaft 12 is driven at the same speed as the carrier 130.

Although this invention is not limited to any specific gear ratio, in a preferred embodiment of the invention, the ring gear 123 and the sun gear 136 are proportioned so that the ring gear 123 turns about 1.4 times as fast as the carrier 130 when the sun gear 136 is locked.

When the brake device 115 is engaged and the ring gear 123 drives the planet gears 132, a forwardly directed axial force is exerted on the drum 81 so the thrust washer 121 is pressed against the member 63, while the annular surface surrounding the open end of the drum 81 is spaced from the surface 125 on the housing member 20. Accordingly, lubricant supplied to the interior of the drum 81 may freely escape therefrom and will not interfere with rotation of the planet gears and the planet carriers.

As previously explained, the cone 162 is substantially rigidly secured, both axially and rotatively, on the sun gear unit 114. Hence, on axial movement of the cone 162 by liquid under pressure in the chambers 163 and 164, the sun gear unit 114 is moved to the rear.

On release of liquid under pressure from the passage 185, liquid flows thereto from the chambers 164 and 163 and there is a reduction in the pressure on the liquid in the chambers 164 and 163, with a corresponding reduction in the force exerted by the fluid under pressure on the cone 162 to press the cone against the cup 155. On this reduction in the force holding the cone 162 against the cup 155 at a time when the sun gear unit is serving as the reaction member of the front planetary gear unit, there is a reduction in the power transmitted through the front planetary gear unit and a corresponding reduction in the force exerted by the sun gear unit 114 to press the cone 162 against the cup 155. The reduction in the force exerted by the sun gear unit 114 to press the cone 162 against the cup 155 is particularly rapid if at the time liquid is released from the chambers 163 and 164, the direct drive clutch 13 is being engaged so the output shaft 12 drives the carrier 130 of the front planetary gear unit with the result that the function of the sun gear unit 114 as a reaction member is eliminated. On the release of liquid from the chambers 163 and 164 of the sun gear brake device 115, the cone 162 ceases to be pressed against the cone 155 so the cone 162 ceases to prevent rotation of the sun gear unit 114.

As soon as the cone 162 moves out of engagement with the cup 155, liquid in the chamber 164 may escape therefrom around the periphery of the cone 162 to the area 167 and thus to the sump. Hence, as soon as the cone 162 is disengaged from the cup 155, there is a rapid reduction in the force exerted on the cone and there is no danger that the cone will partially engage the cup 155 with resultant wear on the cone and cup when the sun gear unit 114 rotates following engagement of the direct drive clutch 13.

As hereinafter explained in detail, at all times during operation of the vehicle engine, except when the direct drive clutch 13 is engaged, lubricant under pressure is supplied to the chamber within the torque converter. From this chamber lubricant flows through the area between the output shaft 12 and the sleeve portion 80 of the drum 81 and through the port 192 in the carrier 130 to the area within the drum 81, while oil from the torque converter also flows between the shaft 12 and the sun gear unit 114. The restricted area between the shoulder 118 on the shaft 12 and the inner face of the sleeve 80 offers substantial resistance to the flow of liquid from the converter so a substantial pressure is maintained on the liquid in the torque converter and within the sleeve 80. However, a substantial volume of liquid flows from the torque converter, and liquid from the area within the sleeve 80 flows to the area within the drum 81.

Lubricant which flows through the splines on the shaft 12 and on the carrier 130 to the area within the sun gear unit 114, may flow therefrom through the ports 193 and 194 to lubricate the bearings between the sun gear unit 114 and the carrier 141. The oil which flows through the ports 192 and 193, and a part of the oil which flows through the port 194, flows to the interior of the drum 81 and helps to lubricate the equipment within this drum. Lubricant from the area within the sun gear unit 114 also flows through the port 190 to the bearing surface on the diaphragm 140, while lubricant escapes from the area within the sun gear unit through the open end at the rear of this unit.

It will be seen that during operation of the transmission, lubricant under pressure is supplied to the area within the drum 81 through several paths. This lubricant serves to thoroughly lubricate the transmission gears and bearings and normally flows through the open end of the drum 81 and thence to the sump.

When the vehicle is being operated in low gear, that is when the sun gear brake device 115 is engaged, and the vehicle speed exceeds the engine speed, as is the case when the vehicle is descending a steep grade and the engine is being employed as a brake, the reaction of the helical ring gear 123 and the helical planet gears 132 is such that rearwardly directed axial thrust is exerted on the drum 81 with the result that the annular surface surrounding the open end of the drum 81 is pressed firmly against the annular surface 125 formed on the transmission housing section 20. This restricts the flow of lubricant from the area within the drum 81, and on the continued supply of lubricant under pressure to the area within the drum, the drum becomes filled with lubricant and the pressure on this lubricant builds up to an appreciable value, this pressure being dependent upon the pressure of the source from which the lubricant is supplied and also upon the rate of escape of lubricant through the joint between the end of the drum 81 and the annular surface 125, through the splines between the carrier 141 and the cup 181, and also around the periphery of the cup 181.

Under these conditions, the planet gears 132 and 143, and the carriers 130 and 141 rotate, but their movement is substantially resisted by the lubricant under pressure in which they are immersed so these elements substantially augment or supplement the braking force available to retard the vehicle.

It will be seen that this supplemental braking force is developed automatically under the conditions in which this force is desirable, namely, when the low range brake is engaged and the vehicle speed exceeds the engine speed. Similarly, this braking force is automatically discontinued when conditions are such that this force is unnecessary and undesirable.

As soon as the vehicle speed ceases to exceed the engine speed, or when the low range brake device 115 is released, the force exerted on the drum 81 to press the drum against the annular surface 125 is discontinued so the lubricant within the drum 81 escapes to the sump and the gears and carriers within the drum can again rotate freely.

This transmission includes supplemental means for at times retarding rotation of the drum 81 and thereby retarding the vehicle. Referring to FIGURE 2a of the drawings, it will be seen that the main housing portion 20 has adjacent the front pump section 22 a cylindrical bore which is substantially concentric of the output shaft 12. In addition, the flange portion of the ground sleeve member 63 has a cylindrical peripheral face which is spaced a short distance from the face of the bore in the housing section 20, while the rear face of the housing section 22 has therein an annular recess or offset confronting the space between the periphery of the member 63 and the face of the bore in the housing section 20, thus forming an annular chamber 201.

A drag brake member 200 has an annular axially extending portion which is adapted to be received by the annular chamber 201, between the member 63 and the housing section 20. The member 200 also has a radially extending portion which overlies the radially outer portion of the member 63, and has therein a plurality of holes into which extend the locking pins 202, one of which is shown in the drawings. The pins 202 are rigidly secured in aligned holes in the members 22 and 63, and are slidable in the holes in the member 200. The pins 202, therefore, prevent rotation of the member 200, but permit the member 200 to move axially.

The rear face of the radially extending portion of the member 200 confronts the forward face of the drum 81, and is coated with a suitable friction material, such as sintered bronze. The various parts of the apparatus are arranged and proportioned so that when the drum 81 presses the thrust washer 121 against the member 63, and the member 200 is moved the maximum amount to the left, as viewed in FIGURE 2a, the rear face of the member 200 is spaced a short distance from the forward face of the drum 81. An annular spring member 205 is secured against the rear face of the ground sleeve member 63 and has radially outwardly projecting fingers which project beyond the radially inner edge of the drag brake member 200 to yieldingly urge the member 200 to the left.

The peripheral surface of the member 63 has therein a groove in which there is mounted packing 203, while the radially outer face of the member 200 has therein a groove in which there is mounted packing 204. The packing 203 and 204 prevents escape of oil under pressure from the chamber 201 between the member 63 and the end face of the axially extending portion of the member 200. The chamber 201 is connected with the control valve 19 by means of a passage 427, not shown in FIGURE 2a, but formed in the housing section 20, and shown in FIGURE 6.

As thereinafter explained the control system of this transmission is arranged to at times supply oil under pressure to the chamber 201. On the supply of oil under pressure to the chamber 201, force is exerted to press the member 200 against the drum 81 and thus press the open end face of the drum against the surface 125 on the housing section 20 with the result that oil is trapped within the drum 81 and retards rotation of the planetary gears and carriers. When the member 200 is pressed against the drum 81, the member 200 is prevented from rotating by the pins 202 and substantial frictional resistance to rotation of the drum 81 is developed between the member 200 and the drum 81. During the periods in which oil under pressure is supplied to the chamber 201 the sun gear unit 114 is locked to the housing so that driving connection is established between the output shaft 12 and the drum 81 through the front planet unit 112. Hence, when the member 200 exerts a retarding force on the drum 81, the movement of the vehicle is retarded.

The output shaft 12 has therein a centrally located passage 195 through which liquid under pressure may be supplied to and released from the chamber 50 of the direct drive clutch 13. The passage 195 opens on the forward end of the shaft 12, and this end of the shaft 12 is connected with the chamber 50. The passage 195 communicates with ports in the shaft 12, while the shaft 12 has on both sides of these ports grooves in which are mounted packing rings 197 which engage the inner face of the bore in the transmission housing section 21 to prevent the escape of liquid under pressure from the passage 195. The transmission housing sections 21 and 20 have formed therein an extension of the passage 195 which connects with the control valve 19.

The control valve 19 is similar in physical construction to the valves customarily employed for this purpose and comprises a metal body secured against the lower face of a wall 208 of the transmission housing section 20. A plate 210 is mounted between the body of the valve 19 and the wall of the housing section. The plate 210 has grooves in its upper and lower faces to provide passages connecting ports in the valve body with passages in the transmission housing section 20.

The control valve 19 includes a valve element 275 which is manually movable to a plurality of different positions including a parking position P, a neutral position N, a high or drive position D, a low position L, and a reverse position R. The control valve 19 also includes a valve element 276 which is controlled in accordance with the position of the vehicle accelerator pedal or the throttle of the vehicle to vary the pressure of the liquid supplied to portions of the control valve, as hereinafter explained, to thereby provide liquid at a pressure which varies in accordance with the torque power demand on the vehicle engine when considered without engine speed and with the power demand when considered with engine speed. Thus the engine throttle provides one form of power demand signal device. This transmission includes lever mechanism for actuating the valve elements 275 and 276, and for also controlling the parking brake.

Referring to FIGURE 3 of the drawings, it will be seen that the transmission housing section 20 has in a side wall thereof at a point above the control valve 19, and in the rear of the rear face of the control valve, a substantially horizontally extending opening in which is mounted a relatively long bushing 215. The bushing 215 is a press fit in the opening in the wall of the housing section. The inner end of the bushing extends beyond the inner face of the wall of the housing section 20, and the outer end of the bushing has a head which engages a locating surface on the outer face of the wall of the housing section.

A sleeve 216 is mounted in the bushing 215, the inner end of the sleeve having welded or otherwise rigidly secured thereto the cam plate 217, one face of which engages the inner end of the bushing 215. The outer end of the sleeve 216 has rigidly clamped thereon the lever or arm 218, the free end of which is adapted to be con- nected by linkage with a manually movable lever on the steering column of the vehicle as shown in FIGURE 1 of the drawings. A sealing ring 220 is mounted in a groove in the head of the bushing 215 and prevents escape of lubricant through the joint between the sleeve 216 and the bushing 215.

The cam plate 217 extends downwardly from the sleeve 216 and has projecting from its inner face a pin 221 which is received by a groove in the end of the valve element 275. When the lever 218 is moved, the sleeve 216 is turned so the cam plate 217 is turned and the pin 221 moves the valve element 275. The various parts are arranged so that the pin 221 remains in the groove in the valve element 275 throughout the entire range of movement of the cam plate 217.

The cam plate 217 also extends upwards from the sleeve 216 and has in its radially outer edge or face a plurality of notches or cam surfaces which cooperate with spring actuated detent means to designate the various positions of the valve element 275, as is clearly shown in FIGURE 4 of the drawings. Referring to FIGURES 3 and 4 of the drawings, it will be seen that the notched surface of the cam plate 217 engages a ball 222 which is located in a bore in the housing section 20 and is pressed against the cam plate 217 by a coil spring 223.

As is best shown in FIGURES 2b and 4 of the drawing, the rear wall of the transmission housing section 20 has extending therethrough a bore, the axis of which is substantially parallel to the axis of the output shaft 12. This bore is located approximately in the horizontal plane of the bushing 216, and is above the lower edge of the forward face of the transmission housing section 21 so that the bore opens into the chamber or area 167 in which the gear 103 of the parking lock 18 is mounted. A bushing 224 is rigidly mounted in the bore in the rear wall of the housing section 20 and has a cylindrical head portion which is located in the chamber 167. A shaft 225 extends through the bushing 224 and has rigidly secured on one end an arm 226, and has rigidly secured on the other end an arm 235. The arm 226 has a generally spherical head 227 which at times is received by a recess 228 in the cam plate 217, as is clearly shown in FIGURE 4 of the drawings. In addition, as is clearly shown in FIGURE 4 of the drawings, the lower wall of the recess 228 is shorter than the upper wall of this recess, and the portion 230 of the cam plate 217 below the recess 228 is of smaller radius than the portion of the cam plate above this recess.

On movement of the cam plate 217 in the counterclockwise direction, as viewed in FIGURE 4, from the position P to the position N, the free end 227 of the lever 226 is lifted up with the result that the end portion 227 of the lever moves away from the axis of the cam plate 217. The various parts of the equipment are arranged and proportioned so that on movement of the cam plate 217 from the position P to the position N the free end of the lever 226 moves far enough from the axis of the cam plate 217 that the lower wall of the recess 228 no longer engages the head 227 of the lever 226 and the portion 230 of the cam plate 217 below the recess 228 is free to move past the head 227 of the lever 226. Hence, the lever 226 is moved during movement of the cam plate 217 from the position P to the position N, but the lever 226 is not moved as a result of movement of the cam plate 217 in the zone between the positions N and R. During movement of the cam plate 217 in the zone between the positions N and R, the portion 230 of the cam plate moves across the surface of the head 227 of the lever 226 without moving this lever.

On clockwise movement of the cam plate 217 to the position N, the relatively long upper wall of the recess 228 engages the head 227 of the lever 226 with the result that on further movement of the cam plate 217 in the clockwise direction to the position P, the cam plate 217 exerts force on the lever 226 to move the lever 226 in the counterclockwise direction as viewed in FIGURE 3 until the lever 226 again extends in a substantially horizontal plane.

The end of the shaft 225 within the chamber 167 has rigidly secured thereto the lever 235. As is best shown in FIGURES 3 and 4 of the drawings, one side face of the lever 235 is engaged by one end of the torsion spring 236, the other end of which engages a lug or projection 237 on a lever 238. One end of the lever 238 is pivotally supported on the bushing 224, and the other end of the lever 238 has pivotally secured thereto by the pin 240, a link 241. The other end of the link 241 is pivotally connected by a pin 242 to the lever 243. The lever 243 is pivotally supported from the transmission housing by a pin 244, and the free end of the lever has a projection 245 which is adapted to be received by one of the recesses between the teeth on the rotor 103. A torsion spring 246 is mounted on the pin 244 and has one end engaging one side face of the lever 243. The other end of the spring 246 engages the exterior surface of the portion of the cone 155 which projects into the chamber 167. The spring 246 exerts force on the lever 243 tending to move the lever in the clockwise direction, as viewed in FIGURE 3 of the drawings, that is to move the projection 245 away from the rotor 103.

The various parts of the equipment are arranged and proportioned so that when the lever 226 extends in a substantially horizontal plane, as shown in FIGURE 3 of the drawings, that is when the lever 226 occupies the position to which it is moved when the cam plate 217 is in the parking position P, the lever 235 exerts force through the torsion spring 236 to move the lever 238 in the counterclockwise direction, as viewed in FIGURE 3. On this movement of the lever 238, the free end of the lever exerts force through the link 241 to move the projection 245 on lever 243 towards the rotor 103. The various parts are arranged and proportioned so that when the projection 245 is received between the teeth on the rotor 103 the axes of the pins 225, 240 and 242 are substantially in alignment. Hence, if the vehicle attempts to move with the result that the rotor attempts to turn and exerts force tending to move the projection 245 on lever 243 away from the axis of the rotor, the lever 243 will be prevented from moving, and substantially no force will be exerted tending to turn the lever 226, or to cause link 241 to pivot. Accordingly, when the cam plate 217 is manually placed in the parking position P, the plate will not be moved from this position because of force attempting to move the vehicle.

On movement of the cam plate 217 out of the parking position P to the neutral position N, the lever 226 is moved in the clockwise direction as viewed in FIGURE 3, and there is corresponding movement of the lever 235. Accordingly, the free end of the lever 235 engages the projection 237 on the lever 238 and moves the lever 238 in the clockwise direction. On this movement of the lever 238, the link 241 pivots and the free end of the lever 243 is drawn away from the rotor 103 so that the projection 245 moves out from between the teeth on the rotor and out of the path of movement of these teeth.

On subsequent movement of the cam plate 217 to the position P, the lever 226 is moved in a counterclockwise direction, as viewed in FIGURE 3, and exerts force through the spring 236 to move the lever 238 in the same direction. On this movement of the lever 238, the pin 240 is moved into alignment with the pins 225 and 242 and the projection 245 on lever 243 is moved towards the rotor 103. If at the time this movement of the cam plate 217 occurs, the position of the rotor 103 is such that the projection 245 cannot enter one of the recesses between the teeth on the rotor 103, movement of the lever 238 will be restricted, and the torsion spring 236 will be stressed. After movement of the cam plate 217 to the position P, the spring 236 will exert force tending to move the lever 238 in the counterclockwise direction, and to move the levers 235 and 226 in the clockwise direction as viewed in FIGURE 3. The various parts are arranged so that when the cam plate 217 has been moved to the parking position P, the ball detent 222 exerts sufficient force to hold the cam plate in this position against the force exerted by the torsion spring 236. Accordingly, the cam plate 217 may be manually moved to the position P at any time and will remain in that position regardless of whether or not the projection 245 on lever 238 enters a recess between the teeth on the rotor.

If the projection 245 does not enter a recess between the rotor teeth at the time the cam plate is moved to the parking position P, the projection 245 will be firmly pressed against the rotor as a result of force exerted by the torsion spring 236. Accordingly, as soon as there is any movement of the rotor 103, the projection 245 on lever 243 will be forced into a recess between the rotor teeth and will thereafter prevent further movement of the rotor until the cam plate 217 is manually moved away from the parking position P.

The cam plate 217 has associated therewith means for preventing movement of the cam plate to the reverse position when the vehicle is moving forward at a speed above a relatively low speed. Referring to FIGURES 4 and 5 of the drawings, it will be seen that the transmission housing section 20 has therein a transverse bore located slightly above and a short distance forward of the bore in which the bushing 215 is mounted.

This bore is formed in an interior wall of the housing section 20 and has mounted therein a plunger 250 which is held in the bore by a pin 251. The plunger 250 is slotted so as to be movable relative to the pin 251. A compression spring 252 extends between the pin 251 and the plunger 250 and urges the plunger upwardly as viewed in FIGURE 5 of the drawings. At times the slotted end of the plunger 251 projects from the end of the bore in the housing section 20 and into the path of movement of the cam plate 217. A chamber 253 is adapted to have liquid under pressure supplied thereto whenever the vehicle is in motion in the forward direction. As hereinafter explained, the pressure of this liquid varies in accordance with the speed of the vehicle and whenever the vehicle speed exceeds a selected relatively low rate, such as five miles an hour, the pressure of the liquid is high enough to move the plunger 250 downwardly as viewed in FIGURE 5 as far as permitted by the pin 251. At other times, the pressure of the liquid in the chamber 253 is at a value less than that required to overcome the spring 252 with the result that the plunger 250 is moved upwardly as viewed in FIGURE 5 so that the lower end of the plunger is moved out of the path movement of the cam plate 217.

As is best shown in FIGURE 4 of the drawings, on movement of the cam plate 217 in the counterclockwise direction towards the reverse position R, the radially extending surface 255 moves adjacent the plunger 250. The various parts of the equipment are arranged so that if the plunger 250 projects from the bore in which it is mounted, the projecting end portion of the plunger will be engaged by the surface 255 on the cam plate 217 before the cam plate can be moved to the reverse position R. This prevents movement of the cam plate to the reverse position when the vehicle is moving forward at a substantial speed. When the plunger 250 is pressed to the right in the bore so that the plunger does not project from the bore, the cam plate 217 will move freely across the end face of the plunger and may be moved to the reverse position R as desired.

As previously stated the control valve 19 includes the valve element 276 which is controlled in accordance with the position of the vehicle accelerator pedal, while the lever mechanism of this transmission includes means for controlling the valve element 276.

Referring to FIGURE 3 of the drawings it will be seen that mounted within the sleeve 216 is a shaft 260, the inner end of which has rigidly secured thereto a curved arm 262 which extends into alignment with the end of the valve element 276. The other end of the shaft 260 extends from the sleeve 216 and has rigidly secured thereto an arm 263 to which is connected linkage leading from the vehicle accelerator pedal as shown in FIGURE 1.

As hereinafter explained, the valve element 276 has associated therewith a spring which presses the valve element against the arm 262. The valve element 276 is moved against this spring when the shaft 260 is turned in one direction by the arm 263, while the valve element 276 is returned by the spring when the shaft 260 is moved in the other direction.

The wall 208 of housing section 20 terminates at a point at one side of the valve 19 so that the chamber in which the drum 81 is mounted is open to the sump and oil discharged from the open end of the drum 81 may freely flow to the sump.

The transmission is supplied with a quantity of lubricant such that when the vehicle is idle the lubricant fills the chamber in the housing section 20 above the bottom cover plate 23 to a level above the lower portion of the drum 81. In addition, the quantity of lubricant supplied to the transmission is such that during operation of the vehicle, the control valve 19 is immersed so that discharge of lubricant from ports in the valve body does not cause foaming of the lubricant.

*Construction of Control Valve Body Assembly*

This transmission includes the control valve which is indicated generally by the reference numeral 19 and comprises a valve body which is secured against a generally horizontally extending wall of the transmission housing section 20. As previously explained, a plate 210 is secured between the valve body and the wall 208 of the transmission housing. The plate 210 has grooves in its faces which provide passages or communication between various ports in the valve body and also between the ports in the valve body and passages in the transmission housing section 20 communicating with the lock-up clutch 13, the low range or sun gear pressure operated control device 115, the rear planet carrier or reverse pressure operated control device 116, the lubricant supply passage 187, the torque converter and the front and rear pumps 16 and 17.

The control valve 19 is in the form of a metal block in which there are a plurality of substantially parallel horizontal bores, some of which extend completely through the body and others of which open on one end only of the valve body. Some of these bores have portions of different diameters. Each bore is surrounded at intervals by grooves to which are connected passages controlled by the valve element mounted in the bore. Selected ones of these grooves and passages are connected to the exhaust or sump. These grooves or passages are designated EX in the drawings. Similarly, the ends of some of the bores are open to the sump through ports designated EX.

Referring to FIGURE 6 of the drawings, it will be seen that the bores in the valve body have mounted therein valve elements, each of which is substantially cylindrical. Where required each valve element has portions of different diameters to fit the bore in which the valve element is mounted. In addition, most of the valve elements have thereon lands which are separated by portions of reduced diameter. The valve body has mounted therein a manual control valve element 275, a throttle or TV valve comprising valve elements 276 and 277, a push-start valve element 278, a main regulator valve 280, a governor valve 281, a shift inhibitor valve 282, a downshift dump valve 283, a primary shift valve 284, a secondary shift valve 285, an upshift timing valve 286, and a part throttle downshift valve 287. In addition, the valve body has associated therewith thermostatic valves 290 and 291, each of which is arranged to open the passage controlled thereby when the bimetallic operaitng member of the valve is below a selected temperature such as 90° F. and to close the passage controlled thereby when the bimetallic operating member is above this temperature. The control valve 19 is mounted in the lower portion of the transmission and is immersed in the oil in the sump. The thermostatic valves 290 and 291 are mounted on the control valve 19 so that the valves 290 and 291 are immersed in the oil in the sump with the result that these valves accurately respond to changes in the temperature of the oil in the transmission.

As previously explained, the manual control valve 275 is manually movable by the control lever on the steering column to one of the other of the plurality of different operating positions. These positions are designated in FIGURE 6 of the drawings by the letters P or parking, N or neutral, D or drive, L or low, and R or reverse. The position of the manual valve is determined by the position of a line intermediate the two lands or flanges adjacent the lower end of the valve.

The throttle element valve 276 has a relatively large head which is engaged by the end of the lever 262 while the throttle valve elements 276 and 277 are urged apart by a coil spring 295. The valve element 277 is hollow and is yieldingly urged away from the top cover plate 296 by a coil spring 297. The valve element 277 has intermediate its ends a portion of reduced diameter through which extend a plurality of holes 298 so that oil under pressure supplied to the groove in this valve element also flows to the chamber containing the spring 297.

The push-start valve 278 is hollow and is yieldingly urged away from the cover plate 296 by a coil spring 300. Similarly, the main regulator valve 280 is hollow and is yieldingly urged away from the bottom cover plate 301 by a coil spring 302. The valve element 280 is urged to a position in which a shoulder on the valve element engages a shoulder on the valve body, and when the valve element is in this position it engages a projection on the end of the push-start valve 278 and limits movement of the push-start valve by the associated spring. The spring 302 is much stronger than the spring 300 so the valve 280 is not moved against the spring 302 by the spring 300.

The governor valve 281 is yieldingly urged by a coil spring 303 into engagement with the cover plate 296. The shift inhibitor valve 282 is mounted in a bore in the valve body and is yieldingly urged to one position by a coil spring 304, one end of which engages a flat washer 305 which is loosely mounted in a groove in the valve body surrounding the bore in which the valve element 282 is mounted. A spring 306 engages the other face of the washer 305 and yieldingly holds the downshift dump valve 283 against the cover plate 301.

The primary shift valve 284 comprises a relatively large head on a long stem on which there are a plurality of lands, the land nearest the head being somewhat larger in diameter than the other lands on this valve element. The shift valve 284 is yieldingly urged away from the cover plate 301 by a relatively heavy coil spring 308. Upward movement of the valve element 284, as viewed in FIGURE 6 of the drawings, is limited by engagement of the end of valve stem with the lower face of the secondary shift valve 285. Upward movement of the valve element 285 is limited by engagement of this valve element with the cover plate 296.

The upshift timing valve 286 comprises a valve element having a relatively large head and a relatively long stem. This valve element is yieldingly held in engagement with the cover plate 301 by a relatively long coil spring 310.

The part throttle downshift valve 287 is mounted in a bore in the valve body and is yieldingly urged to one position by a coil spring 315. As hereinafter explained, the valve element 287 is at times movable against the spring 315, but movement of the valve is limited by a projection of small diameter on the valve located within the spring 315.

As is clearly shown in FIGURE 6 of the drawings, the inlet port of the engine driven pump 16 is constantly connected to the sump through a passage 314, while the outlet passage of the pump is connected by way of a passage 316 with a groove or chamber 340 in the valve body intermediate the primary regulator valve 280 and the push-start valve 278.

The inlet port of the rear or output shaft driven pump 17 is connected by way of a passage 317 with a port of the primary regulator valve 280, while the discharge port of the pump 17 is connected by the passage 318 with the push-start valve 278. A branch of the passage 318 leads to a chamber of the reverse blocker plunger 250. A branch of the pipe 317 leading to the inlet of the pump 17 is connected through a check valve 320 with the passage 314 leading to the sump. The check valve 320 is arranged to permit oil to flow from the passage 314 to the passage 317 and to prevent flow of oil in the opposite direction.

The mechanism is shown in the condition which it assumes when the manual valve 275 is in the neutral position N, the engine is not running, the vehicle is stationary, and the accelerator pedal is released. As the engine is not running the engine driven pump 16 is not effective to supply oil under pressure so the chamber 340 between the push-start valve 278 and the primary regulator valve 280 is substantially at atmospheric pressure and these valves are moved inwardly by the associated springs. As the vehicle is not in motion the output shaft driven pump 17 does not supply oil under pressure and the governor valve 281 is held in engagement with the cover plate 296 by the spring 303. As the accelerator is released the spring 297 holds the valve element 277 in the position shown in FIGURE 6 so that the passage 321 is open to exhaust through the grooves 322 and 323. Hence, the passage 321 and the connected chambers are at atmospheric pressure. At this time the primary and secondary shift valves 284 and 285 are held in their upper or downshift position, while the timing valve 286 is held in its lower or downshift position.

As shown in FIGURE 6 of the drawings the passage 195 leading to the operating chamber of the direct drive clutch is open to exhaust through the grooves 326 and 327 controlled by the primary shift valve 284. Hence, the direct drive clutch is released. In addition, as shown in FIGURE 6, the passage 185 leading to the operating chambers of the low range brake or pressure operated control device is connected to exhaust through the grooves 330 and 331 controlled by the timing valve 286, passage 332, and grooves 333 and 334 controlled by the manual valve 275. Hence, the low range brake is released. Similarly, as shown in FIGURE 6, the passage 186 leading to the operating chamber of the reverse brake or pressure operated control device is open to exhaust through the grooves 335 and 336 controlled by the manual valve 275.

When the engine is started, the engine driven pump 16 operates and supplies oil under pressure through the passage 316 to the area or chamber 340 between the valve elements 278 and 280. Hence, there is an increase in pressure in the chamber 340 and the valve element 278 is moved against the spring 300 and into engagement with the cover plate 296 so that the land a of valve element 278 opens communication from the chamber 340 to the groove 341. In addition, the land a of valve element 278 cuts off communication between the groove 341 and a groove 342, while land b blocks the branch passage 431 leading from passage 316. The groove 341 has connected thereto a passage 343 which is connected to a groove 344 surrounding the valve element 277. The groove 344 is connected by way of a supply or line passage 345 with a groove 346 surrounding the bore in which the manual valve element 275 is mounted, while a branch of the passage 345 is connected to a groove 347 surrounding the bore in which the valve element 276 is mounted. As long as the manual valve element 275 is in the neutral position, its land a blocks the groove 346 and permits the pump 16 to establish pressure within the system.

On an increase in the pressure of the liquid supplied from the pump 16 to the chamber 340 force is exerted upon the exposed end face of the valve element 280 and moves this valve element against the spring 302 until oil flows to the groove 350 surrounding the bore in which the valve element 280 is mounted. The groove 350 is connected by the passage 317 to the inlet of the output shaft driven pump 17, while a branch of this passage is connected to the groove 352 surrounding the bore in which the primary shift valve 284 is mounted. Another branch of the passage 317 is connected through a choke to the lubricant supply passage 187. When the primary shift valve 284 is in the downshift position as shown, the groove 352 is open to the groove 353 through the area of reduced diameter between the lands b and c on the shift valve. The groove 353 is constantly connected by way of the passage 354 with the interior of the torque converter with the result that oil under pressure supplied by the pump 16 flows to the area within the torque converter and establishes pressure on the oil present therein.

As previously stated a branch of the pipe 317 leads to the inlet port of the pump 17. During normal operation of the engine driven pump, oil under pressure is supplied from the pump 16 to the passage 317, but will not flow through the pump 17 because the gears forming this pump mesh closely and substantially prevent flow of oil through the pump when the pump gears are not rotating. Accordingly, as long as the vehicle is stationary there is substantially no pressure in the pipe 318 leading from the discharge port of the output shaft driven pump 17.

During operation of the vehicle engine with the vehicle stationary oil from the pump 16 flows to the lubricant passage 187 and also to the passage 354 leading to the torque converter. However, if the vehicle engine is operated at a substantial speed the pump 16 will supply more oil than is discharged through these passages, and as a result the pressure in the chamber 340 will increase to a higher value and the valve 280 will be moved against the spring 302 far enough for the upper end of the valve element to open communication from the chamber 340 to a groove 355 which is constantly open to exhaust. This limits the pressure developed on the oil supplied by the pump 16.

As long as the accelerator pedal is released the valve elements 276 and 277 occupy substantially the position in which they are shown in FIGURE 6 of the drawings. At this time a land on the valve element 277 blocks the groove 344 and prevents the flow of oil from the groove 344 to the groove 322. When the accelerator pedal is depressed the valve 276 is moved upwardly, as viewed in FIGURE 6 of the drawings, so that force is exerted through the spring 295 to move the valve element 277 against the spring 297. On this movement of the valve element 277 a land on the valve element uncovers the groove 344, while another land on the valve element cuts off communication between the groove 322 and the groove 323. Hence, oil under pressure from the passage 343 flows from groove 344 to groove 322 and then through the holes 298 in the valve element 277 to the chamber containing the spring 297. In addition, oil supplied to the groove 322 flows to the passage 321 and to the connected passages. One branch of the passage 321 is connected to a groove 356 surrounding the bore containing the valve element 276. This groove is closed by a land of the valve element 276 at all times except when the accelerator pedal is substantially in its fully released position.

The valve element 277 operates in the usual manner to cause the pressure of the fluid present in the chamber containing the spring 297, and in the passage 321, to vary in accordance with the amount of movement of the accelerator pedal away from the released position.

On an increase in the pressure of the fluid in the chamber containing the spring 297 the valve element 277 is moved against the spring 295 so that a land of the valve element 277 cuts off flow of oil from the passage 343 to the groove 322 and thus to the spring chamber. The amount of pressure required to move the valve element 277 against the spring 295 is determined by the amount by which the spring 295 is compressed by movement of valve element 276 and this is determined by the amount of movement of the accelerator pedal away from the released position. Hence, if the accelerator pedal is released after having been depressed, the spring 295 exerts less force upon the valve element 277 with the result that the oil under pressure present in the chamber containing spring 297 moves the valve element 277 farther against the spring 295 so that a land of the valve element cuts off flow of oil from the groove 344 to the groove 322 and permits oil to flow from the groove 322 to the exhaust groove 323. Accordingly, there is a reduction in the pressure of the oil in the chamber containing spring 297 and the valve element will be gradually moved against the spring 297 by the spring 295 until the valve element reaches an intermediate position in which the lands on the valve block the grooves 344 and 323. Hence, the valve element 277 operates to maintain in the chamber containing spring 297, and also in the connected passage 321, fluid at a pressure which varies in accordance with the amount of movement of the accelerator pedal away from the released position. When the accelerator pedal is in the released position the valve element 277 is ineffective to supply oil to the passage 321 and this passage is connected to exhaust through groove 323 so the passage is at atmospheric pressure.

A branch of the passage 321 is connected to the chamber containing the spring 302. Hence, this chamber is filled with oil at a pressure which varies in accordance with the position of the accelerator pedal. The oil under pressure in this chamber exerts force on the valve element 280 to assist the spring 302 in opposing movement of this valve element by oil in the chamber 340. Hence, the pressure maintained on the oil in passages 316, 343 and 345 by the main regulator valve 280 varies in accordance with an accelerator pedal position, but is always maintained at a substantial value by the spring 302.

The valve element 280 is also subject to the pressure of oil in the groove 292 which exerts force tending to move the valve element against the spring 302, thereby reducing the pressure maintained on the oil in the system by the valve 280. As hereinafter explained, oil is supplied to the groove 292 only when the manual valve 275 is in the drive position D, so the oil in the system is maintained at a lower value when the valve 275 is in the drive position D than when the valve 275 is in either the low range position L, or the reverse position R.

In addition, the valve element 280 is subject to the pressure of oil in a groove 293 to which oil is supplied at times from the output shaft driven pump 17 through valve 282. This reduces the pressure maintained on the oil in the system at high vehicle speeds.

It is expected that the major portion of the driving of the vehicle equipped with this transmission will be performed with the manual valve 275 in the drive position D. On movement of the manual valve 275 to the drive position D, the land *b* of the manual valve cuts off communication between the exhaust port 334 and the groove 333, while the land *a* opens communication from the groove 346 to the groove 333. Hence, oil under pressure supplied from the pump 16 to the passage 343, and thence to the passage 345, flows through the manual valve to the passage 332, and thence through grooves 331 and 330 of the upshift timing valve 286 to the passage 185 leading to the low speed brake or pressure operated control device. On an increase in the pressure of the oil in the operating chambers of this device the planetary gears of the transmission are conditioned to establish drive in low range in which the output element of the torque converter drives through the front planet unit to the output shaft of the transmission. A branch of the passage 332 leads to groove 360 surrounding the bore in which the primary shift valve 284 is mounted, but this groove is blocked by the land *a* of the shift valve as long as the shift valve remains in the downshift position as shown in FIGURE 6 of the drawings.

When the manual valve 275 is in the drive position D, its land *b* blocks flow from a passage 307 to exhaust, while oil under pressure flows from passage 345 through the reduced portion between lands *a* and *b* of valve 275 to passage 307 to the groove 292 surrounding a shoulder on the valve element 280. The oil under pressure in this groove exerts force tending to move the valve element against the spring 302, thus reducing the pressure maintained on the oil in the system below the pressure which is maintained when the manual valve is in the low range and reverse positions. In addition, when the manual valve is in the drive position D, oil under pressure supplied through passage 307 to groove 292 flows to the groove or chamber 311 at the upper end face of the shift inhibitor valve 282 and moves this valve against the spring 304 so that the valve establishes communication between grooves 312 and 313 and thus permits oil under pressure supplied by pump 17 to flow to the shift valves 284 and 285.

As long as the vehicle engine operates substantially at idling speed the torque converter is ineffective to transmit sufficient torque to move the vehicle. However, as soon as the speed of the engine increases materially above the idling speed the torque converter causes sufficient torque to be transmitted through the planetary gearing to move the vehicle. As soon as the vehicle moves, the output shaft driven pump 17 operates and supplies liquid to the passage 318, the volume of this liquid varying in accordance with the rate of movement of the vehicle.

As previously explained, oil under pressure is supplied from the engine driven pump 16 to the inlet of the output shaft driven pump 17. The pump 17 is a constant displacement device and causes a fixed volume of oil to be discharged from its outlet port for each revolution of the gears forming the pumps. Hence, the pump 17 is, in effect, a metering device which supplies oil from the pipe or passage 317 to the passage 318 in a volume which varies in accordance with vehicle speed. Oil flows from the passage 318 through an orifice 358 so the pressure on the oil in the passage 318, and in the connected passages, varies in accordance with vehicle speed. When the vehicle is traveling at a substantial rate of speed there is a susbstantial pressure present on the oil in the passage 318, and if the inlet port of the pump 17 were at atmospheric pressure, there would be some leakage or back flow of oil from the passage 318 through the pump to the inlet port. Hence, the volume of oil supplied to the passage 318 might not accurately vary in accordance with vehicle speed with the result that the pressure would not accurately reflect vehicle speed. However, with the arrangement shown in FIGURE 6 in which the inlet port of the output shaft driven pump 17 is supplied with liquid under pressure from the engine driven pump 16 there is a substantially reduced tendency for leakage of oil from the passage 318 to the inlet port of the pump with the result that pressure in the passage 318 accurately reflects vehicle speed.

As previously explained, when the engine is in operation so that the pump 16 runs, oil under pressure in chamber 340 moves the push-start valve 278 against the spring 300 until the valve 278 is in engagement with the cover plate 296. When the valve is in this position the land *a* cuts off communication between the grooves 341 and 342 while communication is open from the groove 342 to the groove 348. Hence, oil flows from the groove 348 through the passage 361 to the chamber 362 at the end face of the governor valve 281. The chamber 362 is constantly open to the interior of the transmission through an orifice 358, while the passage 361 is open to the interior of the transmission housing through the orifice 359 which is controlled by the thermostatic valve 290 so as to be open when and only when the oil in the transmission is below a relatively low temperature, such as 90° F. The thermostatic valve 290, as well as the valve 291, is mounted on the valve body 19 so as to be immersed in the oil in the sump with the result that these valves accurately reflect the temperature of the oil. When the temperature of the oil is relatively low, at which time the oil has relatively high viscosity, the valve 290 is open and oil from the output shaft pump 17 may escape through the orifice 359. This prevents too rapid rise in the pressure of the oil supplied by the output shaft driven pump while the oil is cold.

As the vehicle speed increases there is an increase in the volume of the oil supplied by the pump 17 to the chamber 362 and there is an increase in the pressure of the oil in this chamber so that the valve element 281 is moved against the spring 303. On a sufficient movement of the valve element 281 communication is opened from chamber 362 to the groove 363 which is constantly open to exhaust the orifice 364.

If the pressure of the oil supplied by the pump 17 exceeds the pressure maintained in the chamber 340 and the groove 341 by the primary regulator valve 280, oil from the pump may flow past the ball check valve 430 to the groove 342. This prevents the pressure of the oil supplied by the pump 17 from building up to excessive values at extremely high vehicle speeds. The equipment is arranged so that during operation of the vehicle at speeds below a relatively high rate, the pressure maintained on the oil supplied by the pump 17 is less than the pressure maintained on the oil supplied by the pump 16.

The groove 342 surrounding the push-start valve 278 is connected by way of passage 374 with the groove 312 and when the shift inhibitor valve 282 is in its lower position oil flows from groove 312 to the groove 313 and thence through passage 375 to the chamber at the face of the head of the shift valve 284 outwardly of the land *a*. This chamber is connected by the passage 376 to the chamber at the end face of the valve element 285. Accordingly, it will be seen that on an increase in the pressure of the oil supplied from the output shaft driven pump 17 to the passage 318 and connected passages there is a corresponding increase in the pressure of the oil in the chamber at the face of the head of the shift valve 284 and in the chamber at the face of the shift valve 285, and this oil under pressure exerts force tending to move the shift valve elements 284 and 285 downwardly against the spring 308.

Under normal conditions when the vehicle is in motion the accelerator pedal will be depressed at least an appreciable amount and oil under pressure will be present in the passage 321 and connected passages. The passage 321 is connected to the groove 377 surrounding the bore in which the shift valve element 285 is mounted. As long as the valve element 285 is in its upper or downshift position the groove 377 is open to an area which is connected by passage 380 with the chamber containing the spring 308. Accordingly, as long as the shift valves 284 and 285 are in their upper or downshift position force is exerted on the valves 284 and 285 to maintain them in this position not only by the spring 308, but also by oil from the throttle valve in the chamber containing the spring 308 and in the chamber at the lower face of the valve 285. The oil in the last named chamber also exerts downwardly direct force on the upper end of the land *d*, but the area of this land is small compared to the area of the valve 285. The area beneath the valve 285 is constantly connected by a passage 381 with a groove 382 surrounding the bore in which the upshift timing valve 286 is mounted. The groove 382 is constantly open to exhaust through an orifice 383. The orifice 383 is of relatively small flow capacity and does not cause the pressure in the chambers of the shift valve to fall below the pressure of the oil supplied by the throttle valve as long as the supply of oil to these chambers is maintained.

From the foregoing it is clear that as long as the shift valves 284 and 285 are in the downshift position they are subject to the opposing forces of the oil under pressure supplied by the output shaft driven pump 17, and of the oil under pressure supplied by the throttle valve 277. The oil supplied by the output shaft driven pump 17 exerts force tending to move the shift valves against the spring 308 to the upshift position, while the oil supplied by the throttle valve opposes this movement. Hence, the shift valves tend to be moved to the upshift position on an increase in vehicle speed, but the vehicle speed at which the shift valves move is dependent upon the accelerator pedal position. This invention is not restricted to any specific speeds for shifting, but in a preferred embodiment the shift to direct drive occurs at 18 m.p.h. with the accelerator released, and at 55 m.p.h. with the accelerator adjacent its fully depressed position.

On a suitable combination of condtiions of accelerator pedal position and vehicle speed the shift valves 284 and 285 move to the upshift position in which the head of the valve 284 engages the cover plate 301. On this movement of the shift valves the valve 285 blocks the groove 377, thereby cutting off the supply of oil under pressure from the throttle valve through groove 377 to the chambers of the shift valve. However, as hereinafter explained, after movement of the shift valves to their upshift positions, at low vehicle speeds oil from the throttle valve may be supplied through the part throttle downshift valve to the chambers of the shift valve. The chambers at the faces of the shift valves remain connected to exhaust through passage 381 and orifice 383 so the pressure of the oil in these chambers rapidly reduces to atmosphere when the supply of oil from the throttle or TV valve to these chambers is cut off. Hence, on movement of the shift valve to the upshift position there may be a substantial reduction in the force tending to move the shift valve to the downshift position.

In addition, on movement of the shift valves to the upshift position land *b* of the shift valve 284 cuts off communication between the grooves 326 and 327, thereby cutting off release of oil under pressure from the direct drive clutch. Also, on this movement of the shift valve 284 the land *a* uncovers groove 360 with the result that oil under pressure supplied thereto from the passage 332 flows to groove 360 and thence to groove 326 to which is connected the passage 195 leading to the direct drive clutch. Accordingly, oil under pressure flows to the operating chamber of the direct drive clutch and increases the pressure therein to cause engagement of the direct drive clutch.

On movement of valve element 284 to the upshift position its land *c* cuts off communication between grooves 352 and 353 and thus cuts off the supply of oil under pressure to the chamber of the torque converter. Hence, the pressure of the liquid in this chamber rapidly reduces by escape of oil therefrom and the oil in the torque converter chamber does not oppose movement of the piston of the direct drive clutch.

On an increase of the pressure of the oil in the direct drive clutch there is also an increase in the pressure of the oil in the chamber 366 at the lower end face of the upshift timing valve 286 since a branch of the passage 195 is connected to this chamber. On an increase in the pressure of the fluid in the chamber 366 force is exerted on the valve element 286 to move the valve element against the opposing force of the spring 310. Movement of the valve element 286 is also opposed by oil which is trapped, as explained later, in the chamber 309 containing the spring 310. The chamber 309 containing the spring 310 is constantly open to the sump in the transmission through a passage 385 which is controlled by a ball valve element 386 so that oil may flow from the sump to the spring chamber through this passage, but cannot flow from the spring chamber 309 through the passage 385. It is to be understood that the valve body is mounted in the lower portion of the transmission housing and is immersed in the oil in the sump so that the chamber 309 is normally filled with oil.

The chamber 309 containing the spring 310 is constantly open to the sump through an orifice 387 of restricted flow capacity and the restricted rate of escape of oil through this orifice limits the rate of movement of the valve element 286 against the spring 310. When the valve 286 has substantially completed its movement to the upper position against the spring 310 the land *b* on the valve element blocks the groove 331 to cut off the supply of oil under pressure from the passage 332 to the passage 185 leading to the low speed brake or pressure control device. In addition, on movement of the valve element 286 to this position the land *a* uncovers the groove 388 with the result that oil flows from the passage 185 to the groove 388 and thence to exhaust as the groove 388 is constantly connected to exhaust. Accordingly, the low speed brake becomes disengaged and the vehicle is now driven by torque transmitted through the direct drive clutch. The various parts of the equipment are arranged and proportioned so that the valve 286 does not move against the spring 310 to the position to release the low speed brake until the pressure of the oil in the high speed clutch has built up to a value high enough to cause at least a substantial degree of engagement of the direct drive clutch. Hence, there is certain to be some overlap in the engagement of the low speed brake and of the direct drive clutch during an upshift of the transmission.

The equipment is also arranged so that the degree of overlap of the direct drive clutch and the low speed brake during an upshift is varied under different operating conditions. When an upshift occurs with the throttle substantially closed, as is the case when the vehicle is rapidly accelerated in low range and the accelerator is thereafter released, the degree of overlap is at a minimum. When the throttle is fully released, the valve element 276 establishes communication between the passage 345 and a passage 390 which is connected to a groove 391 surrounding the bore in which the shift valve 284 is mounted. This bore is also surrounded by a groove 392 which is constantly connected to the chamber 393 at the lower face of the head of the valve 286. As long as the shift valve 284 is in the downshift position the groove 391 is blocked and the groove 392 is open to exhaust through the passage 394. However, when the valve 284 is in the upshift position the land *d* blocks the passage 394 and land *c* undercovers the groove 391 so that oil under pressure supplied through the TV valve to passage 390 flows to the chamber 393 and exerts force on the timing valve 286 to move the valve against the spring 310. The force exerted by the oil in chamber 393 supplements the force exerted by oil from the passage 195 acting against the lower end face of the valve 286 and accelerates movement of the valve 286 to its upper position to release oil from the low speed brake. In addition, the oil under pressure supplied to the chamber 393 reduces the pressure which must be established in the direct drive clutch in order to cause movement of the valve 286 to the position to release the low speed brake.

When an upshift occurs with the throttle closed, the vehicle engine will not be operating at a rapid rate, and may be slowing down, so there is less need for overlap of the direct drive clutch and the low speed brake than under other operating conditions.

The chamber 393 is constantly connected to the sump through a passage controlled by a ball check valve 395 which permits oil to flow to the chamber 393 and prevents flow of oil therefrom. Hence, during movement of the valve 286 to the upshift position at times when oil under pressure is not supplied to the passage 390, the movement of the valve 286 is not retarded by the creation of a vacuum in chamber 393.

The equipment is arranged to provide a greater degree of overlap of the direct drive clutch and of the low speed brake during an upshift which occurs with the throttle partially open. This condition is frequently encountered during operation of the vehicle. When the throttle is at least partially open the engine will be operating at a substantial speed and will tend to maintain that speed. When the throttle is at least partially open the valve element 276 cuts off the supply of oil under pressure from the passage 345 to the passage 390 and connects the passage 390 to the exhaust passage 396. Hence, the passage 390 is at atmospheric pressure and the chamber 393 of the timing valve is also at atmospheric pressure. Accordingly, the valve 286 is moved to the upshift position only by the force exerted by the oil under pressure from the direct drive clutch passage 195 in chamber 361 acting on the end face of the valve element. The reduced amount of force exerted on the valve element 286 results in slower movement of the valve element 286 to the upshift position, and also requires an increase in the pressure which must be established in the direct drive clutch in order to move the valve 286 against the spring 310. As a result there is a greater degree of engagement of the direct drive clutch before the low speed brake becomes released. This is desirable as the gradual engagement of the direct drive clutch imposes a gradually increasing load on the vehicle engine and reduces the engine speed to correspond with the engine speed required after full engagement of the direct drive clutch.

The equipment is also arranged so that during an upshift at relatively high vehicle speeds there is comparatively little overlap of the direct drive clutch and the low speed brake. The governor valve 281 is moved against the spring 303 by oil under pressure supplied from the output shaft driven pump 17. The pressure of this oil varies with vehicle speed, and at relatively high vehicle speeds, the valve 281 is moved against the spring 303 far enough for the area of reduced diameter between the lands *a* and *b* to be in registration with the end of the passage 397 leading from the spring chamber 309 of the timing valve 286. When the valve 281 moves to this position oil may escape freely and without restriction from the spring chamber 309 of the upshift timing valve through the passage 397 and thence through the holes 398 in the valve element 281 to the hollow interior of the valve element and to exhaust through the groove 399 which is constantly open to exhaust. The rapid escape of oil from the spring chamber 309 at the face of valve 286 permits the valve to move against the spring 310 at a rapid rate with the result that on the supply of oil under pressure to the direct drive clutch the valve 286 quickly moves to the position to release oil from the low speed brake.

As previously explained, on movement of the secondary shift valve 285 to the upshift position, the supply of oil under pressure from the TV valve through the passage 321 to the chambers of the shift valve is cut off. The control valve assembly includes the part throttle downshift valve 287 which operates to supply oil under pressure from the TV valve to the chambers of the shift valve after direct drive has been established as long as the vehicle speed is below a relatively low rate, such as 30 miles an hour. The valve 287 is biased by a spring 315 to the position to establish communication between the passage 400, which leads from the throttle or TV valve, and the passage 401, which is connected to the groove 402 surrounding the bore in which the upshift timing valve 286 is mounted. When the timing valve 286 is in the upshift position, communication is established between the groove 402 and the groove 382 so that oil supplied from the TV valve through the part throttle downshift valve 287 to the passage 401 may flow to the chambers of the shift valves when the shift valves are in the upshift position. The valve 287 is subject to the pressure of the liquid in a chamber 403 which is constantly connected by a passage 404 to the groove 313 surrounding the shift inhibitor valve 282. As previously explained, when the manual valve is in the drive position, oil from the output shaft driven pump is supplied to the groove 313. Hence, this oil flows to the chamber 403 and exerts force tending to move the valve element 287 against the spring 315. As long as the vehicle speed is less than 30 miles an hour, the pressure of the oil supplied by the pump 17 is insufficient to move the valve 287 far enough against the spring 315 to cut off the flow of oil from the passage 400 to the passage 401. Accordingly, as long as the vehicle speed is less than 30 miles an hour, oil under pressure from the TV valve is supplied to chambers of the shift valve and exerts force tending to move the shift valve from the upshift position to the downshift position.

As long as the shift valve is in the upshift position, the oil under pressure supplied to the direct drive clutch exerts on the differential areas of the lands $a$ and $b$ of the valve element 284 force tending to hold the valve element in the upshift position. Accordingly, after the valve element has been moved to the upshift position, the valve element will remain in that position unless there is a substantial increase in the pressure of the oil supplied from the TV valve, or a substantial decrease in the pressure of the oil supplied by the output shaft driven pump 17.

On a sufficient increase in vehicle speed, the pressure of the oil supplied from the output shaft driven pump 17 is great enough to move the part throttle downshift valve 287 far enough against the spring 315 to cut off the supply of oil from the TV valve to the passage 401. When this occurs, the chambers of the shift valve quickly reduce to atmospheric pressure by flow through groove 382 with the result that there is a substantial reduction in the force tending to move said shift valve to the downshift position, and with the further result that variations in the position of the accelerator do not affect the shift valves.

When the vehicle is operating in direct drive at a relatively low speed, and the accelerator is suddenly opened a substantial amount, the vehicle engine may detonate if the direct drive is maintained. The part throttle downshift valve 287 eliminates this condition by making the shift valves responsive to accelerator pedal position at low vehicle speeds. If the accelerator pedal is depressed so as to open the throttle far enough that there is a possibility that the engine will detonate, the TV pressure will be increased sufficiently to cause the shift valves to move to the downshift position, thereby interrupting the direct drive connection and establishing drive through the torque converter and the gearing. This permits the engine speed to increase and eliminates detonation which might otherwise occur.

On the other hand, at relatively high vehicle speeds there is no danger of objectionable engine detonation if the accelerator is suddenly depressed, and at such times a downshift of the transmission may not be desired. Since the part throttle downshift valve 287 cuts off the supply of oil from the TV valve to the chambers of the shift valve at vehicle speeds above 30 miles an hour, depression of the accelerator pedal at such time will not cause an undesired downshift.

This transmission operates to shift automatically from direct drive to low range drive on a sufficient reduction in vehicle speed. As the vehicle speed decreases the pressure of the oil supplied from the pump 17 decreases and there is a corresponding decrease in the pressure of the oil in the chamber 403 at the end face of the valve 287. When the vehicle speed is less than 30 miles an hour the valve 287 is moved by the spring 315 to the position to establish flow of oil from the passage 400 to the passage 401 and thus to chambers of the shift valve with the result that oil from the TV valve exerts force on the shift valves tending to move the valves to the downshift position. On a subsequent further decrease in the vehicle speed, or an increase in TV pressure, the shift valves move to the downshift position. On this movement of the shift valves the valve 285 opens groove 377 so that the chambers of the shift valve are supplied with oil from the TV valve through passage 321. Also, on this movement of the shift valves the land $d$ on valve 284 opens communication from the groove 392 to the exhaust passage 394 so that oil may flow to exhaust from the chamber 393 of the upshift timing valve 286.

In addition, on this movement of the shift valves to the downshift position the land $c$ of the valve 284 blocks the groove 391 and prevents the supply of oil under pressure from the closed throttle passage 390 to the chamber 393 of the timing valve 286. On this movement of the shift valves the land $c$ of the valve 284 uncovers the groove 352 so that oil under pressure from the passage 317 again flows to passage 354 leading to the torque converter. Hence the torque converter is again charged with fluid under pressure and is conditioned to transmit power.

On movement of the shift valves to the downshift position, the land $a$ of the valve 284 blocks the groove 360 to cut off the supply of oil under pressure to the direct drive clutch, while land $b$ of valve 284 opens groove 327 to permit oil under pressure to escape from the direct drive clutch through passage 405. As a result, there is a reduction in the pressure of the liquid in the passage 195, and there is a reduction in the force exerted on the differential areas of the lands $a$ and $b$ of the valve element 284 so there is a reduction in the force tending to oppose movement of the shift valves to the downshift position.

The exhaust passage 405 has several branches. One of these is constantly connected to exhaust through an orifice 406, and another is connected to exhaust through an orifice 407 which is controlled by the thermostatic valve 291. Another branch of the passage 405 is connected to a groove 408 surrounding the bore in which the downshift dump valve 283 is mounted. The groove 408 is constantly connected by a passage 410 with the groove 411 surrounding the bore containing the throttle valve element 277.

The orifice 406 permits restricted escape of oil from the direct drive clutch at all times. The orifice 407 is controlled by the thermostatic valve 291 and permits restricted escape of oil from the direct drive clutch when and only when the oil in the transmission is below a relatively low temperature, at which time the oil has high viscosity and does not flow freely.

The downshift dump valve 283 is subject to the opposing forces of the spring 306 and of the oil in a chamber 412, to which is connected a branch of the direct drive clutch supply passage 195. The spring 306 is of such value that it moves the valve 283 into engagement with the cover plate 301 to thereby open groove 408 when and only when the pressure of the oil in the direct drive clutch passage 195 is below a selected intermediate value. When the oil in the passage 195 is above this pressure, the valve 283 blocks the groove 408 and thus prevents flow of oil from the passage 405 through the chamber containing the spring 306 and thence to exhaust through the passage 414.

The groove 408 surrounding the bore in which the downshift dump valve 283 is mounted is constantly connected by passage 410 to the groove 411 surrounding the bore containing the valves 276 and 277. In all positions of the valve element 276 except the position occupied by the valve element when the accelerator is depressed more than one-half of the distance towards the full open position of the throttle, the groove 411 is open to the areas between the valve elements 276 and 277. Hence, oil under pressure discharged from the direct drive clutch moves the valve element 277 against the spring 297 and permits oil to flow from the groove 411 to flow to the groove 323 and thence to exhaust.

From the foregoing, it will be seen that at all times except when the accelerator pedal is depressed more than one-half of the distance towards the full open position, oil is released from the direct drive clutch at a relatively rapid rate through the orifice 406 and through the throttle valve. As soon as the pressure of the oil in the direct drive clutch reduces below a selected intermediate value, the downshift dump valve 283 is moved by the spring 306 to open groove 408 and permit oil from the direct drive clutch to escape through the passage 414.

On a reduction in the pressure of the oil in the direct drive clutch, there is a corresponding reduction in the pressure of the oil in the chamber 366 at the lower end face of the upshift timing valve 286 with the result that this valve is moved by the spring 310 to the lower or downshift position. On this movement of the timing valve 286 the land $a$ of the valve cuts off the groove 388, while land $b$ opens groove 331. Accordingly, oil under pressure is supplied from groove 331 to groove 330 and thence through the passage 135 to the low speed brake.

The various parts of the equipment are arranged and proportioned so that the timing valve 286 does not move to the position to establish the supply of oil under pressure to the low speed brake until the pressure of the oil in the direct drive clutch has reduced to a value low enough to substantially completely release the direct drive clutch. The release of the direct drive clutch prior to engagement of the low speed brake permits the vehicle engine to accelerate slightly so that the engine speed will correspond with the vehicle speed after establishment of driving connection through the low speed gearing.

The equipment is arranged so that during a downshift with the throttle fully depressed, that is during a full throttle downshift, initial release of the direct drive clutch will occur at a restricted rate. Under these conditions, the throttle valve element 276 blocks the groove 411 and prevents release of oil from the direct drive clutch through the passage 410. Accordingly, as long as the pressure in the direct drive clutch is high enough to maintain the valve element 283 in the position to block the groove 408, the release of oil from the direct drive clutch is limited by flow through the orifice 406. When the pressure of the oil in the direct drive clutch falls below an intermediate value, the downshift dump valve 283 is moved by the spring 306 to open groove 408 and permit oil to escape from the clutch through the exhaust passage 414. Hence, during a full throttle downshift, initial release of the direct drive clutch occurs slowly and gradually until the degree of engagement of the clutch is reduced to a small value, whereupon the dump valve 283 operates to permit the final release of the direct drive clutch to take place rapidly.

The initial slow release of the direct drive clutch during a full throttle downshift enables the load on the vehicle drive train to be gradually reduced with the result that on final disengagement of the direct drive clutch, little torque is being transmitted through the vehicle drive train. Hence, at the instant the clutch is completely released the vehicle drive train is lightly stressed and there will not be a sudden release of energy stored in the drive train.

The equipment is arranged so that if the vehicle is being operated in direct drive, and the accelerator pedal is thereupon fully depressed, the transmission will downshift from direct drive to low range unless the vehicle speed exceeds a relatively high value. A branch of the direct drive clutch passage 195 is connected to the groove 415 which surrounds the bore in which the throttle valve element 276 is mounted. When the accelerator is depressed almost the maximum amount, the relatively large head portion $c$ of the valve element 276 enters the enlarged section 416 of the bore surrounding the lower end portion of the bore containing the valve element 276. This portion of the bore is open to exhaust through a passage 417. On continued depression of the accelerator pedal, the head portion $c$ of the valve element 276 blocks the passage 417, while the portion of reduced diameter between the head $c$ and land $b$ on the valve element 276 permits flow of oil under pressure from the groove 415 to the area at the face of the head $c$. This oil under pressure exerts force on the differential areas of the portions $b$ and $c$ of the valve element 276 and tends to move the valve element against the accelerator pedal. This increase in the force opposing movement of the accelerator pedal indicates to the operator of the vehicle that further movement of the accelerator pedal may result in downshifting of the transmission. On movement of the valve 276 to the position in which its further movement is opposed by oil under pressure in the chamber 416 the throttle valve of the vehicle engine is adjacent to or substantially in its fully open position.

When the accelerator is depressed far enough to move the valve element 276 beyond the full throttle position, the portion of reduced area between the lands $a$ and $b$ on the valve element 276 establishes communication between the groove 356 and a groove 418 to which is connected a branch of the passage 401. Accordingly, oil under pressure is supplied from the TV output passage 321 to the passage 401 and flows therefrom through the grooves 402 and 382 of the upshift timing valve 286 to the passage 381 and thence to the chambers at the faces of the shift valves 284 and 285. When the throttle valve 276 is in the position to establish communication between the grooves 356 and 418, the spring 295 is compressed the maximum amount and the valve 277 operates to supply oil at a relatively high pressure to the passage 321 so that oil at a relatively high pressure is supplied to the chambers of the shift valve. This oil exerts force tending to move the shift valves to the downshift position and will be effective to cause this movement of the shift valves unless the vehicle is being operated at a relatively high rate of speed so that oil at relatively high pressure is supplied by the output shaft driven pump 17.

It is to be observed that the passage 401 through which oil under pressure is supplied through the part throttle downshift valve, and through the throttle valve in the fully depressed position, to the chambers of the shift valve, is controlled by the timing valve so that supply from this passage to the shift valve chambers is cut off except when the timing valve is in the upshift position. Accordingly, on movement of the shift valve to the upshift position at a time when oil under pressure is supplied to passage 401, the timing valve prevents the supply of oil from passage 401 to the shift valve chambers until the pressure of the oil in the direct drive clutch has built up to a substantial value which is adequate to keep the shift valve in the upshift position. The supply of oil from the TV valve to the shift valve chambers through passage 321 is cut off on movement of the shift valve to the upshift position with the result that the valve moves rapidly since the supply of TV pressure through the passage 401 is not initiated until after pressure is established in the direct drive clutch.

The transmission may be manually placed in low range if desired, but as hereinafter explained, an attempted shift to low range will be ineffective at high vehicle speeds.

When the manual valve 275 is moved to the low range position, the land $a$ on the valve continues to block the flow from the supply groove 346 to the groove 336 leading to the reverse brake, while land $b$ of the valve 275 cuts off the flow of oil from the supply groove 346 to the exhaust groove 334 and also from supply groove 346 to the groove 307a to which is connected the passage 307 leading to the chamber 311 at the upper end face of the shift inhibitor valve 282. In this position of the manual valve 275, the passage 307 is connected to the exhaust groove 334 with the result that the chamber 311 at the face of the shift inhibitor valve 282 is at atmospheric pressure and this valve is held in its uppermost position by the spring 304, unless, as hereinafter explained, the vehicle is being operated at a relatively high rate of speed. Accordingly, the valve 282 prevents the supply of oil under pressure from the groove 312 to the groove 313. The groove 312 is connected to the output shaft driven pump, while the groove 313 is connected to the chambers of the shift valve. When the shift inhibitor valve 282 prevents flow of oil between the grooves 312 and 313, it prevents supply of oil from the output shaft driven pump to the chambers of the shift valve so this oil pressure is not available to move the shift valve to the upshift position. In addition, when the shift inhibitor valve 282 is in its upper position land $b$ of the valve opens communication from groove 313 to the chamber containing the spring 304. This chamber is constantly open to exhaust through the passage 414 so the shift valve chambers exhaust. Accordingly, as long as the manual valve is in the low range position L the shift valves 284 and 285 normally remain in the downshift position to establish low speed.

When the manual valve 275 is in the low speed position L, oil under pressure flows from the supply groove 346 to the groove 333 and thence by way of the passage 332 and the grooves 331 and 330 controlled by the timing valve 285 to the passage 185 leading to the low speed brake. Accordingly, the low speed brake is engaged and the vehicle will be driven through the torque converter and gearing. On an increase in vehicle speed the pressure of the oil supplied by the output shaft driven pump will increase, but normally this oil will be ineffective to cause an upshift since the shift inhibitor valve 282 prevents flow of this oil to the chambers of the shift valve.

When the manual valve 275 is in the low range position L, the land $d$ of the valve cuts off communication between the end of the bore in the valve body and a port 420 as well as a groove 421. At the same time the land $c$ cuts off communication between a groove 422 and the exhaust groove 334, while the area between the lands $c$ and $d$ establishes communication between the groove 422 and the groove 421 as well as the port 420. The groove 422 has connected thereto a branch of the passage 390 leading from a groove surrounding the bore in which the valve element 276 is mounted. As previously explained, oil under pressure is supplied through the valve 276 to the passage 390 when and only when the valve element 276 is substantially in the position which it occupies when the accelerator pedal is fully released.

The groove 421 and the port 420 have connected thereto a passage 424 which is connected to a groove 425 surrounding the bore in which is mounted the governor valve element 281. When the governor valve is in the position in which it is shown in FIGURE 6 of the drawings, which is the position which the valve occupies when the vehicle is standing still or is traveling at a very low rate of speed, the land $c$ on the valve cuts off communication between groove 425 and a groove 426 which is constantly connected by a passage 427 with the operating chamber of the drag brake. The passage 427 is constantly open to exhaust through an orifice 428 so that the operating chamber of the drag brake is at atmospheric pressure unless oil under pressure is supplied thereto as hereinafter explained.

On an increase in vehicle speed above a relatively low rate, the pressure of the oil supplied by the output shaft driven pump is great enough to move the valve element 281 against the spring 303 far enough for the land $c$ to cut off communication between groove 426 and a groove 399 which is constantly connected to exhaust. In addition, on this movement of the valve element 281 the area of reduced diameter between the lands $b$ and $c$ on the valve element 281 establishes communication between the grooves 425 and 426 so that oil under pressure supplied to passage 424 may flow to passage 427 and thence to the operating chamber of the drag brake. As previously explained, oil under pressure is supplied to the passage 424 through ports controlled by the manual valve 275 and by the throttle valve 276. These ports are arranged so that oil under pressure is supplied to the passage 424 when and only when the manual valve is in the low range position L, and then only if the accelerator pedal is substantially fully released. Hence, the drag brake will be applied only when the manual valve is in the low range position, the throttle valve is released, and the vehicle speed is above a selected minimum. If the vehicle is being driven by the engines in low range, the throttle valve 276 will be moved away from the released position and will cut off the supply of oil under pressure to passage 390, and therefore to passage 424, with the result that the drag brake will become released by discharge of oil through the orifice 428. Hence the drag brake will not retard the vehicle when the vehicle is being driven by the engine in low range, but will provide braking effect when the transmission is manually placed in low range and the accelerator is released. This is the condition which exists when the braking effect of the drag brake is desired.

The braking effect of the drag brake may not be desired at relatively high vehicle speeds and the equipment is arranged to prevent application of the brake at such times. At relatively high vehicle speeds, the pressure of the oil supplied by the pump 17 is relatively high and the governor valve 281 is moved against the spring 303 far enough for the land $b$ to block the groove 425, thereby cutting off the supply of oil under pressure to the drag brake. At this time the land $c$ of the governor valve 281 may open in part the groove 399 so that oil may escape from the drag brake to exhaust through the groove 399, but in any event the drag brake will be released by discharge of oil through the orifice 428.

As heretofore pointed out, the manual valve is ineffective to cause a shift to low range at relatively high vehicle speeds. Similarly, the manual valve is ineffective to maintain the transmission in low range if the vehicle speed exceeds a relatively high rate. If the transmission could be shifted to low range while the vehicle is being operated at a relatively high rate of speed, the vehicle engine might be driven at an excessive rate and might be damaged as a result. The transmission control system is arranged to prevent a shift to low range, and to prevent continued operation at low range, if the vehicle speed exceeds a relatively high rate.

As previously pointed out, when the manual valve 275 is in the low range position L, the supply of liquid under pressure to the chamber 311 at the upper end face of the shift inhibitor valve 282 is cut off and this chamber is connected to exhaust. Hence, the valve 282 is normally held by the spring 304 in the position in which the valve prevents flow of oil between the grooves 312 and 313. However, the shift valve 282 has an upper land $a$ of one diameter and a lower land $b$ of larger diameter. When the valve 282 is in its upper position, the area between the lands $a$ and $b$ is open to the groove 312 and this groove is constantly connected to the output shaft driven pump 17 so that oil supplied from the pump 17 exerts force on the differential areas of the lands $a$ and $b$ of the valve 282. The various parts of the equipment are proportioned so that at relatively high vehicle speeds the force exerted by the oil under pressure supplied by the pump 17 will move the valve 282 against the spring 304 and thus permit oil from the pump to flow to passage 375 leading to the chambers of the shift valves. On the supply of this oil under pressure to the shift valves, the shift valves will be moved to the upshift position and the transmission will be shifted from low range to high range.

In like manner, if the shift inhibitor valve 282 is in its lowermost position and the vehicle is being driven in direct drive at high speed and the manual valve is moved to the low range position, the shift inhibitor valve 282 will be held in its lower position by the oil from the pump 17 acting on the differential areas *a* and *b* of the valve. The valve, therefore, will maintain the supply of oil from the pump 17 to the shift valves and will not permit the manual shift to low range to take effect as long as the vehicle is being operated at a high rate of speed.

This transmission is arranged so that a shift to reverse may be made at any time except when the vehicle is moving in the forward direction at a speed in excess of a selected relatively low rate, such as 5 miles an hour. In order to shift the transmission to reverse it is necessary to move the manual valve 275 to the reverse position R. This movement of the manual valve is effected by turning the cam plate 217, FIGURE 4. As previously explained, movement of the cam plate 217 to the reverse position is controlled by the reverse blocker plunger 250 which is subject to the pressure of the oil in a chamber 253. A branch of the pipe 318 leading from the output shaft driven pump 17 is connected to the chamber 253. When the vehicle is in motion in the forward direction, the pump 17 supplies oil under pressure to the pipe 318 and the pressure of this oil varies in accordance with vehicle speed. The various parts of the equipment are arranged so that when the vehicle speed is below 5 miles an hour the pressure of the oil supplied by pump 17 is insufficient to move the plunger 250 far enough against the spring 252 to interfere with movement of the cam plate 217. The various parts of the equipment are also arranged so that when the vehicle speed exceeds 5 miles an hour the pressure of the oil supplied by the pump 17 is great enough to move the plunger 250 against the spring 252 so that the plunger extends into the path of movement of the cam 217 and prevents movement of this cam to the reverse position. This arrangement prevents a shift to reverse while the vehicle is moving forward at a speed high enough that such a shift might result in injury to portions of the transmission or to other parts of the vehicle, but permits a shift to reverse at relatively low vehicle speeds so that the car may be rocked to assist in driving the car in deep snow or sand.

When the manual valve 275 is moved to the reverse position R, the land *a* on the valve blocks the port 335 and establishes communication between the supply groove 346 and the groove 336 to which is connected the passage 186 leading to the reverse brake. Accordingly, the reverse brake is engaged and conditions the transmission to cause the vehicle to be driven in reverse.

In addition, when the manual valve is in the reverse position R, the land *b* cuts off communication between supply groove 346 and the groove 333 to which is connected the passage 332 through which oil under pressure is supplied to the low speed brake and direct drive clutch. Similarly, the land *b* cuts off communication between the supply groove 346 and the groove 307*a* to which is connected the passage 307 leading to the groove 292 surrounding the bore in which is mounted the regulator valve 280. When the valve 275 is in the reverse position R, the portion of reduced diameter between lands *b* and *c* establishes communication between the grooves 333 and 307*a* and the exhaust groove 334 so that passages 307 and 332 are connected to exhaust.

When the valve 275 is in the reverse position, the land *d* cuts off communication between the groove 442 and the groove 421, while groove 421 and the port 420 are both open to exhaust through the end of the bore containing the manual valve 275.

This transmission is arranged so that the vehicle engine can be started by pushing or towing the vehicle and so that the transmission will be effective to establish driving connection with the vehicle engine at relatively low vehicle speeds.

When the vehicle engine is not operating, the engine driven pump 16 does not function to supply oil under pressure to the passage 316 and as a result the chamber 340 at the end face of the push-start valve 278 is at atmospheric pressure and the push-start valve 278 is held by the spring 300 in the position in which the reduced end portion on the valve 278 engages the end face of the regulator valve 280. In this position of the valve 278, the land *a* on the valve cuts off communication from the chamber 340 to the groove 341, while the land *b* cuts off communication from the groove 342 to the groove 348 so that oil supplied by the output shaft driven pump 17 to the passage 318 is not supplied to the governor valve 281. At this time, the portion of reduced diameter on the valve 278 between its lands *a* and *b* establishes communication between the grooves 341 and 342 so that oil supplied by the output shaft driven pump 17 flows to the passage 343 from which oil under pressure may be supplied through the manual valve 275 to the direct drive clutch.

The land *a* on valve element 278 is slightly smaller in diameter than the land *b* so that on the supply of oil from the pump 17 through passage 318 to the groove 342, and thus to the area between the lands *a* and *b* of valve element 278, force is exerted on the valve element to move it against the spring 300. The difference in the diameter of the lands *a* and *b* is relatively small with the result that a relatively high pressure must be developed on the oil in order to move the valve element against the spring 300. The various parts of the equipment are arranged so that the land *a* is not moved far enough to open communication from the groove 341 to the groove or chamber 340 until a relatively high pressure, such as 80 pounds to the square inch, is established on the oil supplied by the pump 17. On movement of the valve 278 against the spring 300 to the position in which the land *a* opens communication between grooves 341 and 340, the land *a* cuts off communication between the grooves 342 and 341. However, oil is still free to flow from the groove 342 to the groove 341 through the ball check valve 430.

On movement of the push-start valve 278 against the spring 300 to the position to open communication from the groove 341 to the groove or chamber 340, oil is released from the groove 341 to the groove 340, from which oil may flow through passage 316 to passage 431 and thence to exhaust. Under push-start conditions, therefore, the push-start valve 278 serves as a pressure regulating valve and maintains the oil in the system at a pressure somewhat higher than that which is maintained under normal operating conditions by the valve 280. As the oil in the system is under relatively high pressure, the oil supplied from groove 342 surrounding valve 278 flows to groove 312 surrounding the valve 282 and moves the valve 282 against the spring 304 to open communication between grooves 312 and 313 so that oil from the pump 17 flows to chambers of the shift valve and moves the shift valves to the upshift position.

When the vehicle is pushed or towed with the engine not running, the pump 16 is ineffective to supply oil to the output shaft driven pump 17. At this time the gears of the pump 17 rotate as the pump is mounted directly on the transmission output shaft and the pump 17 draws oil from the sump through the passage 314 and the check valve 320. Hence, the pump 17 is effective to supply oil to the system.

As long as the manual valve 275 is in the neutral position, the land *a* blocks the groove 346 and oil under pressure is not supplied to the direct drive clutch. However, on movement of the valve 275 to the drive position D, oil under pressure is supplied to passage 332 from which oil may be supplied to the direct drive clutch. As previously explained the shift valves are in the upshift position and oil under pressure is supplied from passage 332 to the passage 195 leading to the direct drive clutch. The oil under pressure supplied to the passage

39

195 also flows to the chamber 366 at the lower end face of the timing valve 286 and moves this valve against the spring 310 to cut off the supply of oil to the passage 185 leading to the low speed brake and to connect this passage to the exhaust passage 388.

The oil at relatively high pressure supplied to the direct drive clutch causes engagement of the clutch so that the vehicle engine is rotated by force transmitted through the clutch. As soon as the engine starts to turn, the pump 16 operates and supplies oil to the pipe 316. On initial turning of the engine, the pump 16 operates at a very slow speed and supplies oil to the passage 316 at a limited rate. This oil may escape from the pipe 316 through the branch passage 431 which leads to the chamber containing the spring 300. This chamber is open to the sump so that as long as the pump 16 operates at a relatively low rate the oil supplied thereby may escape through the passage 431 without building up substantial pressure in the chamber 340. Hence, the push start valve 278 continues to function as a high pressure regulating valve and maintains the pressure in the system at a high value so the direct drive clutch remains engaged.

As soon as the engine starts to turn at a substantial speed, the volume of oil supplied by the pump 16 exceeds that which can be readily discharged through the branch passage 431. Accordingly, a relatively high pressure is established in the chamber 340, with the result that the push-start valve element 278 is moved against the spring 300 and into engagement with the cover plate 296. In this position of the push-start valve element, the land *b* blocks the branch passage 431 and cuts off release of oil from the pump 16 through this passage. In addition, on this movement of the push-start valve 278, the land *a* cuts off communication between the grooves 342 and 341 while communication is now established from the groove 342 to the groove 348, and thus to the governor valve 281. At this time, the push-start valve 278 ceases to function as the regulating valve for the pressure in the control system and this pressure is now controlled by the valve 280. As a result there is some reduction in the pressure in the system, but as the engine is already in operation this reduction in the pressure of the system is without consequence.

As explained above, when the vehicle is being pushed or towed for the purpose of starting the engine, relatively high pressure is maintained on the oil supplied by the output shaft driven pump in the period prior to rotation of the engine at a substantial speed. This oil at high pressure flows to the chamber 403 of the part throttle downshift valve and moves the valve element 287 against the spring 315 to prevent the supply of oil from the TV valve to chambers of the shift valve. As long as the upshift timing valve 286 is in the downshift position, this valve prevents the supply of oil from the TV valve to chambers of the shift valve, but on the supply of oil to the direct drive clutch the timing valve 286 moves to the upshift position and establishes communication between the grooves 402 and 382 so that oil may be supplied from the TV valve to chambers of the shift valve after movement of the shift valves to the upshift position. However, in the period prior to rotation of the engine at a substantial speed, the part throttle downshift valve 287 prevents the supply of oil from the TV valve to chambers of the shift valve so that the shift valves are certain to remain in the upshift position even though the throttle is opened a substantial amount. After the vehicle engine starts to turn, there is a reduction in the pressure maintained on the oil supplied by the output shaft driven pump, and the part throttle downshift valve may return to the position to establish communication from the passage 400 to the passage 401 so that oil from the TV valve flows to the chambers at the faces of the shift valves. However, at this time the shift valves are biased to the upshift position by oil under pressure acting on the lands *a* and *b* of the valve. Hence, the shift valves will remain in the upshift position unless the accelerator is depressed a substantial amount so as to cause the oil supplied by the TV valve to be at a relatively high pressure.

As heretofore pointed out this transmission includes the parking lock which serves, when engaged, to prevent movement of the vehicle. The parking lock is engaged by moving the control lever on the steering column to the parking position P as heretofore explained in detail. On this movement of the control lever, the manual valve 275 is moved to the parking position P in which the land *a* on the valve 275 no longer blocks the supply groove 346 and in which the portion of slightly reduced diameter, indicated at *e* on the valve 275, is opposite the groove 346. The section *e* on the valve 275 is of such size that it permits oil to flow from the supply groove 346 at a restricted rate only, and this rate is such that the pressure in the system will not be reduced below the level maintained by the regulator valve 280. Hence, if the engine is running at a time during which the manual valve is in the parking position P, the pressure in the system will be maintained at the value determined by the regulator valve 280 and oil under pressure will be supplied to passage 354 leading to the torque converter, and also to the passage 187 through which lubricant is supplied to portions of the transmission. This insures lubrication of the transmission while the engine is operating and portions of the transmission are in motion.

What is claimed is:

1. In a vehicle transmission, an input shaft, an output shaft, a first pump operated synchronously with said input shaft and supplying liquid to a supply chamber, a second pump operated synchronously with said output shaft having an inlet port and supplying liquid to a governor chamber, valve means operative on an increase in the pressure of the liquid in said supply chamber to a selected value to establish communication between said governor chamber and an exhaust orifice, valve means operative on an increase in the pressure of the liquid in said governor chamber to a value substantially above said selected value to also establish communication between said governor chamber and an exhaust passage, means for supplying liquid from said supply chamber to a supply passage, means for also supplying liquid from said governor chamber to said supply passage, an operating chamber, a shift valve biased to a first position and movable therefrom to a second position on an increase in the pressure of the liquid in said governor chamber, said shift valve being effective in said first position to connect said operating chamber to exhaust and being effective in said second position to connect said operating chamber to said supply passage, means for supplying liquid from said supply chamber of said first pump to the inlet port of said second pump, and a hydraulically operated control device effective on an increase in the pressure of the liquid in said operating chamber to or above said selected value to establish driving connection between said input and output shafts.

2. In a vehicle transmission, an input shaft, an output shaft, a first pump operated synchronously with said input shaft and supplying liquid to a supply chamber, a second pump operated synchronously with said output shaft having an inlet port and supplying liquid to a governor chamber, valve means operative on an increase in the pressure of the liquid in said supply chamber to a selected value to establish communication between said governor chamber and an exhaust orifice, valve means operative on an increase in the pressure of the liquid in said governor chamber to a value substantially above said selected value to also establish communication between said governor chamber and an exhaust passage, means for supplying liquid from said supply chamber to a supply passage, means for also supplying liquid from said governor chamber to said supply passage only when the pressure in said supply chamber is below said selected value, an operating chamber, a shift valve biased to a first position and movable therefrom to a second position on an increase in the pressure of the liquid in said governor chamber, said shift valve being effective in said first position to connect said operating chamber to exhaust and being effective in said second position to connect said operating chamber to said supply passage, means for supplying liquid from said supply chamber of said first pump to the inlet port of said second pump, a sump, a passage connecting the inlet port of said second pump and said sump, a check valve in said last named passage arranged to permit flow of liquid from said sump to said pump and to prevent flow of liquid in the opposite direction, and a hydraulically operated control device effective on an increase in the pressure of the liquid in said operating chamber to or above said selected value to establish driving connection between said input and output shafts.

3. In a vehicle transmission, an input shaft, an output shaft, a first pump operated synchronously with said input shaft and supplying liquid to a supply chamber, a second pump operated synchronously with said output shaft having an inlet port and supplying liquid to a governor chamber, means for supplying liquid from said governor chamber to an exhaust orifice, means for supplying liquid from said governor chamber to a supply passage when the pressure in said supply passage is below a predetermined value, means for supplying liquid from said supply chamber to said supply passage, an operating chamber, a shift valve biased to a first position and movable therefrom to a second position on an increase in the pressure of the liquid in said governor chamber, said shift valve being effective in said first position to connect said operating chamber to exhaust and being effective in said second position to connect said operating chamber to said supply passage, means for supplying liquid from said supply chamber of said first pump to the inlet port of said second pump, a sump, means for supplying liquid from said sump to the inlet port of said second pump, and a hydraulically operated control device effective on an increase in the pressure of the liquid in said operating chamber substantially to or above said predetermined value to establish driving connection between said input and output shafts.

4. In a vehicle transmission, an input shaft, an output shaft, a first pump operated synchronously with said input shaft and supplying liquid to a supply chamber, a second pump operated synchronously with said output shaft having an inlet port and supplying liquid to a governor chamber, means for supplying liquid from said governor chamber to an exhaust orifice, means for supplying liquid from said governor chamber to a supply passage when the pressure in said supply passage is below a predetermined value, means for supplying liquid from said supply chamber to said supply passage, an operating chamber, a shift valve biased to a first position and movable therefrom to a second position on an increase in the pressure of the liquid in said governor chamber, said shift valve being effective in said first position to connect said operating chamber to exhaust and being effective in said second position to connect said operating chamber to said supply passage, a sump, an inlet passage connecting said sump and the inlet port of said second pump, a check valve in said inlet passage arranged to permit flow of liquid from said sump to the inlet port of said second pump and to prevent flow of liquid in the opposite direction, means for supplying liquid from said supply chamber of said first pump to said inlet passage at a point on said inlet passage intermediate said check valve and the inlet port of said second pump, and a hydraulically operated control device effective on an increase in the pressure of the liquid in said operating chamber substantially to or above said predetermined value to establish driving connection between said input and output shafts.

5. In a transmission for a vehicle having an engine, an input shaft, an output shaft, a shift valve biased to a first position and movable therefrom to a second position, means for exerting on said shift valve force which tends to move said shift valve from said first to said second position and which varies in accordance with the speed of said output shaft, means operative only when said shift valve is in a position other than said second position for exerting on said shift valve force which tends to move said shift valve from said second to said first position and which varies in accordance with the power demand on the vehicle engine, means for exerting on said shift valve a force which tends to move said shift valve from said second to to said first position and which varies in accordance with the power demand on the vehicle engine, said means for exerting a force being operative to exert a force only when the speed of one of said shafts is less than a selected rate and inoperative when above said selected rate, speed ratio driving mechanism for operably connecting said shafts to drive the output shaft from the input shaft at a plurality of forwardly driving relatively different speed ratios, and means governed according as said shift valve is in its first or its second position to condition said speed ratio driving mechanism to establish driving connection between said input and output shafts to cause said output shaft to be driven at a relatively slow rate or at a relatively fast rate.

6. In a transmission for a vehicle having an engine, an input shaft, an output shaft, a governor chamber, means for supplying to said governor chamber fluid at a pressure which varies in accordance with the speed of said output shaft, a shift valve biased to a first position and movable therefrom to a second position, a control chamber, means operative only when said shift valve is in a position other than said second position for supplying to said control chamber fluid at a pressure which varies in accordance with the power demand on the vehicle engine, means operative only when the speed of said output shaft is less than a selected rate for supplying to said control chamber fluid at a pressure which varies in accordance with the power demand on the vehicle engine, said last named means being operative irrespective of the position of said shift valve, means responsive to the pressure of the fluid in said governor chamber for moving said shift valve to said second position, means responsive to the pressure of the fluid in said control chamber for moving said shift valve to said first position, speed ratio driving mechanism for operably connecting said shafts to drive the output shaft from the input shaft at a plurality of forwarly driving relatively different speed ratios, and means governed according as said shift valve is in its first or its second position to condition said speed ratio driving mechanism to establish driving connection between said input and output shafts to cause said output shaft to be driven at a relatively slow rate or at a relatively fast rate.

7. In a transmission for a vehicle having an engine, an input shaft, an output shaft, a shift valve biased to a first position and movable therefrom to a second position, a control chamber, means operative only when said shift valve is in a position other than said second position for supplying to said control chamber fluid at a pressure which varies in accordance with the power demand on the vehicle engine, means operative only when the speed of said output shaft is less than a selected rate for supplying to said control chamber fluid at a pressure which varies in accordance with the power demand on the vehicle engine, means responsive to the pressure of the fluid in said control chamber for moving said shift valve to said first position, a governor chamber, means for supplying to said governor chamber fluid at a pressure which varies in accordance with the speed of said output shaft, means responsive to the pressure of the fluid in said governor chamber for moving said shift valve to said second position, said last named means being arranged so that the fluid supplied to said governor chamber is effective to move said shift valve to said second position at an output shaft speed less than said selected rate when the power demand on the vehicle engine is relatively small and to move said shift valve to said second position only at an output shaft speed greater than said selected rate when the power demand on the vehicle engine is relatively large, speed ratio driving mechanism for operably connecting said shafts to drive the output shaft from the input shaft at a plurality of forwardly driving relatively different speed ratios, and means governed according as said shift valve is in its first or its second position to condition said speed ratio driving mechanism to establish driving connection between said input and output shafts to cause said output shaft to be driven at a relatively slow rate or at a relatively fast rate.

8. In a transmission for a vehicle having an engine, an input shaft, an output shaft, a hydraulic torque transmitting device having an input member driven by said input shaft and having an output member adapted to drive said output shaft located in a fluid drive chamber, an operating chamber, a source of liquid under pressure, a shift valve biased to a first position and movable therefrom to a second position, means effective according as said shift valve is in said first or said second position for connecting said operating chamber to exhaust or to said source of liquid under pressure, said shift valve in said first position connecting said source to said fluid drive chamber, a governor chamber, means for supplying to said governor chamber fluid at a pressure which varies in accordance with the speed of said output shaft, a control chamber, a control source of fluid under pressure at a pressure which varies in accordance with the power demand on the vehicle engine, means effective when said shift valve is in any position except said second position for supplying fluid from said control source to said control chamber, means effective regardless of the position of said shift valve for supplying fluid from said control source to said control chamber when the speed of said output shaft is less than a selected rate, means subject to the pressure of the fluid in said governor chamber for moving said shift valve from said first to said second position, means subject to the pressure of the fluid in said control chamber for moving said shift valve from said second to said first position, and a pressure operated control device effective on an increase in the pressure of the liquid in said operating chamber to establish between said input and output shafts a driving connection independent of said hydraulic torque transmitting device.

9. In a transmission for a vehicle having an engine, an input shaft, an output shaft, a hydraulic torque transmitting device having an input member driven by said input shaft and having an output member adapted to drive said output shaft located in a fluid drive chamber, an operating chamber, a source of liquid under pressure, a shift valve biased to a first position and movable therefrom to a second position, means effective according as said shift valve is in said first or said second position for connecting said operating chamber to exhaust or to a source of liquid under pressure, a governor chamber, said shift valve in said first position connecting said source to said fluid drive chamber, means for supplying to said governor chamber fluid at a pressure which varies in accordance with the speed of a selected one of said shafts, a control chamber, a control source of fluid under pressure at a pressure which varies in accordance with the power demand on the vehicle engine, means effective when said shift valve is in any position except second position for supplying fluid from said control source to said control chamber, means effective regardless of the position of said shift valve for supplying fluid from said control source to said control chamber when the speed of said selected one of said shafts is less than a selected rate, means subject to the pressure of the fluid in said governor chamber for moving said shift valve from said first to said second position, means subject to the pressure of the fluid in said control chamber for moving said shift valve from said second to said first position, and a pressure operated control device effective on an increase in the pressure of the liquid in said operating chamber to establish between said input and output shafts a driving connection independent of said hydraulic torque transmitting device.

10. In a vehicle transmission, an input shaft, an output shaft, a first operating chamber, a second operating chamber, a source of liquid under a pressure above a predetermined value, a timing valve biased to a first position and movable therefrom to a second position by said predetermined pressure value, said timing valve being effective when in its first position to connect said first operating chamber to said source of liquid under pressure and being effective when in its second position to connect said first operating chamber to exhaust, a shift valve movable between a first and a second position, said shift valve being effective when in its first position to connect said second operating chamber to exhaust and being effective when in its second position to connect said second operating chamber to said source of liquid under pressure, means responsive to the pressure of the liquid in said second operating chamber substantially at said predetermined value for initiating movement of said timing valve against said biasing force at an intermediate value from said first to said second position, means for controlling the rate of movement of said timing valve from its first to its second position, said means comprising a compression chamber, means for maintaining said chamber filled with liquid, an exhaust orifice, and means operative by movement of said timing valve from said first to said second position for forcing liquid from said compression chamber through said orifice, speed ratio driving mechanism for operably connecting said shafts to drive the output shaft from the input shaft at a plurality of forwardly driving relatively different speed ratios, a first hydraulically operated control device effective on an increase in the pressure of the liquid in said first operating chamber to condition said mechanism to establish driving connection between said input and output shafts to cause said output shaft to be driven at a relatively slow rate, and a second hydraulically operated control device effective on an increase in the pressure of the liquid in said second operating chamber to condition said mechanism to establish driving connection between said input and output shafts to cause said output shaft to be driven at a relatively fast rate.

11. In a vehicle transmission, an input shaft, an output shaft, a first operating chamber, a second operating chamber, a source of liquid under pressure, a timing valve biased to a first position and movable therefrom to a second position, said timing valve being effective when in its first position to connect said first operating chamber to said source of liquid under pressure and being effective when in its second position to connect said first operating chamber to exhaust, a shift valve movable between a first and a second position, said shift valve being effective when in its first position to connect said second operating chamber to exhaust and being effective when in its second position to connect said second operating chamber to said source of liquid under pressure, means responsive to the pressure of the liquid in said second operating chamber for moving said timing valve from said first to said second position, means for controlling the rate of movement of said timing valve from its first to its second position, said means comprising a compression chamber, means for maintaining said chamber filled with liquid, an exhaust orifice, means effective only during operation of said output shaft at a relatively high speed for opening a passage through which liquid may flow from said compression chamber, means operative by movement of said timing valve from said first to said second position for forcing liquid from said compression chamber, speed ratio driving mechanism for operably connecting said shafts to drive the output shaft from the input shaft at a plurality of forwardly driving relatively different speed ratios, a first hydraulically operated control device effective on an increase in the pressure of the liquid in said first operating chamber to condition said mechanism to establish driving connection between said input and output shafts to cause said output shaft to be driven at a relatively slow rate, and a second hydraulically operated control device effective on an increase in the pressure of the liquid in said second operating chamber to condition said mechanism to establish driving connection between said input and output shafts to cause said output shaft to be driven at a relatively fast rate.

12. In a transmission for a vehicle having an engine provided with a throttle valve, a control element operable by the vehicle driver for moving said throttle valve between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, a first operating chamber, a second operating chamber, a source of liquid under pressure, a shift valve movable between a first and a second position, said shift valve being effective when in its first position to connect said second operating chamber to exhaust and being effective when in its second position to connect said second operating chamber to said source of liquid under pressure, a timing valve biased to a first position and movable therefrom to a second position, said timing valve being effective when in its first position to connect said first operating chamber to said source of liquid under pressure and being effective when in its second position to connect said first operating chamber to exhaust, a compression chamber, means for maintaining said compression chamber filled with liquid, an exhaust orifice, means operable by movement of said timing valve from said first to said second position for forcing liquid from said compression chamber, means responsive to the pressure of the liquid in said second operating chamber for moving said timing valve from said first to said second position, a control chamber, means effective when and only when said throttle valve is in its closed position and said shift valve is in its second position for supplying liquid under pressure to said control chamber, and means responsive to the pressure of the liquid in said control chamber for moving said timing valve from said first to said second position, a first hydraulically operated control device effective on an increase in the pressure of the liquid in said first operating chamber to cause said mechanism to establish a slow speed ratio drive, and a second hydraulically operated control device effective on an increase in the pressure of the liquid in said second operating chamber to cause said mechanism to establish a fast speed ratio drive.

13. In a transmission for a vehicle having an engine provided with a throttle valve, a control element operable by the vehicle driver for moving said throttle valve between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, a first operating chamber, a second operating chamber, a source of liquid under pressure, a shift valve movable between a first and a second position, said shift valve being effective when in its first position to connect said second operating chamber to a release passage and being effective when in said second position to connect said second operating chamber to said source of liquid under pressure, an orifice, means for connecting said release passage to exhaust through said orifice, a branch passage for also connecting said release passage to exhaust, means effective when and only when said throttle valve is substantially in said open position for closing said branch passage, a timing valve biased to a first position and movable therefrom to a second position, said timing valve being effective when in said first position to connect said first operating chamber to said source of liquid under pressure and being effective when in said second position to connect said first operating chamber to exhaust, means responsive to the pressure of the liquid in said second operating chamber for moving said timing valve from said first to said second position, a first hydraulically operated control device effective on an increase in the pressure of the liquid in said first operating chamber to cause said mechanism to establish a slow speed ratio drive, and a second hydraulically operated control device effective on an increase in the pressure of the liquid in said second operating chamber to cause said mechanism to establish a fast speed ratio drive.

14. In a transmission for a vehicle having an engine provided with a throttle valve, a control element operable by the vehicle driver for moving said throttle valve between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, a first operating chamber, a second operating chamber, a source of liquid under pressure, a manual valve having a neutral position in which both of said operating chambers are connected to exhaust, said manual valve being movable from said neutral position to a first or a second control position, a shift valve biased to a first position and movable therefrom to a second position, means responsive to the speed of said output shaft for moving said shift valve from said first to said second position, means effective when said manual valve is in said first control position to supply liquid under pressure to said first or said second operating chamber according as said shift valve is in its first or its second position, means effective when said manual valve is in said second control position to supply liquid under pressure to said first operating chamber, a first hydraulically operated control device effective on an increase in the pressure of the liquid in said first operating chamber to cause said mechanism to establish a slow speed ratio drive, a second hydraulically operated control device effective on an increase in the pressure of the liquid in said second operating chamber to cause said mechanism to establish a fast speed ratio drive, a braking chamber, means for supplying liquid under pressure to said braking chamber when and only when said throttle valve is substantially in its closed position and said manual valve is in said second control position and the speed of said output shaft is less than a selected value, a braking member adapted to have frictional engagement with an element of said speed ratio driving mechanism which has driving connection with said output shaft when and only when said mechanism establishes said slow speed drive ratio, and means responsive to the pressure of the liquid in said braking chamber for pressing said braking member into engagement with said element of said driving mechanism.

15. In a transmission for a vehicle having an engine provided with a throttle valve, a control element operable by the vehicle driver for moving said throttle valve between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, said speed ratio driving mechanism including an element which has driving connection with said output shaft when said driving mechanism establishes a slow speed drive ratio, a first operating chamber, a second operating chamber, a source of liquid under pressure, a manual valve having a neutral position in which both of said operating chambers are connected to exhaust, said manual valve being movable from said neutral position to a first or a second control position, a shift valve biased to a first position and movable therefrom to a second position, means responsive to the speed of said output shaft for moving said shift valve from said first to said second position, means effective when said manual valve is in said first control position to supply liquid under pressure to said first or said second operating chamber according as said shift valve is in its first or its second position, means effective when said manual valve is in said second control position to supply liquid under pressure to said first operating chamber, a first hydraulically operated control device effective on an increase in the pressure of the liquid in said first operating chamber to cause said mechanism to establish said slow speed ratio drive, a second hydraulically operated control device effective on an increase in the pressure of the liquid in said second operating chamber to cause said mechanism to establish a fast speed ratio drive, a braking chamber, means for supplying liquid under pressure to said braking chamber when and only when said throttle valve is substantially in its closed position and said manual valve is in said second control position and the speed of said output shaft is less than a selected value, and means operative on an increase in the pressure of the liquid in said braking chamber to apply a retarding force to said driving mechanism element.

16. In a transmission for a vehicle having an engine provided with a throttle valve, a control element operable by the vehicle driver for moving said throttle valve between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, a first operating chamber, a second operating chamber, a source of liquid under pressure, a manual valve having a neutral position in which both of said operating chambers are connected to exhaust, said manual valve being movable from said neutral position to a first or a second control position, a shift valve biased to a first position and movable therefrom to a second position, means responsive to the speed of said output shaft for moving said shift valve from said first to said second position, means effective when said manual valve is in said first control position to supply liquid under pressure to said first or said second operating chamber according as said shift valve is in its first or its second position, means effective when said manual valve is in said second control position to supply liquid under pressure to said first operating chamber, a first hydraulically operated control device effective on an increase in the pressure of the liquid in said first operating chamber to cause said mechanism to establish a slow speed ratio drive, a second hydraulically operated control device effective on an increase in the pressure of the liquid in said second operating chamber to cause said mechanism to establish a fast speed ratio drive, a braking chamber, means for supplying liquid under pressure to said braking chamber when and only when said throttle valve is substantially in its closed position and said manual valve is in said second control position and the speed of said output shaft is less than a selected value, and means operative on an increase in the pressure of the liquid in said braking chamber to apply a retarding force to said output shaft.

17. In a transmission for a vehicle, an input shaft, an output shaft, a first pump driven synchronously with said input shaft, a second pump driven synchronously with said output shaft, a sump, a governor chamber open to said sump through an orifice, means for supplying liquid from said second pump to said governor chamber, a supply passage, means for supplying liquid from said first pump to said supply passage, mean for supplying liquid from said second pump to said supply passage, an inlet passage connecting the inlet port of said second pump with said sump, a check valve in said inlet passage arranged to permit flow from said sump to said pump, means for supplying liquid from said first pump to said inlet passage at a point in said passage intermediate said check valve and the inlet port of said second pump, a shift valve biased to a first position and movable therefrom to a second position, means responsive to the pressure of the liquid in said governor chamber for moving said shift valve from said first to said second position, an operating chamber, said shift valve being effective when in said first position to connect said operating chamber to exhaust and being effective when in said second position to connect said operating chamber to said supply passage, and a hydraulically operated control device effective on an increase in the pressure of the liquid in said operating chamber to establish driving connection between said input and output shafts.

18. In a transmission for a vehicle having an engine provided with a throttle control operable by the vehicle driver between a closed and an open position, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, said housing having associated therewith a transverse surface extending across the open face of said ring gear element and including an annular surface confronting the annular surface on said ring gear element, said ring gear element being supported in said housing so as to be movable axially therein between a first position in which the annular surface on said ring gear element is spaced from the annular surface associated with said housing and a second position in which the annular surface on said ring gear element is adjacent the annular surface associated with said housing to thereby restrict flow of lubricant from the area within said ring gear element, means for supplying lubricant under pressure to the area within said ring gear element, means for connecting said ring gear element with the vehicle engine, means for connecting said carrier element with an output shaft, an operating chamber, manually controlled means for supplying liquid under pressure to said operating chamber, a control device operative by fluid under pressure in said operating chamber for securing said sun gear element to the housing to thereby establish driving connection between said ring gear and carrier elements, the gears of said planetary unit having helical teeth arranged so that when and only when force is transmitted through said planetary gear unit from said carrier element to said ring gear element force is exerted on said ring gear element to move said element to its second position, a braking chamber, a braking member non-rotatably supported by said housing, means effective only when said throttle control is substantially in said closed position for supplying liquid under pressure to said braking chamber, and means effective on an increase in the pressure of the liquid in said braking chamber to press said braking member against the first end face of said drum and thereby press the second end face of said drum against said annular surface on said housing.

19. In a transmission for a vehicle having an engine, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, said housing having associated therewith a transverse surface extending across the open face of said ring gear element and including an annular surface confronting the annular surface on said ring gear element, said ring gear element being supported in said housing so as to be movable axially therein between a first position in which the annular surface on said ring gear element is spaced from the annular surface associated with said housing and a second position in which the annular surface on said ring gear element is adjacent the annular surface associated with said housing to thereby restrict flow of lubricant from the area within said ring gear element, means for supplying lubricant under pressure to the area within said ring gear element, means for connecting said ring gear element with the vehicle engine, means for connecting said carrier element with an output shaft, an operating chamber, manually controlled means for supplying liquid under pressure to said operating chamber, a control device operative by fluid under pressure in said operating chamber for securing said sun gear element to the housing to thereby establish driving connection between said ring gear and carrier elements, the gears of said planetary unit having helical teeth arranged so that when and only when force is transmitted through said planetary gear unit from said carrier element to said ring gear element force is exerted on said ring gear element to move said element to its second position, a braking chamber, a braking member non-rotatably supported by said housing, manually controlled means for supplying liquid under pressure to said braking chamber, and means effective on an increase in the pressure of the liquid in said braking chamber to press said braking member against the first end face of said drum and thereby press the second end face of said drum against said annular surface on said housing.

20. In a transmission for a vehicle having an engine, an input shaft adapted to be driven by the vehicle engine, an output shaft adapted to drive the vehicle, speed ratio driving mechanism for operably connecting said shafts to drive the output shaft from the input shaft at a plurality of forwardly driving relatively different speed ratios, a first operating chamber, a second operating chamber, a source of liquid under pressure, a shift valve movable between a first and a second position, said shift valve being effective when in its first position to connect said second operating chamber to exhaust and being effective when in its second position to connect said second operating chamber to said source of liquid under pressure, a timing valve biased to a first position and movable therefrom to a second position, said timing valve being effective when in its first position to connect said first operating chamber to said source of liquid under pressure and being effective when in its second position to connect said first operating chamber to exhaust, means responsive to the pressure of the liquid in said second operating chamber for moving said timing valve from said first to said second position, a control chamber, means responsive to the pressure of the liquid in said control chamber for moving said shift valve to said first position, a governor chamber, means responsive to the pressure of the liquid in said governor chamber for moving said shift valve from said first position to said second position, means for supplying to said governor chamber liquid at a pressure which varies in accordance with the speed of said output shaft, means responsive to the pressure of the liquid in said second operating chamber for moving said shift valve to said second position, means operative only when said shift valve is in a position other than its second position for supplying to said control chamber liquid at a pressure which varies in accordance with the power demand on the vehicle engine, means operative only when said timing valve is substantially in its second position for also supplying to said control chamber liquid at a pressure which varies in accordance with the power demand on the vehicle engine, a first hydraulically operated control device effective on an increase in the pressure of the liquid in said first operating chamber to cause said driving mechanism to establish a slow speed ratio drive, and a second hydraulically operated control device effective on an increase in the pressure of the liquid in said second operating chamber to cause said driving mechanism to establish a fast speed ratio drive.

21. In a transmission for a vehicle having an engine provided with a throttle control operable by the vehicle driver between a closed and an open position, an input shaft adapted to be driven by the vehicle engine, an output shaft adapted to drive the vehicle, speed ratio driving mechanism for operably connecting said shafts to drive the output shaft from the input shaft at a plurality of forwardly driving, relatively different speed ratios, a shift valve biased to a first position and movable therefrom to a second position, means responsive to the speed of said output shaft for moving said shift valve from said first to said second position, a manual valve having a neutral position in which said speed ratio driving mechanism is ineffective to establish driving connection between said input and output shafts, said manual valve being movable to a first control position in which said speed ratio driving mechanism establishes driving connection between said input and output shafts to cause said output shaft to be driven at a relatively slow rate or at a relatively fast rate according as said shift valve is in its first or its second position, said manual valve being movable to a second control position in which said speed ratio driving mechanism establishes driving connection between said input and output shafts to cause said output shaft to be driven at a relatively slow rate, a braking chamber, means for supplying liquid under pressure to said braking chamber when and only when said throttle control is substantially in its closed position and said manual valve is in said control position and the speed of said output shaft is less than a selected value, and means operative on an increase in the pressure of the liquid in said braking chamber to apply a retarding force to said output shaft.

22. In a transmission for an engine, a housing, a planetary gear unit rotatably supported in said housing, said planetary gear unit including a ring gear element, a sun gear element, and a carrier element including planet gears meshing with said ring and sun gear elements, enclosure means enclosing said planetary gear unit and having flow control means to control the exhaust of fluid from said enclosure means and having a first position providing a relatively free exhaust and a second position providing a restricted exhaust, one of said gear elements being supported in said housing so as to be movable axially therein between a first position and a second position, actuating means connecting said one gear element to said flow control means to position said flow control means in said first position to provide relatively free exhaust of fluid from said enclosure means when said one gear element is in said first position and to position said flow control means in said second position to restrict the exhaust of fluid from said enclosure means when said one gear element is in said second position, means for supplying fluid under pressure to the space within said enclosure means, means for connecting a first of said gear elements with the engine, means for connecting a second of said gear elements with an output shaft, an operating chamber, controlled means for supplying fluid under pressure to said operating chamber, a control device operative by fluid under pressure in said operating chamber for securing a third of said gear elements to the housing to thereby establish driving connection between said first and second gear elements, the gears of said planetary unit having helical teeth arranged so that when and only when force is transmitted through said planetary unit from said second gear element to said first gear element force is exerted on said one gear element to move said element to its second position, a braking chamber, a braking member non-rotatably supported by said housing, controlled means for supplying fluid under pressure to said braking chamber, and means effective on an increase in the pressure of the fluid in said braking chamber to engage said one planetary gear element to retard it and to exert a force to move it axially to move said flow control means from said first to said second positions.

23. In a transmission for an engine, a housing, a planetary gear unit rotatably supported in said housing, said planetary gear unit including a ring gear element, a sun gear element, and a carrier element including planet gears meshing with said ring and sun gear elements, enclosure means enclosing said planetary gear unit and having flow control means to control the exhaust of fluid from said enclosure means and having a first position providing a relatively free exhaust and a second position providing a restricted exhaust, one of said gear elements being supported in said housing so as to be movable axially therein between a first position and a second position, actuating means connecting said one gear element to said flow control means to position said flow control means in said first position to provide relatively free exhaust of fluid from said enclosure means when said one gear element is in said first position and to position said flow control means in said second position to restrict the exhaust of fluid from said enclosure means when said one gear element is in said second position, means for supplying fluid under pressure to the space within said enclosure means, means for connecting a first of said gear elements with the engine, means for connecting a second of said gear elements with an output shaft, an operating chamber, controlled means for supplying fluid under pressure to said operating chamber, a control device operative by fluid under pressure in said operating chamber for securing a third of said gear elements to the housing to thereby establish driving connection between said first and second gear elements, the gears of said planetary unit having helical teeth arranged so that when and only when force is transmitted through said planetary unit from said second gear element to said first gear element force is exerted on said one gear element to move said one gear element to its second position, braking actuator means, controlled means for supplying fluid under pressure to said braking actuator means, and means effective on an increase in the pressure of the fluid in said braking actuator means to move said flow control means from said first to said second positions.

24. In a transmission for an engine, a housing, a planetary gear unit rotatably supported in said housing, said planetary gear unit including a ring gear element, a sun gear element, and a carrier element including planet gears meshing with said ring and sun gear elements, enclosure means enclosing said planetary gear unit and having flow control means to control the exhaust of fluid from said enclosure means and having a first position providing a relatively free exhaust and a second position providing a restricted exhaust, one of said gear elements being supported in said housing so as to be movable axially therein between a first position and a second position, actuating means connecting said one gear element to said control means to position said control means in said first position to provide relatively free exhaust of fluid from said enclosure means when said one gear element is in said first position and to position said control means in said second position to restrict the exhaust of fluid from said enclosure means when said one gear element is in said second position, means for supplying fluid under pressure to the space within said enclosure means, means for connecting a first of said gear elements with the engine, means for connecting a second of said gear elements with an output shaft, an operating chamber, controlled means for supplying fluid under pressure to said operating chamber, a control device operative by fluid under pressure in said operating chamber for securing a third of said gear element to the housing to thereby establish driving connection between said first and second gear elements, the gears of said planetary unit having helical teeth arranged so that when and only when force is transmitted through said planetary unit from said second gear element to said first gear element force is exerted on said one gear element to move said one gear element to its second position and when and only when force is transmitted through said planetary unit from said first gear element to said second gear element force is exerted on said one gear element to move said one gear element to its first position and fluid actuator means, controlled means for supplying fluid under pressure to said fluid actuator means, and means effective on an increase in the pressure of the fluid in said fluid actuator means to exert a force to move said flow control means from said first to said second positions.

25. In a transmission for an engine, a housing, a planetary gear unit rotatably supported in said housing, said planetary gear unit including a ring gear element, a sun gear element, and a carrier element including planet gears meshing with said ring and sun gear elements, enclosure means enclosing said planetary gear unit and having flow control means to control the exhaust of fluid from said enclosure means and having a first position providing a relatively free exhaust and a second position providing a restricted exhaust, one of said gear elements being supported in said housing so as to be movable axially therein between a first position and a second position, actuating means connecting said one gear element to said flow control means to position said flow control means in said first position to provide relatively free exhaust of fluid from said enclosure means when said one gear element is in said first position and to position said flow control means in said second position to restrict the exhaust of fluid from said enclosure means when said one gear element is in said second position, means for supplying fluid under pressure to the space within said enclosure means, means for connecting a first of said gear elements with the engine, means for connecting a second of said gear elements with an output shaft, an operating chamber, controlled means for supplying fluid under pressure to said operating chamber, a control device operative by fluid under pressure in said operating chamber for securing a third of said gear elements to the housing to thereby establish driving connection between said first and second gear elements, fluid actuator means, controlled means for supplying fluid under pressure to said fluid actuator means, and means effective on an increase in the pressure of the fluid in said fluid actuator means to move said one gear element from said first to said second positions.

26. In a transmission for an engine, a housing, a planetary gear unit rotatably supported in said housing, said planetary gear unit including a ring gear element, a sun gear element, and a carrier element including planet gears meshing with said ring and sun gear elements, enclosure means enclosing said planetary gear unit and having flow control means to control the exhaust of fluid from said enclosure means and having a first position providing a relatively free exhaust and a second position providing a restricted exhaust, means for supplying fluid under pressure to the space within said enclosure means, means for connecting a first of said gear elements with the engine, means for connecting a second of said gear elements with an output shaft, an operating chamber, controlled means for supplying fluid under pressure to said operating chamber, a control device operative by fluid under pressure in said operating chamber for securing a third of said gear elements to the housing to thereby establish driving connection between said first and second gear elements, fluid actuator means, controlled means for supplying fluid under pressure to said fluid actuator means, and means effective on an increase in the pressure of the fluid in said fluid actuator means to move said flow control means from said first to said second positions.

27. A transmission for an engine provided with a power demand signal device, a control element actuated by said power demand signal device for movement from a first position at zero power demand to a second position at full power demand, an input shaft adapted to be driven by the engine, an output shaft, speed ratio driving mechanism providing a slow and a fast forward speed drive including an element having a driving connection with said output shaft when said driving mechanism establishes said slow speed drive, actuator means hydraulically controlled to cause said mechanism to establish said slow speed drive or said fast speed drive, a source of fluid under pressure, control valve means having a first position to control the supply of fluid to said actuator means to provide said fast speed drive and a second position to control the supply of fluid to said actuator means to provide only said slow speed drive, braking means hydraulically operated to apply a retarding force to said element of said mechanism, and brake control means effective only when said control element is substantially in said first position, and said control valve means is in said second position, and the speed of the output shaft is greater than a selected value.

28. A transmission for an engine provided with a power demand signal device, a control element actuated by said power demand signal device for movement from a first position at zero power demand to a second position at full power demand, an input shaft adapted to be driven by the engine, an output shaft, speed ratio driving mechanism providing a slow and a fast forward speed drive including an element having a driving connection with said output shaft when said driving mechanism establishes said slow speed drive, actuator means hydraulically controlled to cause said mechanism to establish said slow speed drive or said fast speed drive, a source of fluid under pressure, control valve means having a first position to control the supply of fluid to said actuator means to provide said fast speed drive and a second position to control the supply of fluid to said actuator means to provide only said slow speed drive, braking means hydraulically operated to apply a retarding force to said element of said mechanism, and brake control means effective only when said control element is substantially in said first position, and said control valve means is in said second position.

29. A transmission for an engine provided with a power demand signal device, a control element actuated by said power demand signal device for movement from a first position at zero power demand to a second position at full power demand, an input shaft adapted to be driven by the engine, an output shaft, drive mechanism connecting said input and output shafts having actuator means controlled by fluid under pressure to cause said mechanism to establish a drive, a source of fluid under pressure, valve means controlling the supply of fluid from said source to said actuator means to engage said drive mechanism in a first position and to disengage said drive mechanism in a second position, said valve means being biased to said first position, fluid control means to move said valve means from said first to said second position, timing means to control the rate of movement of said valve means including a timing chamber, means to maintain said chamber filled with fluid, said chamber having a restricted exhaust to limit the rate of movement of said valve means from said first to said second positions to a predetermined rate, means to increase the exhaust flow from said chamber during a predetermined speed range of one of said shafts to permit an increase in the rate of movement of said valve means, means to provide a power pressure which varies in accordance with the position of said control element, means to connect said power pressure during a predetermined speed range of one of said shafts to said valve means to exert a force on said valve means to move said valve means from said first to said second positions, means operative when and only when said control element is substantially in said first position to apply a pressure to said control valve to exert a force to move said valve means from said first to said second positions.

30. A transmission for an engine provided with a power demand signal device, a control element actuated by said power demand signal device for movement from a first position at zero power demand to a second position at full power demand, an input shaft adapted to be driven by the engine, an output shaft, drive mechanism connecting said input and output shafts having actuator means controlled by fluid under pressure to cause said mechanism to establish a drive, a source of fluid under pressure, valve means controlling the supply of fluid from said source to said actuator means to engage said drive mechanism in a first position and to disengage said drive mechanism in a second position, said valve means being biased to said first position, fluid control means to move said valve means from said first to said second position, means to provide a power pressure which varies in accordance with the position of said control element, and means to connect said power pressure only during a predetermined portion of the speed range of one of said shafts to said valve means to exert a force on said valve means to move said valve means from said first to said second positions.

31. A transmission for an engine, an input shaft adapted to be driven by the engine, an output shaft, drive mechanism connecting said input and output shafts having actuator means controlled by fluid under pressure to cause said mechanism to establish a drive, a source of fluid under pressure, valve means controlling the supply of fluid from said source to said actuator means to engage said drive mechanism in a first position and to disengage said drive mechanism in a second position, said valve means being biased to said first position, fluid control means to move said valve means from said first to said second position, timing means to control the rate of movement of said valve means including a timing chamber, means to maintain said chamber filled with fluid, said chamber having a restricted exhaust to limit the rate of movement of said valve means from said first to said second positions to a predetermined rate, and means to increase the exhaust flow for said chamber during a predetermined speed range of one of said shafts to permit an increase in the rate of movement of said valve means.

32. In a vehicle transmission, an input shaft, an output shaft, a first pump operated synchronously with said input shaft and supplying liquid to a supply chamber, a second pump having an inlet port and operated synchronously to an output shaft supplying liquid to a governor chamber, means for controlling the pressure of the fluid in said governor chamber to vary with the fluid output of said second pump and with the speed of said output shaft, means for regulating the pressure of said fluid in said supply chamber, and means for supplying fluid from said supply chamber to said inlet port of said second pump.

33. In a transmission for an engine, an input shaft, an output shaft, a drive transmitting device having an input member driven by said input shaft, an output member adapted to drive said output shaft, and fluid operated means establishing a driving connection between said input and output members having an operating chamber, a source of fluid under pressure, a shift valve biased to a first position and movable therefrom to a second position to establish said driving connection, means effective according as said shift valve is in one of said positions for connecting said operating chamber to exhaust or is in another of said positions for connecting said operating chamber to a source of fluid under pressure, governor chamber means, means for supplying to said governor chamber means fluid at a pressure which varies in accordance with the speed of a selected one of said shafts, control chamber means, a control source of fluid under pressure at a pressure which varies in accordance with the power demand on the engine, means effective when said shift valve is in a position other than said second position for supplying fluid from said control source to said control chamber means, means effective when said shift valve is in said second position for supplying fluid from said control source to said control chamber means only at times when the speed of said selected one of said shafts is less than a selected rate, means subject to the pressure of the fluid in said governor chamber means for moving said shift valve from said first to said second position, and means subject to the pressure of the fluid in said control chamber means for moving said shift valve from said second to said first position.

34. In a transmission for an engine, an input shaft, an output shaft, a drive transmitting device having an input member driven by said input shaft, an output member adapted to drive said output shaft, and fluid operated means establishing a drive connection between said input and output members having an operating chamber, a source of fluid under pressure, exhaust means, control valve means movable between first and second positions to establish said driving connection in one of said positions, and effective in one of said positions for connecting said operating chamber to said exhaust means, and effective in another of said positions for connecting said operating chamber to said source, and temperature control means responsive to the temperature of the fluid in the system providing a substantially constant rate of flow of fluid through said exhaust means regardless of variations in the temperature of the fluid to prevent variation in the time for disengagement of said driving connection due to temperature change.

35. In a transmission for an engine, a drive transmitting device for establishing a driving connection between said input and output members and having an operating chamber controlled by fluid under pressure to establish said driving connection, a source of fluid under pressure, control valve means, biased to a first position and movable therefrom to a second position to establish said driving connection, means effective according as said control valve means is in one of said positions for connecting said operating chamber to exhaust or is in another of said positions for connecting said operating chamber to said source, governor means providing a governor pressure varying in accordance with the speed of one of said members, means connecting said governor means to said control valve means to move said control valve from said first to said second positions, inhibitor valve means having a first position blocking the flow of governor fluid from said governor means to said control valve means and connecting said control valve means to exhaust and a second position connecting said governor means to said control valve means, manual control means for moving said inhibitor valve means from said first to said second positions, and said inhibitor valve means being responsive to said governor pressure to move said inhibitor valve from said first to said second positions at a predetermined speed of said one of said members.

36. In a transmission for an engine, a drive transmitting device for establishing a driving connection between said input and output members and having an operating chamber controlled by fluid under pressure to establish said driving connection, a source of fluid under pressure, control valve means, biased to a first position and movable therefrom to a second position to establish said driving connection, means effective according as said control valve means is in one of said positions for connecting said operating chamber to exhaust or is in another of said positions for connecting said operating chamber to said source, governor means providing a governor pressure varying in accordance with the speed of one of said members, means connecting said governor means to said control valve means to move said control valve from said first to said second positions, inhibitor valve means having a first position blocking the flow of governor fluid from said governor means to said control valve means and connecting said control valve means to exhaust and a second position connecting said governor means to said control valve means, and said inhibitor valve means being responsive to said governor pressure to move said inhibitor valve from said first to second positions at a predetermined speed of said one of said members.

37. A transmission for an engine provided with a power demand signal device, a control element actuated by said power demand signal device for movement from a first position at zero power demand to a second position at full power demand, an input member adapted to be driven by the engine, an output member, a drive transmitting device for establishing a driving connection between said input and output members, and having an operating chamber for controlling the establishment of said driving connection, a source of fluid under pressure, exhaust means, control valve means movable from first to a second position to establish said driving connection and effective in one of said positions for connecting said operating chamber to said exhaust means, and effective in another of said positions for connecting said operating chamber to said source, said exhaust means having a passage vented through a first and second exhaust, means responsive to said control element to open said second exhaust only during a predetermined range of movement of said control element from said first position to an intermediate position and to close said second exhaust during the range of movement of said control element from said intermediate to said second position, and means responsive to the fluid pressure in said operating chamber for closing said first exhaust until the pressure in said operating chamber is reduced to a predetermined value.

38. A transmission for an engine provided with a power demand signal device, a control element actuated by said power demand signal device for movement from a first position at zero power demand to a second position at full power demand, an input member adapted to be driven by the engine, an output member, a drive transmitting device for establishing a driving connection between said input and output members, and having an operating chamber for controlling the establishment of said driving connection, a source of fluid under pressure, exhaust means, control valve means movable from a first to a second position to establish said driving connection and effective in one of said positions for connecting said operating chamber to said exhaust means, and effective in another of said positions for connecting said operating chamber to said source, said exhaust means having a passage vented through an orifice, and means responsive to said control element connected to said passage to provide a free exhaust only during a predetermined range of movement of said control element from said first position to an intermediate position for closing said exhaust during the range of movement of said control element from said intermediate to said second position.

39. A transmission for an engine provided with a power demand signal device, a control element actuated by said power demand signal device for movement from a first position at zero power demand to a second position at full power demand, an input member adapted to be driven by the engine, an output member, a drive transmitting device for establishing a driving connection between said input and output members, and having an operating chamber for controlling the establishment of said driving connection, a source of fluid under pressure, exhaust means, control valve means movable from a first to a second position to establish said driving connection and effective in one of said positions for connecting said operating chamber to said exhaust means, and effective in another of said positions for connecting said operating chamber to said source, said exhaust means having a passage vented through an orifice and a free exhaust, and means responsive to the fluid pressure in said operating chamber for closing said free exhaust until the pressure in said operating chamber is reduced to a predetermined value.

40. In a transmission for an engine having a torque demand signal device indicating the output torque demanded of the engine, a control element actuated by said torque demand signal device for movement to a first position at zero power demand to a second position at full power demand, an input member adapted to be driven by the engine, an output member, a drive transmitting device for establishing a driving connection between said input and output members having an operating chamber for controlling the establishment of said drive connection, a source of fluid under pressure, exhaust means, shift control valve means movable from a first position connecting said source to said operating chamber to a second position connecting said operating chamber to said exhaust means to establish said drive in one position and disestablish said drive in the other position and said control element controlling the flow through said exhaust means.

41. The invention defined in claim 40 and the pressure in said operating chamber when connected to said exhaust means controlling the flow through said exhaust.

42. In a transmission for an engine, a power demand signal device providing a signal proportional to power demand on the engine, fluid actuated drive means for establishing a drive in the transmission, a source of fluid under pressure, valve means to provide a pressure proportional to said power demand signal, shift means controlled by said power demand signal pressure selectively connecting said source to said drive means to establish and disestablish said drive, and control means responsive only to the speed of said drive means to control the supply of said power demand pressure to said shift means.

43. The invention defined in claim 42 and said drive means having input and output members, and said control means being responsive to the speed of the output member of said drive means and blocking the supply of said power demand pressure to said shift means only during a predetermined part of the speed range.

44. In a transmission for an engine, the combination of a power demand signal device providing a signal proportional to the power, an input member, an output member, drive means connecting said input and output members and having a first and a second drive, fluid operated means to establish said first and second drives, a source of fluid under pressure, a power demand valve connected to said source and providing a power demand pressure proportional to the signal of said power demand signal device, governor means providing a pressure proportional to the speed of the transmission, shift valve means responsive to said power demand pressure and said governor pressure for controlling the supply of fluid from said source to said fluid operated means to selectively establish said low and high ratio, said shift valve means on movement from a first to a second position disconnecting said power demand pressure from said valve, and a time delay valve reconnecting said power demand pressure to said shift valve a controlled time after movement of said shift valve.

45. The invention defined in claim 44 and means to vary the controlled time in accordance with the speed of the transmission.

46. The invention defined in claim 44 and means to vary the controlled time in accordance with said power demand signal.

47. In a transmission for a vehicle having an engine, a throttle for controlling the power of the engine movable toward a first position for a low power demand and in a second position for a high power demand, a source of fluid under pressure, throttle valve means moved by said throttle from a first position at low power demand and to a second position at high power demand connecting said source to supply a control pressure varying with power demand and including a valve element movable in a bore having an open end, said bore having an enlarged counterbore at the open end and said valve element having an enlarged land providing an unbalanced area fitting said counterbore and positioned to enter said counterbore substantially as said valve element moves to said second position, means connecting said source to said counterbore when and only when said throttle valve is in said second position to supply fluid to said enlarged bore to act on the unbalanced area on said enlarged land to hydraulically resist movement of said throttle valve means at said second position.

48. In a transmission for a vehicle having an engine, a throttle for controlling the power of the engine movable toward a first position for a low power demand and in a second position for a high power demand, an input member, an output member, drive means connecting said input and output members and providing a low ratio and a high ratio drive, fluid operated means to establish said low and high ratios, a source of fluid under pressure, shift valve means movable from a first to a second position to control the supply of fluid from said source to said fluid operated means to establish said low ratio in said first position and said high ratio in said second position, throttle valve means moved by said throttle from a first position at low power demand and to a second position at high power demand connecting said source to said shift valve means to move said shift valve means from said second to said first position to establish said low ratio and including a valve element movable in a bore having an open end, said bore having an enlarged counterbore at the open end and said valve element having an enlarged land providing an unbalanced area fitting said counterbore and positioned to enter said counterbore substantially as said valve element moves to said second position, means connecting said source to said counterbore when and only when said throttle valve is in said second position to supply fluid to said enlarged bore to act on the unbalanced area on said enlarged land to hydraulically resist movement of said throttle valve means at said second position.

49. In a transmission for a vehicle having an engine, a throttle for controlling the power of the engine movable from a first position for a low power demand to a second position for a high power demand, an input member, an output member, drive means connecting said input and output members and providing a low ratio and a high ratio drive, fluid operated means to establish said low and high ratios, a source of fluid under pressure, shift valve means movable from a first to a second position to control the supply of fluid from said source to said fluid operated means to establish said low ratio in said first position and said high ratio in said second position, throttle valve means moved by said throttle from a first position at low power demand and to a second position at high power demand connecting said source to said shift valve means to move said shift valve means from said second to said first position to establish said low ratio and including a valve element movable in a bore having an open end, said bore having an enlarged counterbore at the open end and said valve element having an enlarged land providing an unbalanced area fitting said counterbore and positioned to enter said counterbore substantially as said valve element moves to said second position, means connecting said source to said counterbore when and only when said shift valve is in said second position and said throttle valve is in said second position to supply fluid to said enlarged bore to act on the unbalanced area of said enlarged land to hydraulically resist movement of said throttle valve means at said second position.

50. In a governor mechanism, a governor chamber, a pump supplying a volume of fluid flow proportional to the speed of the pump to said governor chamber, said governor chamber having an exhaust orifice providing a controlled discharge from said govenor chamber controlling the pressure in said governor chamber proportional to the speed of said pump, means responsive to the temperature of the fluid in said system to increase the rate of flow through said exhaust orifice with decreasing fluid temperatures.

51. The invention defined in claim 50 and said exhaust orifice being located at the terminal end of a passage connected to said chamber, said temperature control means consisting of a by-metallic strip having a closure located in close proximity to the terminal end of said exhaust orifice and movable with decreasing temperature to move said closure further from said terminal end of said exhaust orifice to increase the flow through said orifice.

52. A motor vehicle comprising in combination an engine for driving the vehicle, a throttle for controlling the power of the engine, a vehicle brake for yieldingly opposing motion of the vehicle, a pressure chamber for applying the vehicle brake, a pump for pressure fluid driven in response to movement of the vehicle which pump maintains a pressure increasing with vehicle speed, a first control operative in response to the pressure of said pump for operation in a first position above a predetermined minimum pump pressure and in a second position below said predetermined minimum pump pressure, a second control operated by said throttle for operation in a first position when said throttle is substantially closed and in a second position when said throttle is open, and means operatively connected to said first and second controls to supply fluid under pressure to said chamber to apply said brake only when said first and second controls are in said first position.

53. A motor vehicle comprising in combination an engine for driving the vehicle, a throttle for controlling the power of the engine, a vehicle brake for yieldingly opposing the motion of the vehicle, a pressure chamber for applying the vehicle brake, a source of pressure fluid, a first control operative in response only to forward speed of the vehicle operating in a first position above a predetermined minimum speed and in a second position below said predetermined minimum speed, a second control operated by said throttle for operation in a first position when said throttle is substantially closed and in a second position when said throttle is open, and means operatively connected to said first and second controls to connect said source to said chamber to apply said brake only when said first and second controls are in said first position and to disconnect said source from said chamber when one of said first and second controls is in said second position.

54. A motor vehicle comprising in combination an engine for driving the vehicle, a throttle for controlling the power of the engine, a vehicle brake for opposing motion of the vehicle, a pressure chamber for applying the vehicle brake, a source of pressure fluid, a first control operative in response to vehicle speed operating in a first position above a predetermined minimum speed and in a second position below said predetermined minimum speed, a second control operated by said throttle for operation in a first position when said throtte is substantially closed and in a second position when said throttle is open, and means operatively connected to said first and second controls to control the supply of fluid pressure from said source to said chamber to apply said brake only when said first and second controls are in said first position and to release said brake when one of said first and second controls are in said second position.

55. A motor vehicle comprising in combination an engine for driving the vehicle, a throttle for controlling the power of the engine, a vehicle brake for opposing movement of the vehicle, a first control operative in response to vehicle speed operating in a first condition above a predetermined minimum speed and in a second condition below said predetermined minimum speed, a second control operated by said throttle for operation in a first condition when said throttle is substantially closed and in a second condition when said throttle is open, and means operatively connected to said first and second controls to apply said brake only when said first and second controls are in said first condition and to release said brake when one of said first and second controls are in said second condition.

56. In a power drive mechanism, the combination including an engine for driving a load member, a throttle for controlling the power of the engine, a multiratio transmission connecting said engine to said load member in a low and a high ratio drive having an input member connected to said engine and an output member connected to said load member, a brake operatively connected to said input member for opposing motion of said input member, a first control movable to a first position in response to load member speed above a predetermined value, and movable to a second position in response to load member speed below said minimum value, a second control moved by said throttle to a first position when said throttle is substantially closed and to a second position when said throttle is open, a third control movable to a first position and operatively connected to said multiratio transmission to establish said low ratio and movable to a second position to establish said high ratio and means operatively connected to said first, second and third controls applying said brake when and only when said first, second and third controls are in their said first positions and releasing said brake when any one of said first, second and third controls is in its said second position.

57. In a power drive mechanism, the combination including an engine for driving a load member, a throttle for controlling the power of the engine, a multiratio transmission connecting said engine to said load member in a low and a high ratio drive having an input member connected to said engine and an output member connected to said load member, a brake for opposing motion of said load member, a first control operative in a first condition in response to load member speed above a predetermined value, and in a second condition in response to load member speed below said minimum value, a second control operated by said throttle in a first condition when said throttle is substantially closed and in a second condition when said throtte is open, a third control operative in a first condition and operatively connected to said multiratio transmission to establish said low ratio and in a second condition to establish said high ratio and means operatively connected to said first, second and third controls to apply said brake when and only when said first, second and third controls are in their said first conditions and to release said brake when any one of said first, second and third controls is in its said second condition.

58. In a fluid pressure operated automatic transmission having an input and an output wherein controls are actuated by either an operating or governor fluid controlled by a governor fluid, a first pump operated synchronously with said input and supplying operating fluid to a supply chamber, a second pump operated synchronously with said output having an inlet port and supplying governor fluid to a governor chamber, valve means operative on an increase in the pressure of the operating fluid in said supply chamber to a first selected valve to establish communication between said governor chamber and a first exhaust orifice to control the governor fluid pressure proportional to the output speed, valve means operative on an increase in the pressure of the governor fluid in said governor chamber to a second selected value substantially above said first selected value to also establish communication between said governor chamber and a second exhaust passage to control the governor fluid pressure at another proportion to the output speed, and means for supplying fluid under pressure from said supply chamber of said first pump to the inlet port of said second pump.

59. In a fluid pressure operated automatic transmission having an input and an output wherein controls are actuated by either an operating or governor fluid controlled by a governor fluid, a first pump operated synchronously with said input and supplying operating fluid to a supply chamber, a second pump operated synchronously with said output having an inlet port and supplying governor fluid to a governor chamber, valve means operative on an increase in the pressure of the operating fluid in said supply chamber to a first selected value to establish communication between said governor chamber and a first exhaust orifice to control the governor fluid pressure proportional to the output speed, valve means operative on an increase in the pressure of the governor fluid in said governor chamber to a second selected value substantially above said first selected value to also establish communication between said governor chamber and a second exhaust passage to control the governor fluid pressure at another proportion to the output speed, means for supplying fluid from said supply chamber of said first pump under a controlled fluid pressure to the inlet port of said second pump, a sump, and a passage connecting the inlet port of said second pump and said sump, a check valve in said last named passage arranged to permit flow of liquid from said sump to said pump and to prevent flow of liquid in the opposite direction.

60. In a fluid pressure operated automatic transmission having an input and an output wherein controls are actuated by either an operating or governor fluid controlled by a governor fluid, a first pump operated synchronously with said input and supplying operating fluid to a supply chamber, a second pump operated synchronously with said output having an inlet port and supplying governor fluid to a governor chamber, means for supplying liquid from said governor chamber to an exhaust orifice to control the governor fluid pressure proportional to the output speed, means for supplying from said supply chamber of said first pump fluid under a controlled pressure to the inlet port of said second pump, a sump, and means for supplying liquid from said sump to the inlet port of said second pump.

61. In a fluid pressure operated automatic transmission having an input an an output wherein controls are actuated by either an operating or governor fluid controlled by a governor fluid, a first pump operated synchronously with said input and supplying operating fluid to a supply chamber, a second pump operated synchronously with said output having an inlet port and supplying governor fluid to a governor chamber, means for supplying governor fluid from said governor chamber to an exhaust orifice to control the governor fluid pressure proportional to the output speed, a sump, an inlet passage connecting said sump and the inlet port of said second pump, a check valve in said inlet passage arranged to permit flow of fluid from said sump to the inlet port of said second pump and to prevent flow of fluid in the opposite direction, and means for supplying from said supply chamber of said first pump fluid under a controlled pressure to said inlet passage at a point on said inlet passage intermediate said check valve and the inlet port of said second pump.

62. In a transmission control system, a first shaft, a second shaft, a first pump driven synchronously with said first shaft, a second pump having an inlet port and being driven synchronously with said second shaft, a sump, a governor chamber open to said sump through an orifice, means for supplying liquid from said second pump to said governor chamber to control the governor fluid pressure proportional to the output speed, a supply passage, means for supplying liquid from said first pump to said supply passage, means for supplying liquid from said second pump to said supply passage, an inlet passage connecting the inlet port of said second pump with said sump, a check valve in said inlet passage arranged to permit flow from said sump to said pump, means for supplying fluid under pressure from said first pump to said inlet port of said second pump.

63. In a transmission control system, a sump containing fluid, a governor chamber, a pump driven by a member having its inlet connected to said sump and its outlet connected to said governor chamber and supplying a volume of fluid proportional to the speed of said member, said governor chamber having an exhaust orifice regulating the pressure of the fluid in said governor chamber proportional to the speed of said pump, and temperature control means submerged in the fluid in said sump controlling the rate of flow of fluid through said exhaust orifice to increase the rate of flow with decreasing temperatures of the fluid in said sump to provide a substantially constant pressure in said governor chamber proportional to the speed of said output member.

64. In a transmission for a vehicle having an engine, an input shaft, an output shaft, an operating chamber, a shift valve biased to a first position and movable therefrom to a second position, means effective according as said shift valve is in said first or said second position for connecting said operating chamber to exhaust or to a source of liquid under pressure, a governor chamber, means for supplying to said governor chamber fluid at a pressure which varies in accordance with the speed of said output shaft, a control chamber, a control source of fluid under pressure at a pressure which varies in accordance with the power demand on the vehicle engine, means effective when said shift valve is in a position other than said second position for supplying fluid from said control source to said control chamber, means effective regardless of the position of said shift valve for supplying fluid from said control source to said control chamber when the speed of said output shaft is less than a selected rate, means subject to the pressure of the fluid in said governor chamber for moving said shift valve from said first to said second position, means subject to the pressure of the fluid in said control chamber for moving said shift valve from said second to said first position, and a pressure operated control device effective on an increase in the pressure of the liquid in said operating chamber to establish between said input and output shafts a driving connection.

65. In a transmission for a vehicle having an engine, an input shaft, an output shaft, an operating chamber, a shift valve biased to a first position and movable therefrom to a second position, means effective according as said shift valve is in said first or said second position for connecting said operating chamber to exhaust or to a source of liquid under pressure, a governor chamber, means for supplying to said governor chamber fluid at a pressure which varies in accordance with the speed of a selected one of said shafts, a control chamber, a control source of fluid under pressure at a pressure which varies in accordance with the power demand on the vehicle engine, means effective when said shift valve is in a position other than said second position for supplying fluid from said control source to said control chamber, means effective regardless of the position of said shift valve for supplying fluid from said control source to said control chamber when the speed of said selected one of said shafts is less than a selected rate, means subject to the pressure of the fluid in said governor chamber for moving said shift valve from said first to said second position, means subject to the pressure of the fluid in said control chamber for moving said shift valve from said second to said first position, and a pressure operated control device effective on an increase in the pressure of the liquid in said operating chamber to establish between said input and output shafts a driving connection.

66. In a transmission for a vehicle having an engine, a throttle for controlling the power of the engine movable toward a first position for a low power demand and in a second position for a high power demand, an input member, an output member, drive means connecting said input and output members and providing a low ratio and a high ratio drive, fluid operated means to establish said low and high ratios, a source of fluid under pressure, shift valve means movable from a first to a second position to control the supply of fluid from said source to said fluid operated means to establish said low ratio in said first position and said high ratio in said second position, throttle valve means moved by said throttle from a first position at low power demand and to a second position at high power demand connecting said source to said shift valve means to move said shift valve means from said second to said first position to establish said low ratio and including a valve element movable in a bore having an open end, said bore having an enlarged counterbore at the open end and said valve element having an enlarged land providing an unbalanced area fitting said counterbore and positioned to enter said counterbore substantially as said valve element moves to said second position, detent means connecting said source to said counterbore when and only when said throttle valve is in said second position to supply fluid to said enlarged bore to act on the unbalanced area on said enlarged land to hydraulically resist movement of said throttle valve means at said second position, and means rendering said detent means inoperative in one of said low and high ratio drives and permitting operation of said detent means in another of said ratio drives.

67. A motor vehicle comprising in combination means for driving the vehicle, a throttle which when open increases the power of the driving means, and which when closed decreases the power of the driving means, retarding means for yieldingly opposing motion of the vehicle, a pressure chamber which when supplied with fluid pressure applies the retarding means with a force measured by the pressure, a source of fluid under pressure, and control means which connects the source to the chamber in response jointly to closing of the throttle and to motion of the vehicle above a predetermined speed, the vehicle including means which interrupts the connection between the source and the chamber in response to vehicle speed below said predetermined speed.

68. In a transmission, an input member, an output member, a fluid drive unit having an operating chamber and vaned rotors in said operating chamber connected to said input and output members to provide a fluid drive between said input and output members, a direct drive clutch connecting said input and output members and selectively engageable to provide a direct drive between said input and output members and disengageable to provide operation of said fluid drive, a fluid motor operatively connected to engage said direct drive clutch having an apply chamber and a release chamber, a fluid connection between said release chamber and said fluid drive operating chamber, a source of fluid under pressure, valve means having a first position connecting said source to said operating chamber and connecting said apply chamber to exhaust and a second position connecting said source to said apply chamber, blocking the connection of said source to said operating chamber and connecting said operating chamber to exhaust.

69. The invention defined in claim 68 and a power demand signal device, said valve means having means controlled by said power demand signal device to control the exhaust from said operating chamber in accordance with the variation in said power demand signal device.

70. The invention defined in claim 68 and a power demand signal device and said valve means having control means operative in said first position of said valve means to control the exhaust from said apply chamber and in said second position of said valve means to control the exhaust from said operating chamber.

71. In a transmission for a vehicle having an engine, a throttle for controlling the power of the engine movable from a first position for a low power demand to a second position for a high power demand, a source of fluid under pressure, throttle valve means moved by said throttle from a first position at low power demand and to a second position at high power demand connecting said source to supply a control pressure varying with power demand and including a valve element movable in a bore, said bore having an enlarged bore portion and said valve element having an enlarged land fixed on said valve element and fitting said enlarged bore portion and providing an unbalanced area, means connecting said source to said bore portion to supply fluid to said enlarged bore and operative to provide a pressure in said bore portion to act on said unbalanced area of said enlarged land to hydraulically resist movement of said throttle valve means only at said second position.

72. In a transmission adapted to be driven by an engine, a power demand control for an engine movable from low to high power demand positions, an input member, an output member, drive means connecting said input and output members operative on movement from a first position to a second position to drive said output member, shift means movable between a first and a second position and operatively connected to said drive means to place said drive means in said first position when said shift means is in said first position and in said second position when said shift means is in said second position, governor means providing a force varying with the speed of one of said members operatively connected to said shift means to urge said shift means from said first to said second position, first means providing, during a large range of speeds of one of said members, a force which varies with the position of said power demand control, second means providing only during a small range of speeds a force which varies with said power demand control, and control means connecting said first means to said shift means to urge said shift means from said second to said first positions when said shift means is in said first position for power demand and speed controlled upshifts in a large speed range and operative automatically on movement of said shift means from said first to said second position to disconnect said first means and connect said second means to said shift means to urge said shift means to said first position when said shift means is in said second position for power demand and speed controlled downshifts in a small range of speeds, and only speed controlled downshifts at speeds outside of said small range of speeds.

73. The invention defined in claim 72 and said small range of speeds being at low speed values.

74. The invention defined in claim 72 and said control means providing a time delay between the disconnection of said first means and the connection of said second means.

75. The invention defined in claim 72 and said control means providing a time delay variable with power demand between the disconnection of said first means and the connection of said second means.

76. The invention defined in claim 72 and said control means providing a time delay variable with the speed of one of said members between the disconnection of said first means and the connection of said second means.

77. In a transmission adapted to be driven by an engine, a power demand control for an engine movable from low to high power demand positions, an input member, an output member, drive means connecting said input and output members operative on movement from a first position to a second position to drive said output member, shift means movable between a first and a second position and operatively connected to said drive means to place said drive means in said first position when said shift means is in said first position and in said second position when said shift means is in said second position, governor means providing a force varying with the speed of one of said members operatively connected to said shift means to urge said shift means from said first to said second position, first means providing, during one range of speeds of one of said members, a force which varies with the position of said power demand control, second means providing only during another different range of speeds a force which varies with said power demand control, and control means connecting said first means to said shift means to urge said shift means from said second to said first positions when said shift means is in one position for upshifts in said one speed range and operative automatically on movement of said shift means from said first to said second position to reduce the effect of said first means on said shift means and connect said second means to said shift means to urge said shift means to said first position only when said shift means is in said another position for downshifts.

78. In a transmission; means having friction engaging means movable for engagement to establish a drive and for disengagement to disestablish said drive; retraction means operatively connected to said friction engaging means to move said friction engaging means for disengagement; hydraulic motor means for actuating said friction engaging means having first and second separate expansible chambers operably interconnected for common expansion and contraction of said separate chambers and each chamber providing, on the supply of fluid under pressure to fill each chamber, a force acting on said friction engaging means for engagement; source means for providing fluid under substantially constant pressure; first conduit means being continuously open for supplying fluid to said first chamber; second conduit means being continuously open for supplying fluid to said second chamber; shift valve means for connecting said source means to supply fluid pressure from said source means substantially simultaneously to both said first and second conduit means for engagement of said friction engaging means and to connect both said first and second conduit means to exhaust for disengagement of said friction engaging means by said retraction means; and both of said conduit means and said chambers cooperating to provide a predetermined sequence in which said first conduit means freely connects said shift valve means to said first chamber to supply fluid at a high volume flow under a substantially constant pressure to said first chamber to quickly provide a first force sufficient to overcome said reaction means to move said friction engaging means to initially engage said friction engaging means with said first force permitting slip and to continue to apply said first force, and said second conduit means including means permitting continuous flow from said shift valve means to said second chamber and preventing filling of said second chamber sufficiently to provide a force while it is expanding from the disengaged position to the position of initial engagement and filling said second chamber on initial engagement to provide a second force supplementing said first force to finally apply said friction engaging means without slip with both said first and second forces.

79. The invention defined in claim 78 and said source means and shift valve means supplying one regulated pressure to said first and second conduit means and said second chamber having a larger area than said first chamber.

80. The invention defined in claim 78 and said second conduit means including an exhaust from said second chamber and means for substantially closing said exhaust on initial engagement of said friction engaging means.

81. The invention defined in claim 78 and said second conduit means supplying fluid at a low volume flow for providing said second force a predetermined time after application of said first force.

82. The invention defined in claim 78 and said second conduit means having a restriction for supplying fluid at a low volume flow for delaying said second force until initial contact engagement of said friction engaging means.

83. In a transmission; means having friction engaging means movable for engagement to establish a drive and for disengagement to disestablish said drive; retraction means operatively connected to said friction engaging means to move said friction engaging means for disengagement; hydraulic motor means for actuating said friction engaging means having a first and a second expansible chambers operably interconnected for common expansion and contraction and each chamber providing, on the supply of fluid under pressure to fill each chamber, a force acting on said friction engaging means for engagement; source means for providing fluid under substantially constant pressure; first conduit means being continuously open for supplying fluid to said first chamber; second conduit means being continuously open for supplying fluid to said second chamber; shift valve means for connecting said source means to supply fluid pressure from said source means substantially simultaneously to both said first and second conduit means for engagement of said friction engaging means and to connect both said first and second conduit means to exhaust for disengagement of said friction engaging means by said retraction means; and both of said conduit means and said chambers cooperating to provide a predetermined sequence in which said first conduit means connects said shift valve to said first chamber to supply fluid at a rate of flow and a substantially constant pressure to fill said first chamber to quickly expand said chambers and provide a first force sufficient to overcome said reaction means to move said friction engaging means to initially engage said friction engaging means with said first force permitting slip and to continue to apply said first force to assist slow expansion of said chambers and movement of said friction engaging means from initial engagement to final engagement without slip, and said second conduit means having a continuously open restriction connecting said source to said second chamber to supply fluid at a rate of flow insufficient to fill said second chamber while it is quickly expanding and sufficient to fill said second chamber while it is slowly expanding to gradually provide a second increasing force to finally apply said friction engaging means without slip with both said first and second forces.

References Cited in the file of this patent

UNITED STATES PATENTS

| | | |
|---|---|---|
| 978,776 | Morgan | Dec. 13, 1910 |
| 2,449,608 | Le May | Sept. 21, 1948 |
| 2,606,456 | Dodge | Aug. 12, 1952 |
| 2,645,137 | Roche | July 14, 1953 |
| 2,665,637 | Lauck | Jan. 12, 1954 |
| 2,667,085 | Ackerman | Jan. 26, 1954 |
| 2,679,768 | Baule | June 1, 1954 |
| 2,691,940 | McFarland | Oct. 19, 1954 |
| 2,693,260 | Lucia | Nov. 2, 1954 |
| 2,695,696 | Iavelli | Nov. 30, 1954 |
| 2,697,363 | Sheppard | Dec. 21, 1954 |
| 2,726,556 | Greenlee | Dec. 13, 1955 |
| 2,733,732 | Baker | Feb. 7, 1956 |
| 2,737,824 | Livermore | Mar. 13, 1956 |
| 2,750,018 | Dundore | June 12, 1956 |
| 2,757,552 | English | Aug. 7, 1956 |
| 2,774,376 | Young | Dec. 18, 1956 |
| 2,794,349 | Smirl | June 4, 1957 |
| 2,795,309 | Hasbany | June 11, 1957 |
| 2,849,889 | Ball et al. | Sept. 2, 1958 |

UNITED STATES PATENT OFFICE
CERTIFICATE OF CORRECTION

Patent No. 3,083,588                                April 2, 1963

Howard W. Christenson

It is hereby certified that error appears in the above numbered patent requiring correction and that the said Letters Patent should read as corrected below.

Column 1, line 40, for "tha" read -- that --; column 3, line 58, for "relative" read -- relatively --; line 66, for "in" read -- is --; column 4, line 63, for "conver" read -- cover --; column 5, line 6, for "shirt" read -- short --; column 12, line 24, after "diaphragm 157" insert -- and causes the thrust diaphragm 157 --; column 28, line 25, for "condtiions" read -- conditions --; column 47, line 73, for "mean" read -- means --; column 60, line 40, for "throtte" read -- throttle --.

Signed and sealed this 10th day of December 1963.

(SEAL)
Attest:
ERNEST W. SWIDER

EDWIN L. REYNOLDS

Attesting Officer                                    Acting Commissioner of Patents